US011310191B2

(12) United States Patent
Kitamuya

(10) Patent No.: US 11,310,191 B2
(45) Date of Patent: Apr. 19, 2022

(54) RECEIVING DEVICE, RECEIVING DEVICE CONTROL METHOD, NETWORK SYSTEM, NETWORK SYSTEM CONTROL METHOD, AND MEDIUM

(71) Applicant: NEC Corporation, Tokyo (JP)

(72) Inventor: Hiroshi Kitamuya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 651 days.

(21) Appl. No.: 14/767,422

(22) PCT Filed: Dec. 9, 2013

(86) PCT No.: PCT/JP2013/082987
§ 371 (c)(1),
(2) Date: Aug. 12, 2015

(87) PCT Pub. No.: WO2014/125708
PCT Pub. Date: Aug. 21, 2014

(65) Prior Publication Data
US 2016/0006685 A1 Jan. 7, 2016

(30) Foreign Application Priority Data

Feb. 12, 2013 (JP) .............................. JP2013-024291

(51) Int. Cl.
H04L 29/12 (2006.01)
H04L 12/721 (2013.01)
(Continued)

(52) U.S. Cl.
CPC .......... *H04L 61/1511* (2013.01); *H04L 45/72* (2013.01); *H04L 61/10* (2013.01)

(58) Field of Classification Search
CPC ..... H04L 61/1511; H04L 45/72; H04L 61/10; H04L 43/08–16
See application file for complete search history.

(56) References Cited

U.S. PATENT DOCUMENTS

2002/0073233 A1* 6/2002 Gross ................ H04L 29/12066
709/245
2003/0074414 A1 4/2003 Shibuya
(Continued)

FOREIGN PATENT DOCUMENTS

JP 2003-125004 A 4/2003
JP 2004-007222 A 1/2004
(Continued)

OTHER PUBLICATIONS

International Search Report corresponding to PCT/JP2013/082987 dated Mar. 11, 2014 (2 pages).

Primary Examiner — Lesa M Kennedy

(57) ABSTRACT

A receiving device according to the present invention includes: a packet receiving unit which receives a packet transmitted from a transmitting device which is a communication device transmitting the packet; and a transmitting device information acquiring unit which acquires, from an information providing device storing communication device information which is information concerning the communication device and information used for a purpose other than name resolution for the communication device, the communication device information corresponding to the transmitting device which is a source of the packet.

20 Claims, 44 Drawing Sheets

(51) Int. Cl.
*H04L 61/4511* (2022.01)
*H04L 45/00* (2022.01)
*H04L 61/10* (2022.01)

(56) References Cited

U.S. PATENT DOCUMENTS

| | | | |
|---|---|---|---|
| 2003/0167410 A1* | 9/2003 | Rigstad | H04L 63/0227 726/1 |
| 2006/0003745 A1* | 1/2006 | Gogic | H04M 1/72547 455/413 |
| 2009/0070412 A1* | 3/2009 | D'Angelo | G06Q 10/10 709/203 |
| 2010/0005146 A1* | 1/2010 | Drako | G06Q 10/00 709/206 |
| 2010/0057895 A1* | 3/2010 | Huang | H04L 63/1483 709/222 |
| 2012/0030334 A1 | 2/2012 | Kitamurra | |
| 2012/0030351 A1* | 2/2012 | Fukushima | H04L 63/101 709/224 |

FOREIGN PATENT DOCUMENTS

| | | |
|---|---|---|
| JP | 2004-070750 A | 3/2004 |
| JP | 2004-266519 A | 9/2004 |
| JP | 2005-086503 A | 3/2005 |
| JP | 2008-278207 A | 11/2008 |
| JP | 2011-130358 A | 6/2011 |
| WO | WO-2010/110308 A1 | 9/2010 |

* cited by examiner

Fig. 5

| COMMUNICATION DEVICE ID | RECORD TYPE | RECORD VALUE |
|---|---|---|
| host1.site1.example.com. | TXT | WHITELIST OF E-MAIL DESTINATIONS |
| A.0.0.0.0.0.0.0.0.0.0.0.0.0.1.0.0.0.1.0.1.0.8.b.d.0.1.0.0.2.ip6.arpa. | PTR | www.site2.example.com.website.invalid. |
| ... | ... | |

200
210
220
230

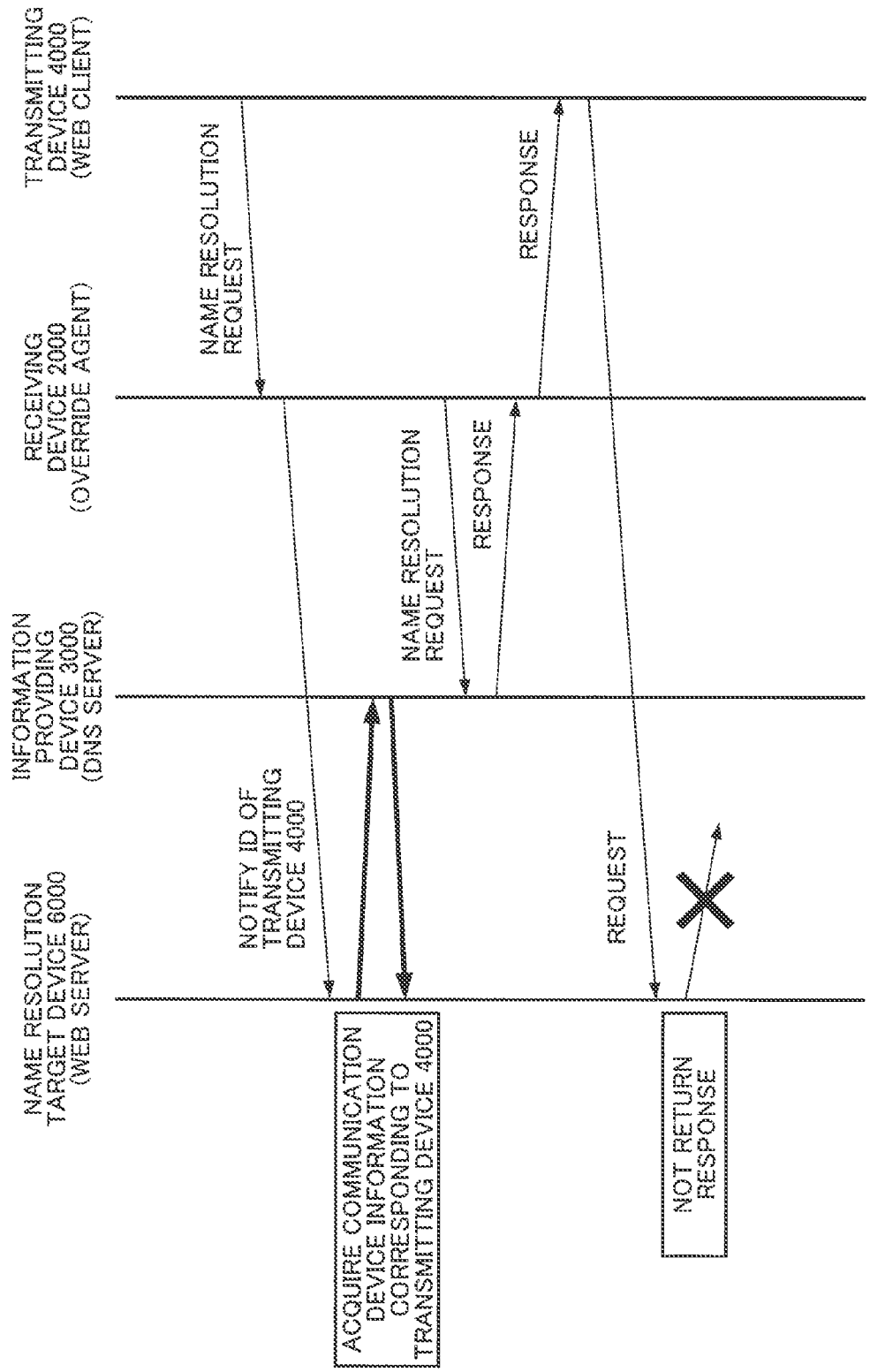

RECEIVING DEVICE, RECEIVING DEVICE CONTROL METHOD, NETWORK SYSTEM, NETWORK SYSTEM CONTROL METHOD, AND MEDIUM

CROSS-REFERENCE TO RELATED APPLICATIONS

This application is a national stage application of International Application No. PCT/JP2013/082987 entitled "Receiving Device, Receiving Device Control Method, Receiving Device Control Program, Network System, Network System Control Method, and Network System Control Program" filed on Dec. 9, 2013, which claims priority to Japanese Application No. 2013-024291 filed on Feb. 12, 2013, the disclosures of which are hereby incorporated by reference in their entirety.

TECHNICAL FIELD

The present invention relates to a receiving device, a receiving device control method, a network system, a network system control method, and a medium.

BACKGROUND ART

In order to properly operate and control communication devices connected onto a network, information concerning each of the communication devices needs to be recognized. The communication device as used herein refers to any of various types of computers such as a PC (Personal Computer), a server, a portable computer, or an embedded device. Information concerning a communication device is, for example, a state of the communication device. The state of a communication device is, for example, a state representing which communication protocol the communication device is capable of using for communication and so on. For example, there is a state whether being capable of communication by using the IPv4 (IP version 4) protocol or communication by using the IPv6 (IP version 6) protocol as a state for a communication device that relates to the IP (Internet Protocol).

A method for recognizing information concerning a communication device can be supposed a method in which a special application that provides information concerning a communication device is installed into the communication device from which information is to be acquired. For example, techniques described in PLT 1 and PLT 2 are techniques recognizing information relating with the configuration of a network connected to the communication device by installing an application that provides information concerning a communication device into the communication device.

CITATION LIST

Patent Literature

[PLT 1] Japanese Patent Laid-Open Publication No. 2004-266519
[PLT 2] Japanese Patent Laid-Open Publication No. 2008-278207

SUMMARY OF INVENTION

Technical Problem

The present inventor has found the need for recognizing, without modifying a transmitting device as a communication device transmitting a packet, an intention of a user of the transmitting device. If an intention of the user of a transmitting device can be recognized, it is possible to monitor and control operations of the transmitting device by taking into consideration the intention of the user of the transmitting device.

The condition of "without modifying the transmitting device" is required because there is a case in which modification of transmitting devices is difficult. In transmitting devices, there is a transmitting device which is difficult to install an application into or modify an OS (Operating System) to. For example, embedded devices cannot often be installed an application or modified an OS. Alternatively, if addiction of modification to a transmitting device (for example, to install an application) is instructed to a user of the transmitting device, the user does not necessarily modify the device as instructed. Therefore, if the user has not made a modification to the transmitting device as instructed, an intention of the user of the transmitting device cannot be recognized.

The present invention has been made in light of the problem described above. An object of the present invention is to provide a technique for enabling an intention of a user operating a communication device that transmits packets to be recognized without modifying the communication device.

Solution to Problem

A receiving device provided by the present invention includes: a packet receiving unit which receives a packet transmitted from a transmitting device which is a communication device transmitting the packet; and a transmitting device information acquiring unit which acquires, from an information providing device storing communication device information which is information concerning the communication device and information used for a purpose other than name resolution for the communication device, the communication device information corresponding to the transmitting device which is a source of the packet.

A computer readable non-transitory medium provided by the present invention embodies a program. The program realizes a method to perform the receiving device provided by the present invention.

A receiving device control method provided by the present invention includes: receiving a packet transmitted from a transmitting device which is a communication device transmitting the packet; and acquiring, from an information providing device storing communication device information which is information concerning the communication device and information used for a purpose other than name resolution for the communication device, the communication device information corresponding to the transmitting device which is a source of the packet. A computer readable non-transitory medium provided by the present invention embodies a program for causing one or more processors in a network system including a receiving device, a transmitting device, and an information providing device, the program to perform a method. The information providing device stores communication device information which is information concerning a communication device and information used for a purpose other than name resolution for the communication device. The method includes transmitting the packet from the transmitting device; receiving, in the receiving device, the packet transmitted from the transmitting device; and acquiring, in the receiving device, the communication device information corresponding to the transmitting device which is a source of the packet from the information providing device.

A network system control method provided by the present invention is a control method controlling a network system including a receiving device, a transmitting device, and an information providing device. The information providing device stores communication device information which is information concerning a communication device and information used for a purpose other than name resolution for the communication device. The network system control method includes: transmitting the packet from the transmitting device; receiving, in the receiving device, the packet transmitted by the transmitting device; acquiring, in the receiving device, the communication device information corresponding to the transmitting device which is a source of the packet from the information providing device.

Advantageous Effects of Invention

The present invention provides a technique for recognizing an intention of a user operating a communication device transmitting a packet, without modifying the communication device.

BRIEF DESCRIPTION OF DRAWINGS

The object described above and other objects, features and advantages will be further apparent from preferred exemplary embodiments described below and the following accompanying drawings.

[FIG. 5] a diagram illustrating an exemplary configuration of the communication device information table in a case in which an information providing device is a DNS (Domain Name System) server;

[FIG. 44] a diagram illustrating an exemplary flow of communication in a seventeenth example.

DESCRIPTION OF EMBODIMENTS

Figure 1:
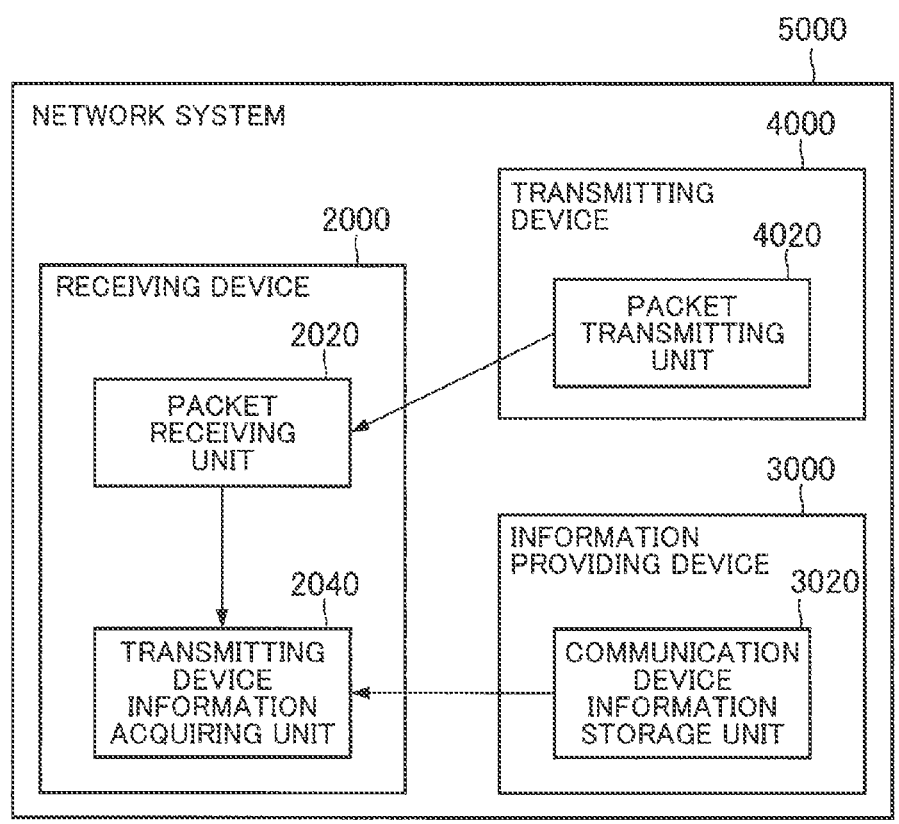
[FIG. 1] A block diagram illustrating a receiving device according to a first exemplary embodiment together with an environment in which the receiving device is used.
Figure 2:
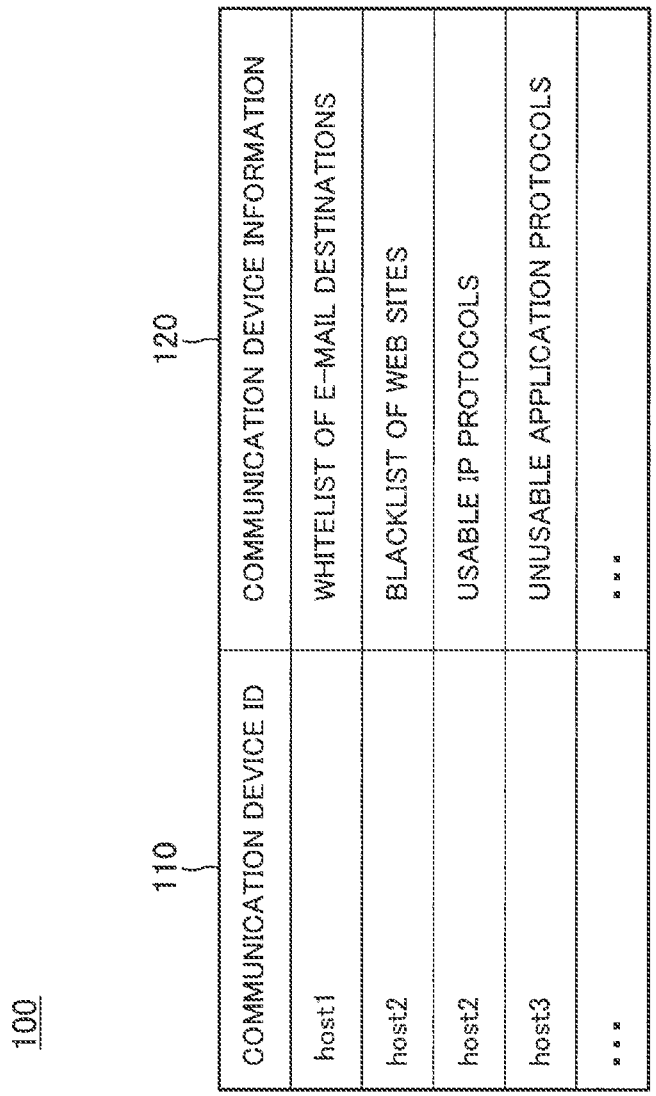
[FIG. 2] a diagram illustrating an exemplary configuration of a communication device information table.

Exemplary embodiments of the present invention will be described below with reference to drawings. The same components are given the same reference numeral throughout the drawings, and description of such components will be omitted as appropriate.

First Exemplary Embodiment

FIG. 1 is a block diagram illustrating a receiving device 2000 according to a first exemplary embodiment together with an environment in which the receiving device 2000 is used. In FIG. 1, the arrows indicate flows of information. In FIG. 1, each of the blocks represents a configuration of functional unit rather than a configuration of hardware unit.

<Preconditions>

The receiving device 2000 is connected to an information providing device 3000 and a transmitting device 4000 through a network. The network may be composed of wired lines, may be composed of wireless lines, or may be composed of a mixture of wired lines and wireless lines. A system including the receiving device 2000, the information providing device 3000 and the transmitting device 4000 will be hereinafter referred to as a network system 5000.

The receiving device 2000 and the transmitting device 4000 are communication devices. The term communication device refers to a device that transmits or receives packets. The communication device is a device such as a PC (Personal Computers), a server, a portable computer or an embedded device.

The Packet is data transmitted through the network. For example, the packet is an IP (Internet Protocol) packet handled in a protocol for the layer 3 level or layer 2 frames handled in a protocol for the layer 2 level.

The information providing device 3000 stores communication device information which is information relating to a communication device in association with the communication device. The communication device information is information that reflects an intention of a user of the communication device. The communication device information is information used for purposes other than name resolution for the communication device. Name resolution is processing for deducting an IP (Internet Protocol) address from a host name, or processing for deducting a host name from an IP address. However, the information providing device 3000 may store information used for name resolution for a communication device in addition to the communication device information.

For example, the information providing device 3000 stores the communication device information in association with IDs of communication devices. An ID of a communication device is, for example, a layer 2 address, a layer 3 address, a UUID (Universally Unique Identifier), or the like of the communication device. The layer 2 address is a MAC (Media Access Control Address), for example. The layer 3 address is an IP address, for example. The IP address may be an IPv4 (IP version 4) address or an IPv6 (IP version 6) address.

The information providing device 3000 may be implemented by one device or implemented by a plurality of devices. The information providing device 3000 is a PC (Personal Computer), a server, or the like, for example. The information providing device 3000 may be a portable computer, an embedded device, or the like.

The receiving device 2000 operates under the preconditions described above. Functional component units included in the receiving device 2000 will be described below.

<Packet Receiving Unit 2020>

The receiving device 2000 includes a packet receiving unit 2020. The packet receiving unit 2020 receives a packet transmitted from the transmitting device 4000.

The packet received by the receiving device 2000 from the transmitting device 4000 may be a packet directed to the receiving device 2000 or may be a packet directed to a destination other than the receiving device 2000. When the receiving device 2000 receives the packet directed to the receiving device 2000, the receiving device 2000 is a server that provides a service to the transmitting device 4000, such as a Web server or a mail server, for example. Alternatively, the receiving device 2000 is a communication device that performs P2P (peer to peer) communication, for example, with the transmitting device 4000.

When the receiving device 2000 receives the packet directed to a destination other than the receiving device 2000, the receiving device 2000 is, for example, a device that relays communication between the transmitting device 4000 and a communication device to which the transmitting device 4000 is directing the packet. For examples of such devices, there is a proxy server, an MTA (Mail Transfer Agent), or the like. Alternatively, for example, the receiving device 2000 is a communication device that captures and receives a packet indicating a request for name resolution, transmitted from the transmitting device 4000 to a DNS (Domain Name System) server. Hereinafter, a communication device that captures and receives a packet indicating a request for name resolution will also be referred to as an override agent. The override agent is a receiving device described in Japanese Patent Application No. 2011-193558. Since details of the override agent is described in Japanese Patent Application No. 2011-193558, description of the override agent will be omitted.

<Transmitting Device Information Acquiring Unit 2040>

The receiving device 2000 includes a transmitting device information acquiring unit 2040. The transmitting device information acquiring unit 2040 acquires communication device information corresponding to the transmitting device 4000 that is a source of the packet received by the packet receiving unit 2020 from the information providing device 3000.

The receiving device 2000 acquires, for example, the communication device information corresponding to the transmitting device 4000 from the information providing device 3000 by using information contained in the packet received from the transmitting device 4000. The information contained in the packet is, for example, a layer 2 address or a layer 3 address of the transmitting device 4000. If a layer 2 address or a layer 3 address of the transmitting device 4000 is contained in the packet, the receiving device 2000 acquires the communication device information relating to the transmitting device 4000 from the information providing device 3000 by using the layer 2 address or the layer 3 address as the ID of the transmitting device 4000.

<Details of Communication Device Information>

The communication device information is represented as a communication device information table 100, for example. The communication device information table 100 includes a communication device ID 110 and communication device information 120. The communication device information 120 indicates the communication device information corresponding to a communication device identified by the communication device IDs 110.

For example, the communication device information indicates an operation that the communication device is allowed to perform or an operation that the communication device is not allowed to perform. It can be said that the operation that the communication device is allowed to perform is an operation that the user of the communication device wants the communication device to perform. It can be said that the operation that the communication device is not allowed to perform is an operation that the user of the communication device does not want the communication device to perform.

In the case described above, for example, the communication device information corresponding to the communication device indicates another communication device with which the communication device is allowed to communicate, or another communication device with which the communication device is not allowed to communicate.

For example, the communication device information, that corresponds to the transmitting device 4000 and indicates another communication device which the transmitting device 4000 may make a communication partner, is a whitelist indicating a destination which the transmitting device 4000 may make a destination of E-mail, a whitelist indicating a Web site which the transmitting device 4000 may access, or the like.

For example, the communication device information, that corresponds to the transmitting device 4000 and indicates a communication device which the transmitting device 4000 must not communicate, is a blacklist indicating a destination which the transmitting device 4000 must not make a destination of E-mail, a blacklist indicating a Web site which the transmitting device 4000 must not access, or the like.

Alternatively, for example, communication device information corresponding to a communication device indicates a communication protocol that the communication device may use or a communication protocol that the communication device must not use. For example, it is assumed that the transmitting device 4000 is allowed to use IPv6 as an IP protocol but is not allowed to use IPv4. In this case, the communication device information corresponding to the transmitting device 4000 indicates IPv6 as a communication protocol that the transmitting device 4000 may use. In addition, the communication device information corresponding to the transmitting device 4000 indicates IPv4 as a communication protocol that the transmitting device 4000 must not use. For example, the communication device information corresponding to the transmitting device 4000 indicates a HTTP over SSL/TLS (Hypertext Transfer Protocol over Secure Socket Layer/Transport Layer Security) protocol as a communication protocol that the transmitting device 4000 may use when accessing Web pages, and indicates a HTTP protocol as a communication protocol that the transmitting device 4000 must not use.

Alternatively, for example, communication device information corresponding to a communication device may be information that the user of the communication device wants to present to the outside. For example, if the transmitting device 4000 is a sensor, the transmitting device 4000 stores a result of measurement by the transmitting device 4000 as the communication device information corresponding to the transmitting device 4000. In this case, the receiving device 2000 can acquire the result of measurement by the transmitting device 4000 as the communication device information corresponding to the transmitting device 4000 when acquiring a packet transmitted from the transmitting device 4000. In this way, even if the transmitting device 4000 is a device that does not have a function of presenting information, the receiving device 2000 can acquire information that the transmitting device 4000 wants to present.

By the configuration described above, according to the receiving device 2000 of this exemplary embodiment, the communication device information corresponding to the transmitting device 4000 that transmits a packet is acquired. In this way, the receiving device 2000 can recognize an intention of the user using the transmitting device 4000 on the basis of the acquired communication device information corresponding to the transmitting device 4000. For example, it is assumed that the communication device information corresponding to the transmitting device 4000 indicates HTTP over SSL/TLS as a communication protocol which may be used for Web access, and indicates HTTP as a communication protocol which must not be used. HTTP over SSL/TLS is a communication protocol that prevents eavesdropping and spoofing by performing encryption of a message and the like by using SSL/TLS. Accordingly, this communication device information indicates the intention of the user of the transmitting device 4000 as "want to access Web by a high secure method". In this way, the receiving device 2000 can recognize the user's intention as "want to access Web by a high secure method".

<Hardware Configuration>

Each of the functional component units included in the receiving device 2000 is, for example, achieved as at least one hardware component element in an individual state or a state combined of a plurality of components. Alternatively, for example, each of the functional component units is achieved as at least one software component element. Alternatively, for example, each of the functional component units is achieved as a combination of a hardware component element and a software component element.

Figure 3:
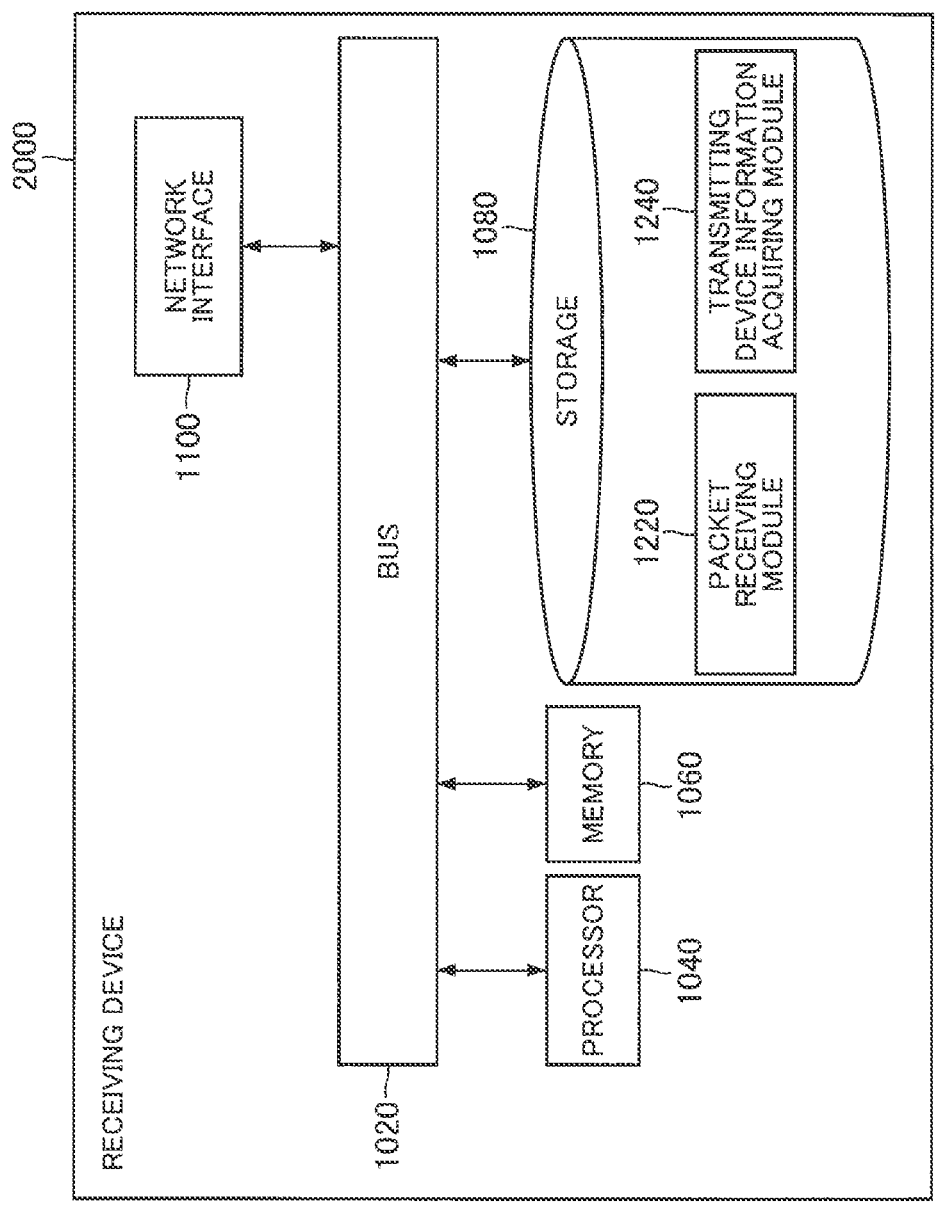
[FIG. 3] a block diagram illustrating an exemplary hardware configuration of the receiving device.

FIG. 3 is a block diagram illustrating an exemplary hardware configuration of the receiving device 2000. In FIG. 3, the receiving device 2000 includes a bus 1020, a processor 1040, a memory 1060, a storage 1080, and a network interface 1100. However, the hardware configuration of the receiving device 2000 is not limited to the configuration illustrated in FIG. 3.

The bus 1020 is a data transmission path through which the processor 1040, the memory 1060, the storage 1080 and the network interface 1100 transmit and receive data mutually. The processor 1040 is a processing device such as a CPU (Central Processing Unit) or a GPU (Graphics Processing Unit), for example. The memory 1060 is a memory such as a RAM (Random Access Memory) or a ROM (Read Only Memory), for example. The storage 1080 is a storage device such as a hard disk, a USB (Universal Serial Bus) memory, or an SSD (Solid State Drive), for example. The storage 1080 may be a memory such as a RAM or a ROM. The network interface 1100 is an interface for transmitting and receiving a packet to and from another device through a network. The network interface 1100 is a network interface card (NIC), for example. The network interface 1100 may be an interface that connects to a network through a wired line or an interface that connects to a network through a wireless line.

A packet receiving module 1220 is a program for causing the receiving device 2000 to function as the packet receiving unit 2020. The processor 1040 achieves the function of the packet receiving unit 2020 by executing the packet receiving module 1220.

A transmitting device information acquiring module 1240 is a program for causing the receiving device 2000 to function as the transmitting device information acquiring unit 2040. The processor 1040 achieves the function of the transmitting device information acquiring unit 2040 by executing the transmitting device information acquiring module 1240.

<Processing Flow>

Figure 4:
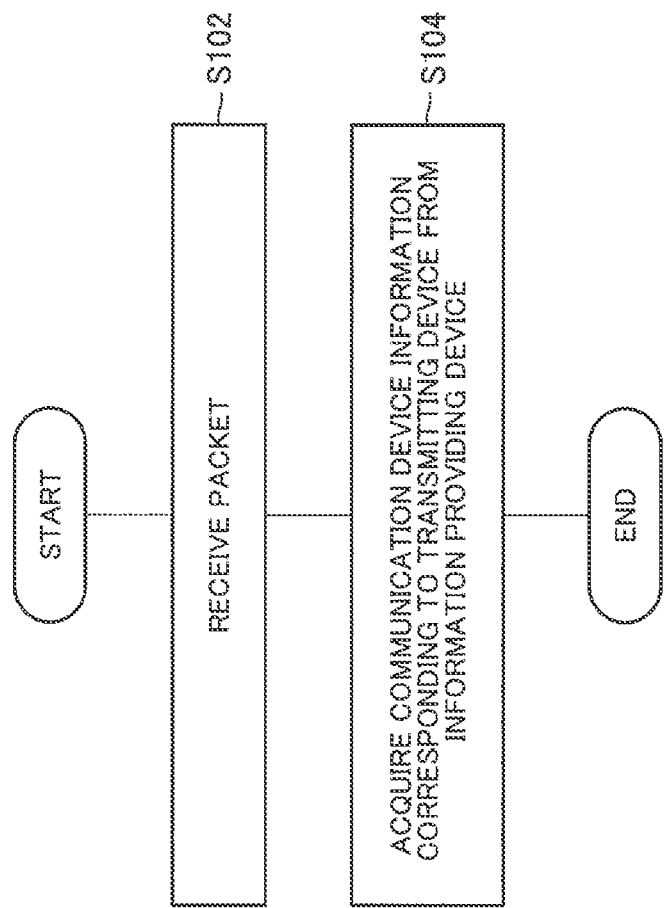
[FIG. 4] a flowchart illustrating an exemplary flow of processing performed by the receiving device according to the first exemplary embodiment.

FIG. 4 is a flowchart illustrating an exemplary flow of processing performed by the receiving device 2000 according to the first exemplary embodiment.

At step S102, the packet receiving unit 2020 receives a packet from the transmitting device 4000. At step S104, the transmitting device information acquiring unit 2040 acquires the communication device information corresponding to the transmitting device 4000 which is a source of the packet from the information providing device 3000.

<Details of Transmitting Device 4000>

The transmitting device 4000 includes a packet transmitting unit 4020. The packet transmitting unit 4020 transmits a packet received by the packet receiving unit 2020.

<Details of Information Providing Device 3000>

The information providing device 3000 includes a communication device information storage unit 3020. The communication device information storage unit 3020 stores the communication device information.

The information providing device 3000 is a DNS server, for example. Alternatively, for example, the information providing device 3000 may be a database server or the like such as an RDBMS (Relational Database Management System) server, a Key-Value store, or the like.

When a DNS server is used as the information providing device 3000, the DNS server stores the communication device information as a value of DNS record, for example. For example, the information providing device 3000 stores the communication device information as a value of TXT record or PTR record of DNS. However, the record in which the information providing device 3000 stores the communication device information is not limited to the TXT record or the PTR record. The DNS record described above stores the communication device information in association with an FQDN (Fully Qualified Domain Name) or an IP address of the transmitting device 4000.

FIG. 5 is a diagram illustrating a communication device information table 200 achieved as DNS records. The communication device information table 200 includes a communication device ID 210, a record type 220 and a record value 230. The communication device ID indicates a value corresponding to an FQDN or an IP address.

For example, the first row of the communication device information table 200 indicates the communication device information corresponding to a communication device having an FQDN, which is host1.site1.example.com., as a record value of a TXT record. A TXT record is a record that stores a character string in association with an FQDN.

The second row of the communication device information table 200 indicates the communication device information corresponding to a communication device having an IP address, which is 2001:0db8:0101:0001:0000:0000:0000:000A, as a value of a PTR record. A PTR record is a record that indicates the FQDN of a computer having an IP address in association with the FQDN corresponding to the IP address. Therefore, for example, the communication device information is represented as an FQDN, as in the second row of the communication device information table 200. The second row of the communication device information table 200 indicates information that "the Web site which is www.site2.example.com must not be accessed". Since an FQDN has a hierarchical structure, the communication device information can have a hierarchical structure by using a PTR record.

The transmitting device information acquiring unit 2040 transmits a DNS query, indicating the FQDN or IP address of the transmitting device 4000 that transmits a packet, to the information providing device 3000. Then, the transmitting device information acquiring unit 2040 receives the communication device information corresponding to the transmitting device 4000 from the information providing device 3000 as a response to the DNS query.

For example, it is assumed that the information providing device 3000 stores the communication device information table 200 illustrated in FIG. 5. In this case, the transmitting device information acquiring unit 2040 transmits a DNS query indicating host1.site1.example.com. as an FQDN to the information providing device 3000. As a result, the transmitting device information acquiring unit 2040 acquires "a whitelist of E-mail destinations" indicated in the first row of the communication device information table 200 as the communication device information corresponding to the transmitting device 4000.

There are various ways to store the communication device information in the information providing device 3000. For example, the information providing device 3000 receives an input of the communication device information corresponding to the communication device from the communication device. Alternatively, for example, the communication device information may be input by an administrator of the information providing device 3000.

Examples illustrating specific operations of the receiving device 2000 will be described below. In all of the examples described below, the information providing device 3000 is a DNS server.

FIRST EXAMPLE

An example in which the receiving device 2000 receives a packet directed to the receiving device 2000 will be given as a first example. In the first example, the receiving device 2000 is a service providing server (for example, a Web server, a mail server, or the like) that provides services to the transmitting device 4000. The transmitting device 4000 is a client that receives services from the receiving device 2000. It is assumed here that the transmitting device 4000 knows the FQDN of the receiving device 2000 but does not know the IP address of the receiving device 2000.

Figure 6:
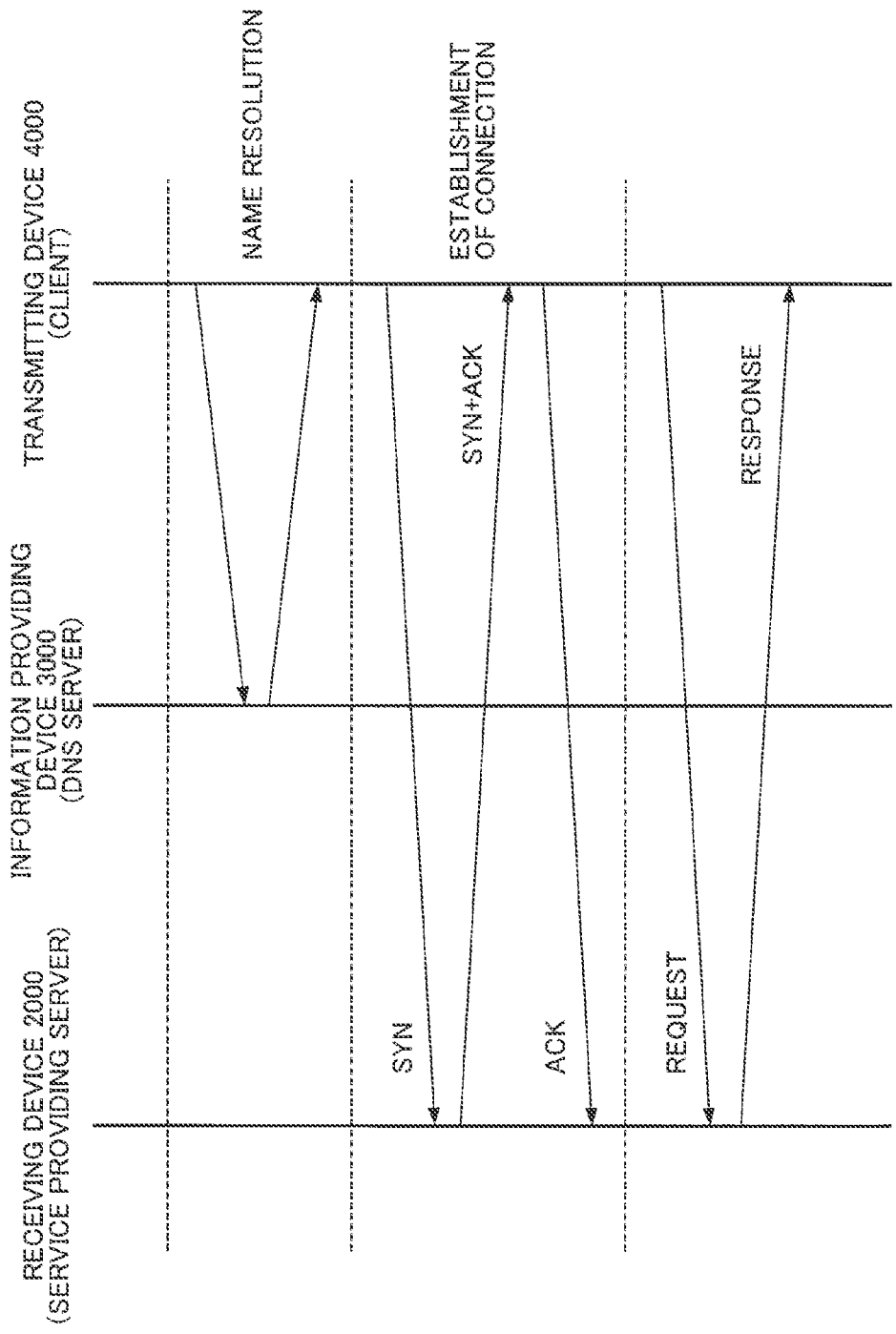
[FIG. 6] a diagram illustrating an exemplary flow of communication in a case in which the receiving device operates as an ordinary server in an assumed environment of a first example.

FIG. 6 is a diagram illustrating an exemplary flow of communication in the assumed environment described above in which the receiving device 2000 operates as an ordinary server. It is assumed in FIG. 6 that the receiving device 2000 and the transmitting device 4000 communicate with each other in accordance with the TCP (Transmission Control Protocol) protocol.

First, the transmitting device 4000 performs name resolution for the receiving device 2000 by communicating with a DNS. As a result, the transmitting device 4000 acquires the IP address of the receiving device 2000 from the FQDN of the receiving device 2000. Then, the transmitting device 4000 establishes a TCP connection with the receiving device 2000 in accordance with a 3-way handshake procedure specified in the TCP protocol. After that, the transmitting device 4000 transmits a packet indicating a request to the receiving device 2000. The receiving device 2000 provides a service to the transmitting device 4000 by responding to the request from the transmitting device 4000.

Figure 7:
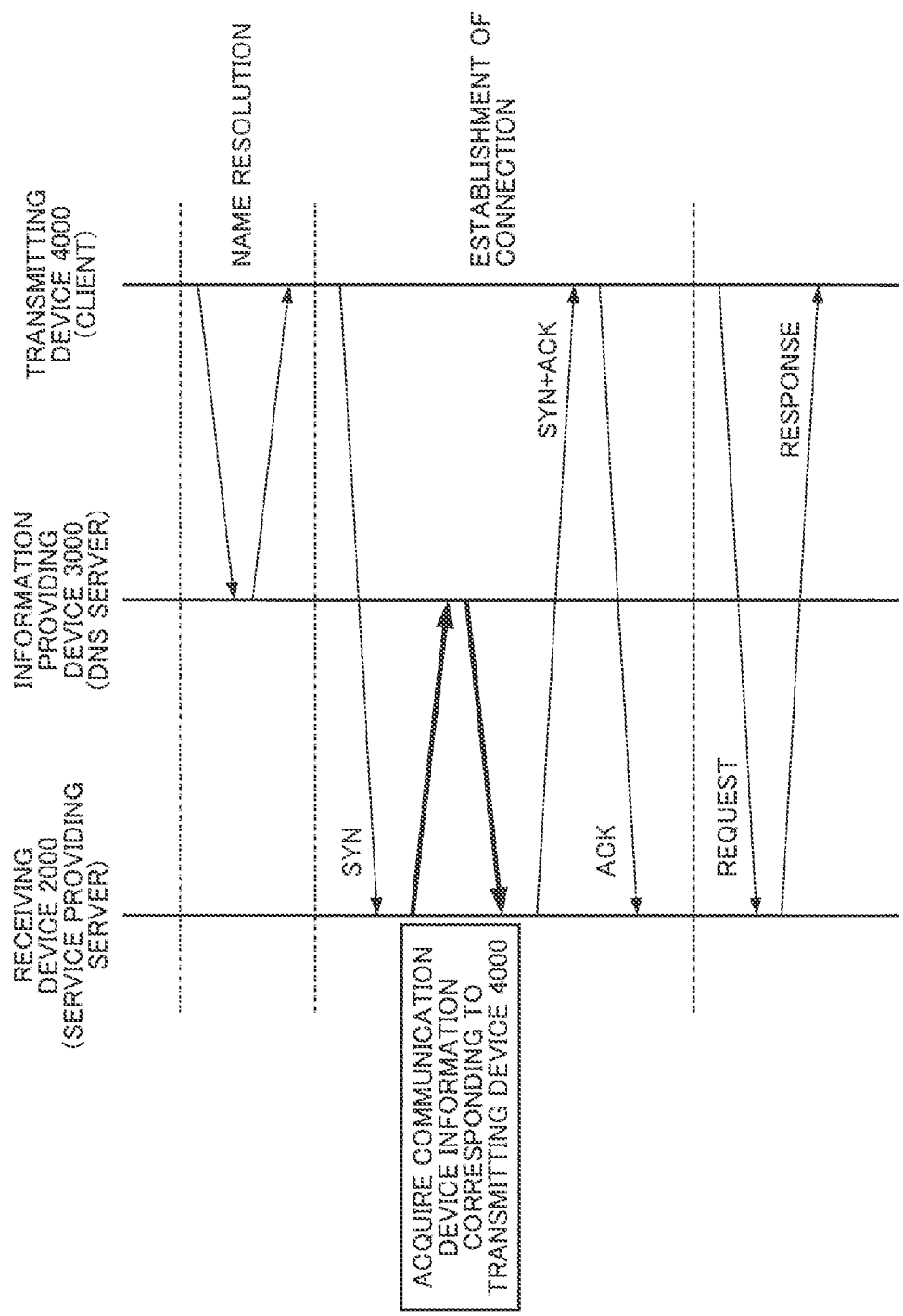
[FIG. 7] a first diagram illustrating an exemplary flow of communication in the first example.

FIG. 7 is a first diagram illustrating an exemplary flow of communication in the first example. The transmitting device 4000, first, performs name resolution for the receiving device 2000. Then, the transmitting device 4000 attempts to establish a TCP connection with the receiving device 2000. Specifically, the transmitting device 4000 transmits a SYN packet to the receiving device 2000.

The receiving device 2000 receives the SYN packet transmitted from the transmitting device 4000. The receiving device 2000 acquires the communication device information corresponding to the transmitting device 4000 from the DNS server, which is an information providing device 3000, on the basis of the received SYN packet. In this way, the receiving device 2000 acquires the communication device information corresponding to the transmitting device 4000 when establishing a TCP connection with the transmitting device 4000. By doing this, the receiving device 2000 can recognize an intention of the user of the transmitting device 4000 before completion of the establishment of the connection with the transmitting device 4000.

Figure 8:
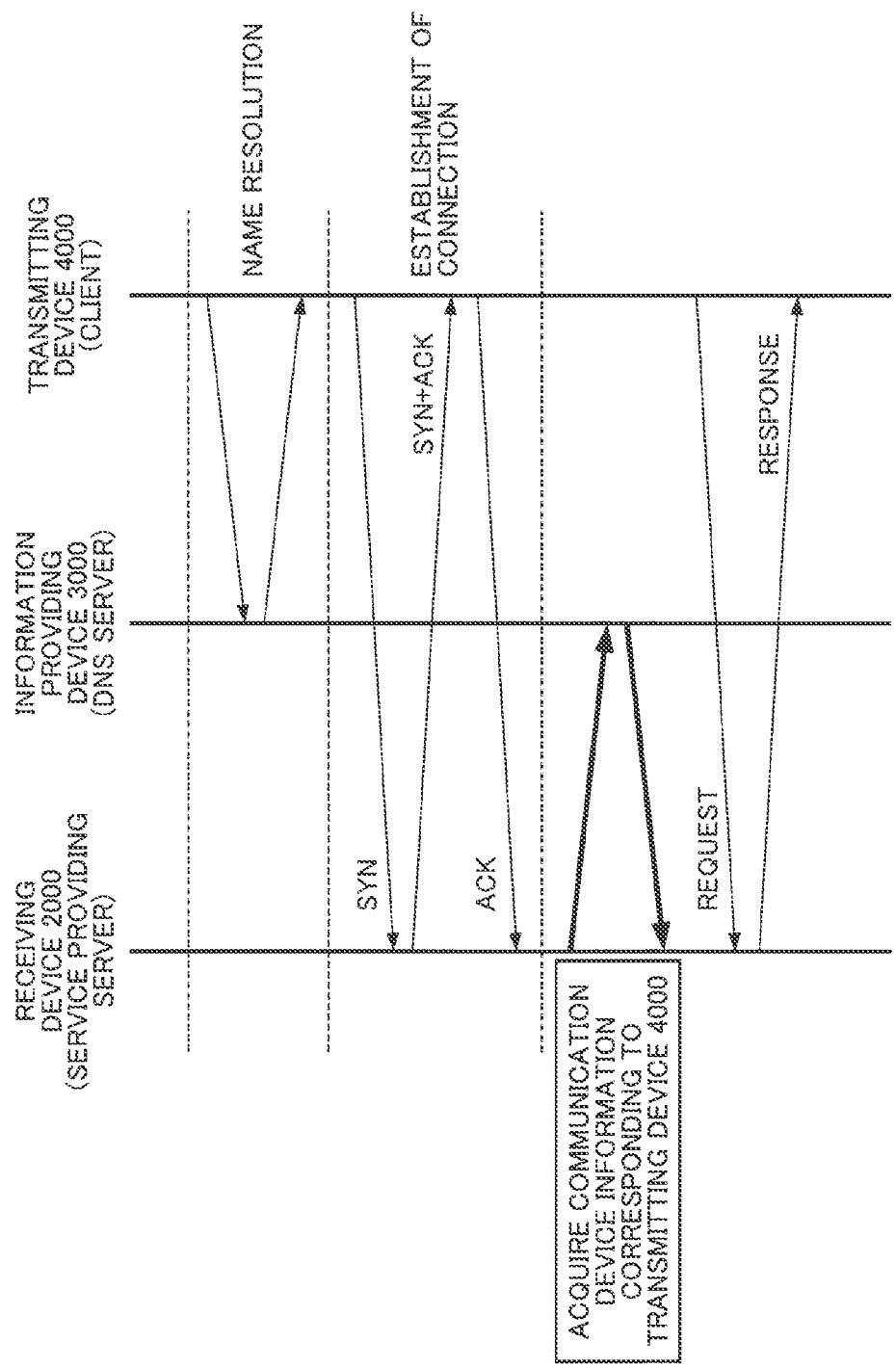
[FIG. 8] a second diagram illustrating an exemplary flow of communication in the first example.

FIG. 8 is a second diagram illustrating an exemplary flow of communication in the first example. In FIG. 8, the receiving device 2000 acquires the communication device information corresponding to the transmitting device 4000 after establishment of a connection.

Figure 9:
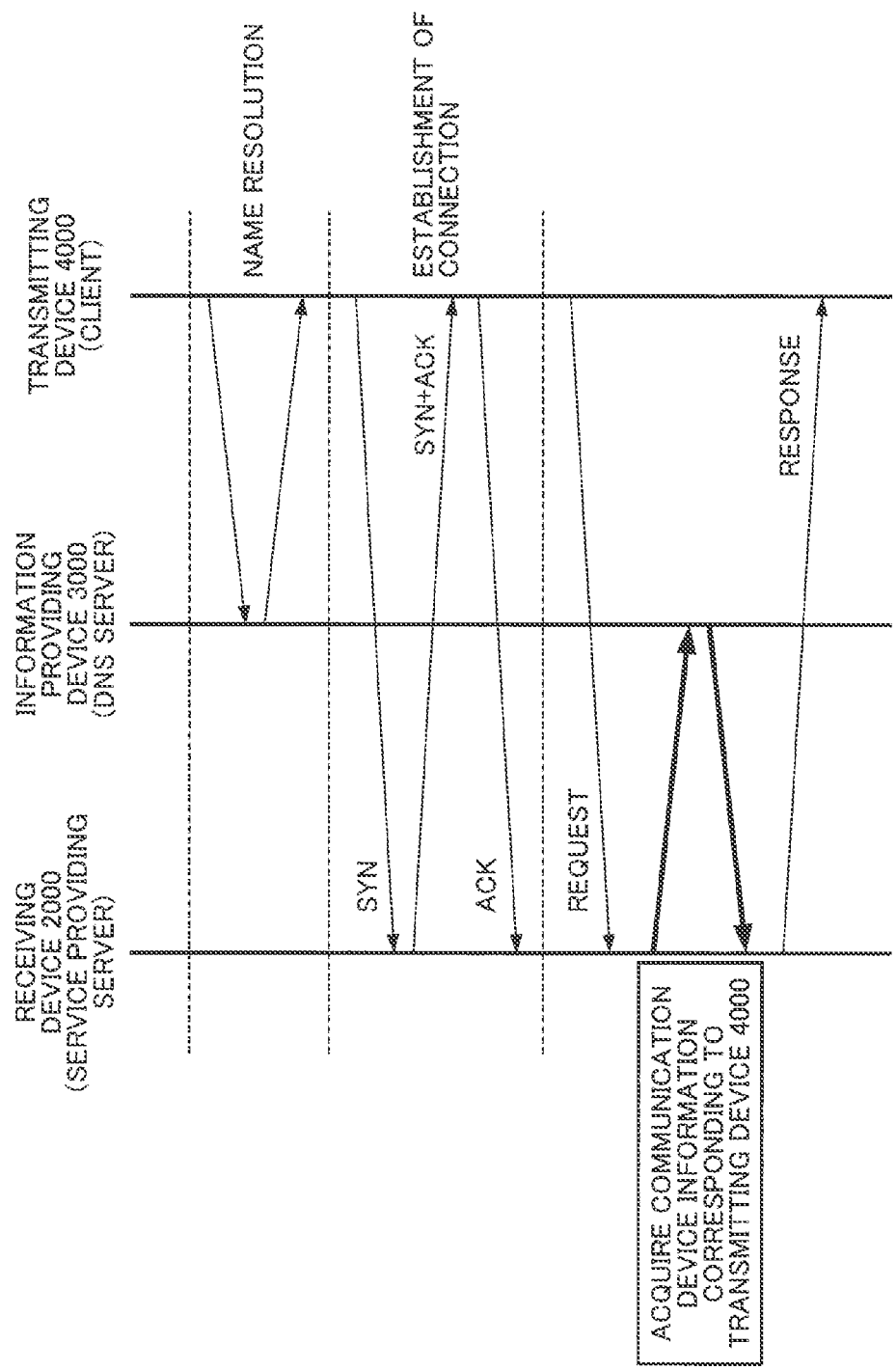
[FIG. 9] a third diagram illustrating an exemplary flow of communication in the first example.

FIG. 9 is a third diagram illustrating an exemplary flow of communication in the first example. In FIG. 9, on receiving a packet from the transmitting device 4000 after establishment of a connection, the receiving device 2000 acquires the communication device information corresponding to the transmitting device 4000. The packet received from the transmitting device 4000 after the establishment of the connection is a packet indicating a request transmitted from the transmitting device 4000 to the receiving device 2000, for example.

The receiving device 2000 may acquire the communication device information corresponding to the transmitting device 4000 on each time when the receiving device 2000 receives a packet from the transmitting device 4000. For example, on each time receiving a packet indicating a request from the transmitting device 4000, the receiving device 2000 acquires the communication device information of the transmitting device 4000 that relates to the request from the information providing device 3000. By doing this, the receiving device 2000 can recognize an intention of the user of the transmitting device 4000 in response to the request received from the transmitting device 4000.

Figure 10:
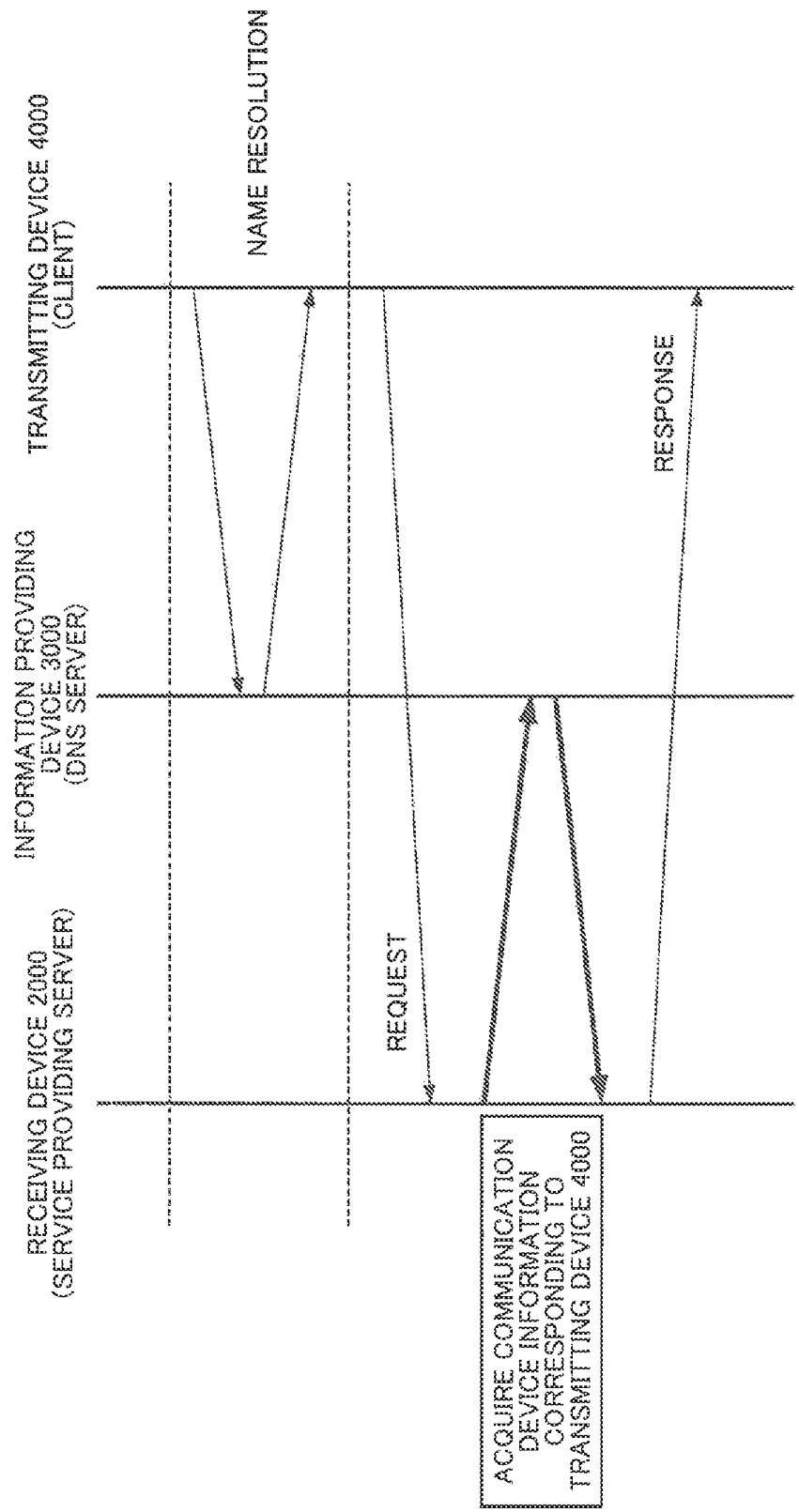
[FIG. 10] a fourth diagram illustrating an exemplary flow of communication in the first example.

FIG. 10 is a fourth diagram illustrating an exemplary flow of communication in the first example. In FIG. 10, the receiving device 2000 and the transmitting device 4000 communicate with each other without establishing a TCP connection. For example, the receiving device 2000 and the transmitting device 4000 communicate in accordance with the UDP (User Datagram Protocol) protocol. In FIG. 10, the receiving device 2000 acquires the communication device information corresponding to the transmitting device 4000 from the information providing device 3000 on receiving a packet from the transmitting device 4000.

SECOND EXAMPLE

An example in which the packet receiving unit 2020 receives a packet directed to a destination device described above will be given as a second example. As above-mentioned, the destination device is a communication device different from the receiving device 2000. In the second example, the destination device is a server that provides services to the transmitting device 4000. The transmitting device 4000 is a client that receives services from the destination device. The receiving device 2000 is a proxy server which relays communication between the transmitting device 4000 and the destination device. It is assumed here that the transmitting device 4000 knows the FQDN of the destination device but does not know the IP address of the destination device.

Figure 11:
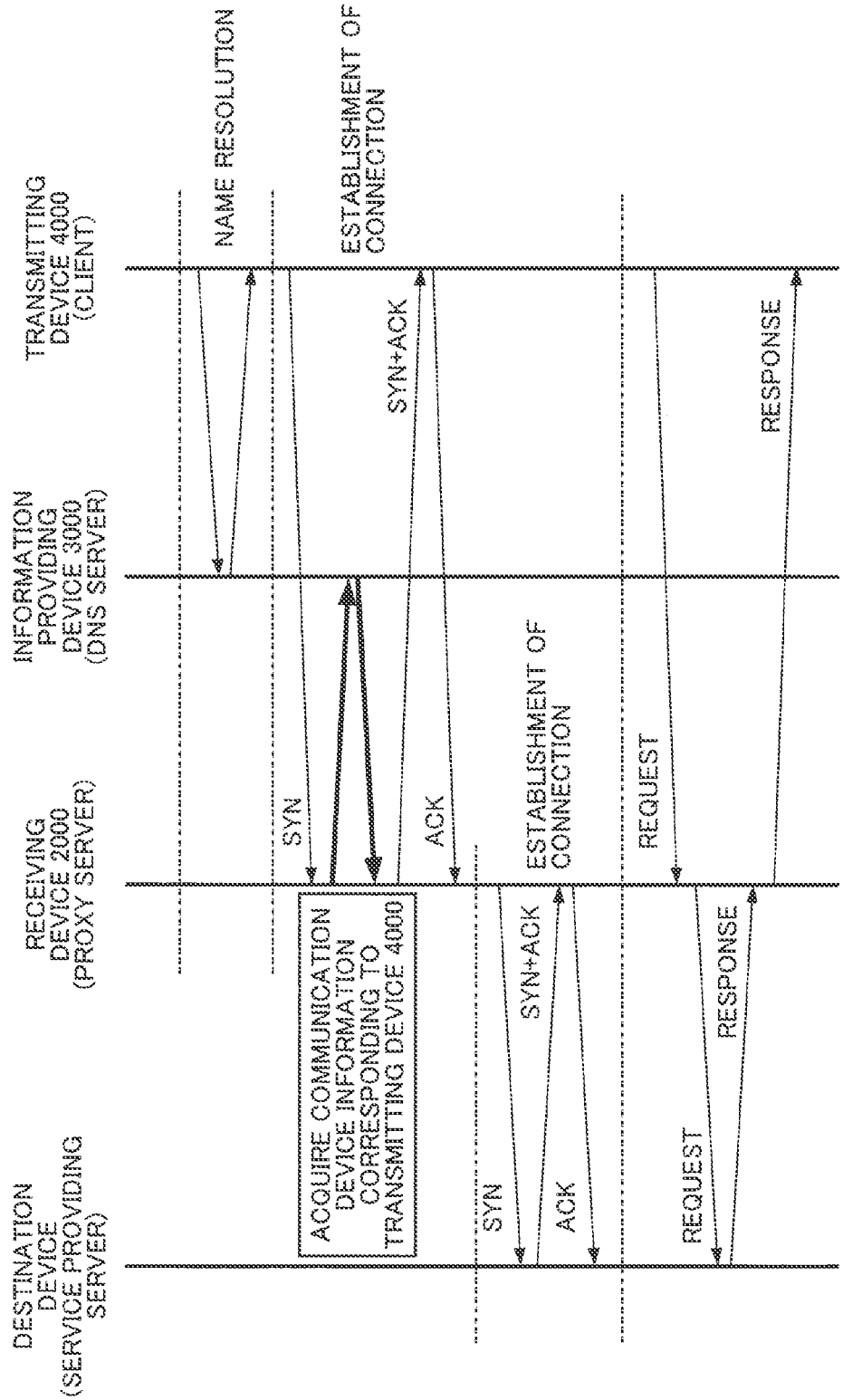
[FIG. 11] a diagram illustrating an exemplary flow of communication in a second example.

FIG. 11 is a diagram illustrating an exemplary flow of communication in the second example. First, the transmitting device 4000 performs name resolution for the destination device by using the information providing device 3000 as a DNS server. As a result, the transmitting device 4000 acquires an IP address of the destination device. Then, the transmitting device 4000 attempts to establish a TCP connection with the receiving device 2000. Specifically, the transmitting device 4000 transmits a SYN packet to the receiving device 2000. As the case in FIG. 7 in the first example, on receiving the SNY packet, the receiving device 2000 acquires the communication device information corresponding to the transmitting device 4000. By doing this, the receiving device 2000 can recognize an intention of the user of the transmitting device 4000 before the receiving device 2000 relays communication between the transmitting device 4000 and the receiving device 2000.

As the case in FIG. 8 in the first example, the receiving device 2000 may acquire the communication device information corresponding to the transmitting device 4000 when the establishment of the TCP connection with the transmitting device 4000 is completed. Alternatively, as the case in FIG. 9 in the first example, the receiving device 2000 may acquire the communication device information corresponding to the transmitting device 4000 on receiving a packet from the transmitting device 4000 after the establishment of connection. Furthermore, as the case in FIG. 10 in the first example, the receiving device 2000 does not need to establish a connection with the transmitting device 4000. In this case, as the case in FIG. 10 in the first example, the receiving device 2000 acquires the communication device information corresponding to the transmitting device 4000 from the information providing device 3000 on receiving a packet from the transmitting device 4000.

THIRD EXAMPLE

An example in which the packet receiving unit 2020 receives a request for name resolution will be given as a third example. In the third example, the receiving device 2000 is an override agent which receives a packet transmitted from the transmitting device 4000 to a DNS server. The transmitting device 4000 requests the DNS server to perform name resolution for a name resolution target device. The name resolution target device is a server that provides services to the transmitting device 4000. The transmitting device 4000 is a client that receives services from the name resolution target device. It is assumed that the transmitting device 4000 knows the FQDN of the name resolution target device but does not know the IP address of the name resolution target device.

Figure 12:
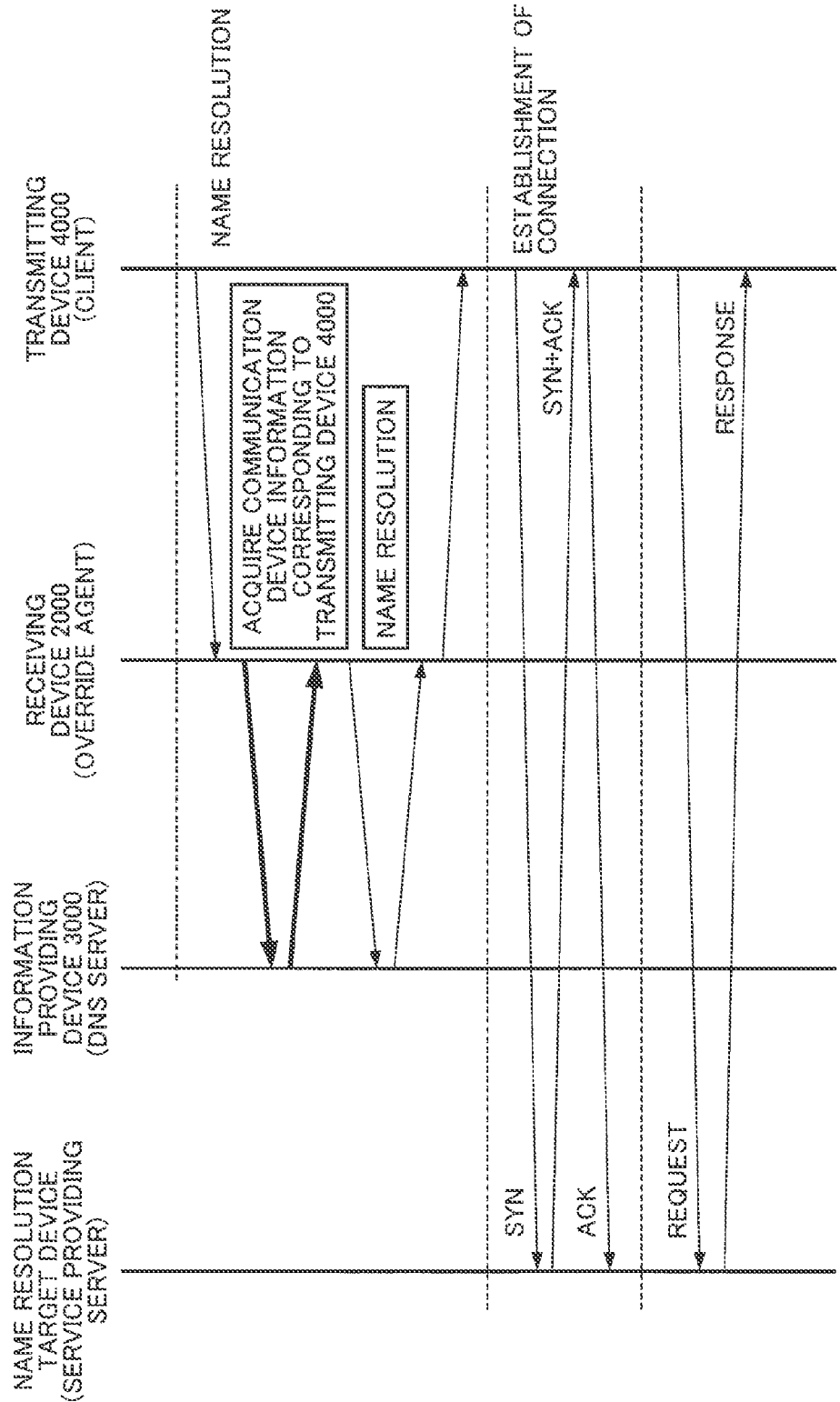
[FIG. 12] a diagram illustrating an exemplary flow of communication in a third example.

FIG. 12 is a diagram illustrating an exemplary flow of communication in the third example. The transmitting device 4000 transmits a packet representing a request for name resolution for the name resolution target device to the DNS server. The receiving device 2000 receives the packet. On receiving the packet, the receiving device 2000 acquires the communication device information corresponding to the transmitting device 4000 from the information providing device 3000 which is the DNS server. The receiving device 2000 requests the DNS server to perform name resolution for the name resolution target device. The timing when the receiving device 2000 requests the DNS server to perform name resolution for the name resolution target device is good before or after the acquisition of the communication device information from the information providing device 3000.

As described in each of the examples given above, the receiving device 2000 adds a new procedure, i.e. "the receiving device 2000 acquires the communication device information concerning the transmitting device 4000", to the communication procedure performed when the transmitting device 4000 communicates with another communication device. In this way, the receiving device 2000 provides a new protocol that is used in communication between communication devices.

<Actions and Effects>

By the configuration described above, the receiving device 2000 according to this exemplary embodiment acquires the communication device information corresponding to the transmitting device 4000 that transmits a packet. As a result, the receiving device 2000 can recognize an intention of the user using the transmitting device 4000 on the basis of the acquired communication device information corresponding to the transmitting device 4000.

For example, it is assumed that the communication device information corresponding to the transmitting device 4000 indicates HTTP over SSL/TLS as a communication protocol that may be used for Web access and indicates HTTP as a communication protocol that must not be used. HTTP over SSL/TLS is a communication protocol that prevents eavesdropping and spoofing by performing encryption of a message or the like by using SSL/TLS. Accordingly, this communication device information indicates the intention of the user of the transmitting device 4000 as "want to access Web by a high secure method". In this way, the receiving device 2000 can recognize the user's intention as "want to access Web by a high secure method".

As another method to recognize an intention of the user of the transmitting device 4000, a method, which presumes an intention of the user of the transmitting device 4000 by monitoring the status of the transmitting device 4000 externally, is considered. For example, it is assumed that an echo reply message is returned from the transmitting device 4000 when transmitting an echo request message specified in the ICMPv6 (Internet Control Message Protocol for IPv6) protocol to the transmitting device 4000. The reply indicates that the transmitting device 4000 is capable of communication that uses the IPv6 protocol.

However, it is difficult to accurately recognize an intention of the user of the transmitting device 4000 by the method of presuming the intention of the user of the transmitting device 4000. For example, in the example described above, even if the transmitting device 4000 can use the IPv6 protocol, the user of the transmitting device 4000 does not necessarily hope communication to use the IPv6 protocol. For example, a certain type of OS is configured to acquire both of an IPv4 address and an IPv6 address upon activation of the OS by default. However, the IP address used by a user in actual communication is typically an IPv4 address under the present circumstances. The user does not often know that an IPv6 address is assigned to a communication device.

As above, it is difficult to accurately recognize an intention of the user of the transmitting device 4000 by the method which presumes an intention of the user of the transmitting device 4000 by monitoring the status of the transmitting device 4000. By recognizing the intention of the user using the transmitting device 4000 by using the communication device information, the receiving device 2000 can accurately recognize the intention of the user of the transmitting device 4000.

Furthermore, When a DNS server is used as the information providing device 3000, there are following many advantages. A first advantage is that the information providing device 3000 can store the communication device information corresponding to various types of communication devices without modifying the communication devices. Generally, a communication device that communicates through a network has an IP address and an FQDN. A DNS server has the function of storing information in association with an IP address and FQDN of a communication device. Accordingly, when the DNS server is used as the information providing device 3000, the information providing device 3000 can store the communication device information corresponding to each communication device without modifying the communication device.

A second advantage is that the reliability of the information providing device 3000 is increased. DNS is an established system as an infrastructure of the Internet. Accordingly, it can be said that DNS is strong compared with systems such as databases. Consequently, by using a DNS server as the information providing device 3000, the reliability of the information providing device 3000 is increased.

A third advantage is that the location in which the communication device information is stored can be easily identified. For example, when a database server is used as the information providing device 3000, the receiving device 2000 needs to know the IP address or the FQDN of the information providing device 3000 beforehand. Furthermore, when there is a plurality of information providing devices 3000, the receiving device 2000 needs to know beforehand which of the information providing devices 3000 stores information related to each communication device.

In contrast, when a DNS server is used as the information providing device 3000, the communication device information can be acquired from the information providing device 3000 without knowledge of the IP address and FQDN of the information providing device 3000. This is because in the DNS, a system, in which a DNS server that holds the requested information is automatically found by exchange of information between the DNS servers if acquisition of information is requested to any of the DNS servers, is established.

A fourth advantage is the clarity of whereabouts of responsibility for management of information. The DNS is made as a mechanism which is managed in units called zones and to which an administrator of each zone is explicitly registered. Accordingly, by using a DNS server as the information providing device 3000, it is made clear that the whereabouts of responsibility for management of each of the communication device information lies with the administrator of the zone in which the communication device information is stored. Thus, the whereabouts of responsibility for management of information is clarified by using DNS as the information providing device 3000.

A fifth advantage is that the communication device information that is common to a plurality of communication devices can be easily stored. This is because the DNS manages information by using a hierarchical structure. For example, it is assumed that there are communication device 1 having an FQDN of "host1.site1.example.com." and a communication device 2 having an FQDN of "host2.site1.example.com.". To the two above-mentioned FQDNs, a high ranking hierarchy of "example.com." is common.

Then, the communication device information that is common to the two above-mentioned communication devices is stored in association with the FQDN of "example.com.". When searching information by using DNS at this time, the search is successively performed from the high raking hierarchy. Accordingly, when searching the communication device information corresponding to the communication device 1, and when the communication device information corresponding to the communication device 2, the hierarchy of "example.com." is found.

In this way, in the DNS, a common search location is provided corresponding to a plurality of FQDNs. For this reason, by using a DNS server as the information providing device 3000, the communication device information that is common to a plurality of communication devices can be easily stored. The communication device information which is common to a plurality of communication devices can be treated as a default value common to each of the communication device information, for example.

Second Exemplary Embodiment

Figure 13:
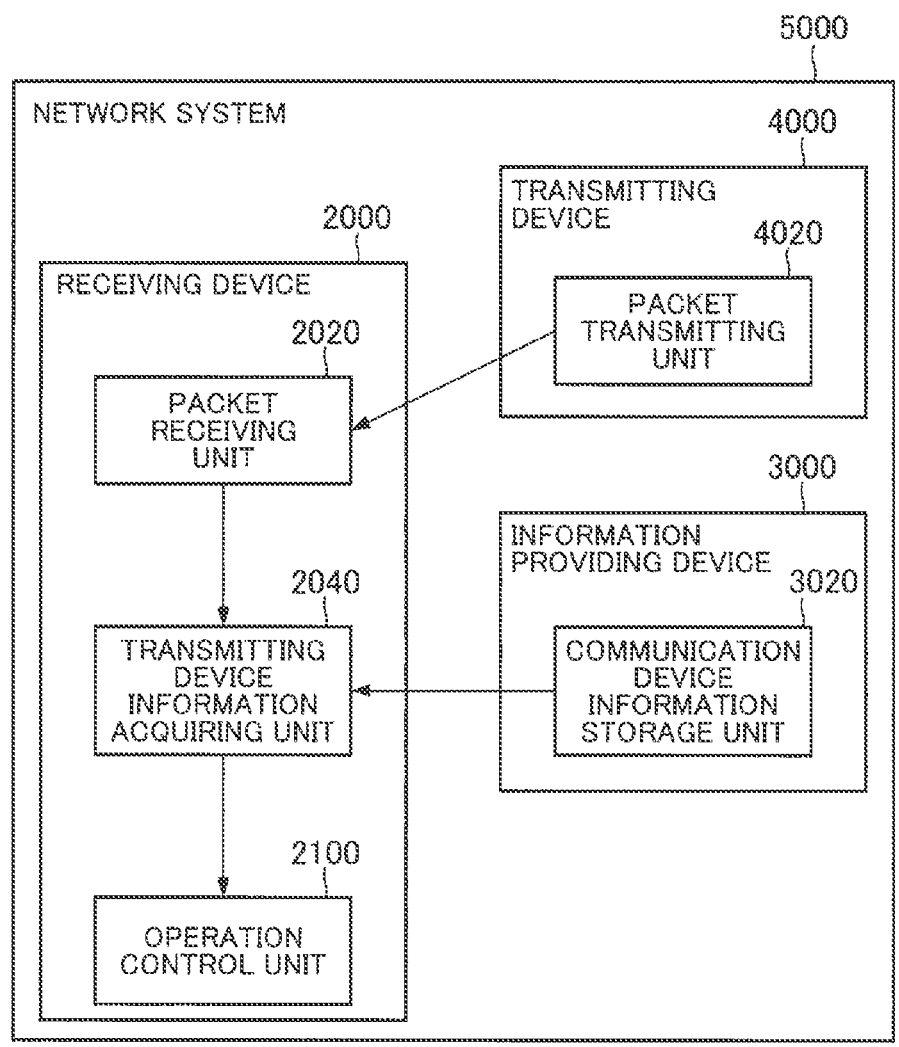
[FIG. 13] a block diagram illustrating a receiving device according to a second exemplary embodiment together with an environment in which the receiving device is used.

FIG. 13 is a block diagram illustrating a receiving device 2000 according to a second exemplary embodiment together with an environment in which the receiving device 2000 is used. In FIG. 13, the arrows indicate flows of information. In FIG. 13, each of the blocks represents a configuration of functional unit rather than a configuration of hardware unit. The receiving device 2000, an information providing device 3000, and a transmitting device 4000 according to the second exemplary embodiment are respectively similar to the receiving device 2000, the information providing device 3000 and the transmitting device 4000 in the first exemplary embodiment, except matters in the following description.

<Operation Control Unit 2100>

The receiving device 2000 includes an operation control unit 2100. The operation control unit 2100 controls operations performed by the receiving device 2000 to the transmitting device 4000 on the basis of the communication device information acquired from the information providing device 3000.

For example, it is assumed that the communication device information represents a list of communication devices with which the transmitting device 4000 may communicate. In this case, the operation control unit 2100 determines whether or not a communication partner with which the transmitting device 4000 is attempting to communicate (for example a destination of a packet) is included in the list of the communication devices with which the transmitting device 4000 may communicate. When the communication partner with which the transmitting device 4000 is attempting to communicate is not included in the list of the communication devices with which the transmitting device 4000 may communicate, for example, the receiving device 2000 discards a packet transmitted from the transmitting device 4000 or returns an error response to the transmitting device 4000. As a result, the transmitting device 4000 can only communicate with the communication partner indicated in the communication device information. By restriction of communication devices, for example, it can be achieved to perform parental control, prevention of erratic delivery of mail, prevention of the damage expansion in a case of take-over of a communication device by a third party, or the like.

Alternatively, for example, it is assumed that the communication device information represents a list of communication protocols that the transmitting device 4000 may use. In this case, the operation control unit 2100 determines whether or not a communication protocol used by the transmitting device 4000 is included in the list of communication protocols that the transmitting device 4000 may use. When the communication protocol used by the transmitting device 4000 is not included in the list of the communication protocols that the transmitting device 4000 may use, for example, the receiving device 2000 discards a packet transmitted from the transmitting device 4000 or returns an error response to the transmitting device 4000. On the other hand, when the communication protocol used by the transmitting device 4000 is included in the list of the communication protocols that the transmitting device 4000 may use, for example, the receiving device 2000 returns a normal response to the transmitting device 4000. In this way, the transmitting device 4000 can only communicate by using permitted communication protocols. For example, Security can be improved by allowing only communication protocols that attend encrypted communication.

<Flow of Processing>

Figure 14:
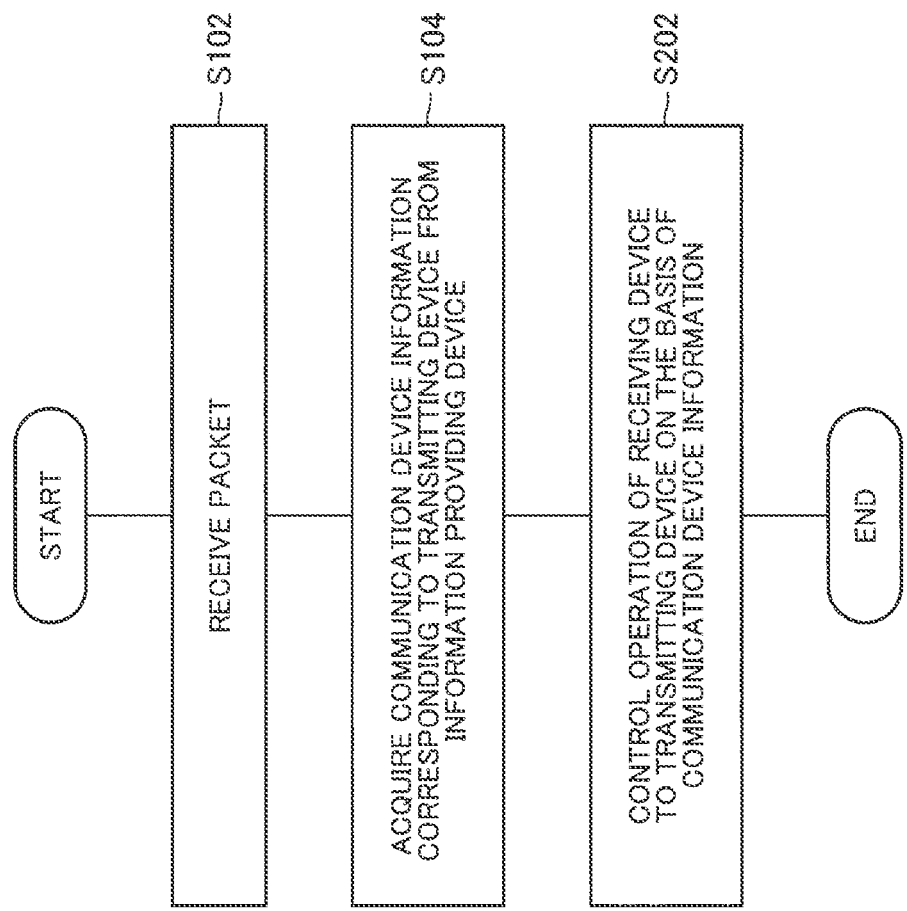
[FIG. 14] a flowchart illustrating an exemplary flow of processing performed by the receiving device according to the second exemplary embodiment.

FIG. 14 is a flowchart illustrating an exemplary flow of processing performed by the receiving device 2000 according to the second exemplary embodiment. In FIG. 14, Steps S102 and S104 are similar to steps S102 and S104 in FIG. 4.

At step S202, the operation control unit 2100 controls an operation performed by the receiving device 2000 to the transmitting device 4000 on the basis of the communication device information corresponding to the transmitting device 4000.

Hereinafter, an operation of the receiving device 2000 according to the second exemplary embodiment will be described by using examples.

FOURTH EXAMPLE

An example in which the packet receiving unit 2020 receives a packet directed to the receiving device 2000 is given as a fourth example. An assumed environment in the fourth example is a similar assumed environment in the first example described in the first exemplary embodiment. Furthermore, in the fourth example, it is also assumed that the communication device information, which is corresponding to the transmitting device 4000 and stored in the information providing device 3000, represents a whitelist of communication devices from which the transmitting device 4000 may receive services.

Figure 15:
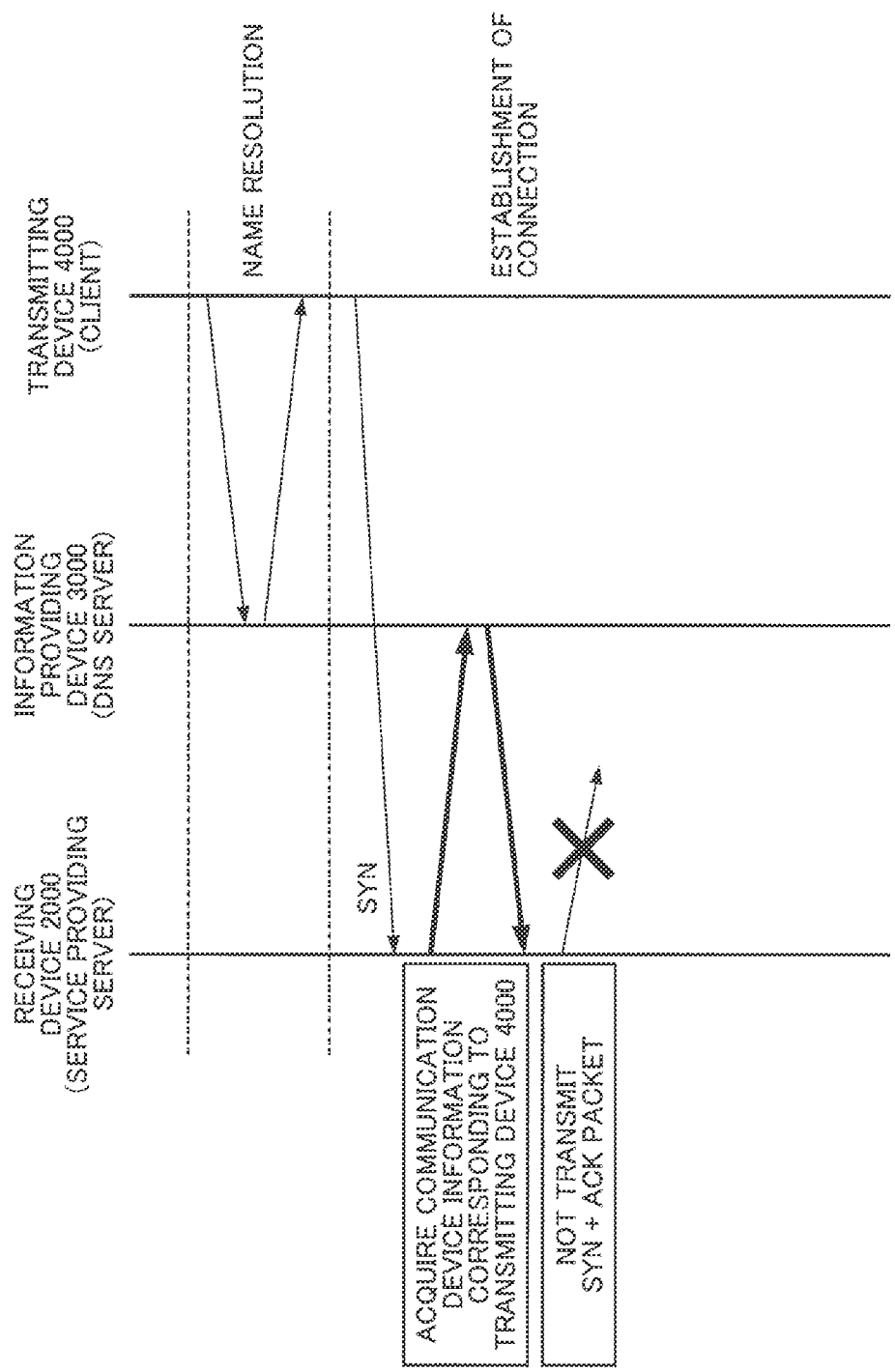
[FIG. 15] a fourth diagram illustrating an exemplary flow of communication in a fourth example.

FIG. 15 is a diagram illustrating an exemplary flow of communication in the fourth example. On receiving a SYN packet from the transmitting device 4000, the receiving device 2000 acquires the communication device information corresponding to the transmitting device 4000 from a DNS server which is the information providing device 3000. Then, the operation control unit 2100 of the receiving device 2000 controls the operation performed by the receiving device 2000 to the transmitting device 4000 on the basis of the communication device information received by the transmitting device information acquiring unit 2040.

It is assumed here that the receiving device 2000 is not included in the whitelist represented by the communication information corresponding to the transmitting device 4000. In this case, for example, the operation control unit 2100 of the receiving device 2000 does not transmit a SYN+ACK packet to the transmitting device 4000 by controlling the receiving device 2000. As a result, because a TCP connection is not established between the transmitting device 4000 and the receiving device 2000, the transmitting device 4000 cannot be provided services from the receiving device 2000. On the other hand, when the receiving device 200 is included in the above-mentioned whitelist, the receiving device 2000 transmits a SYN+ACK packet to the transmitting device 4000. In this way, the receiving device 2000 controls an operation to the transmitting device 4000 in accordance with an intention of the user of the transmitting device 4000 indicated in the communication device information.

FIFTH EXAMPLE

An example in which a destination for a packet received by the packet receiving unit 2020 is the destination device described above is given as a fifth example. In the fifth example, the transmitting device 4000 is a mail client, and the destination device is a mail server. It is assumed that the receiving device 2000 is an MTA. It is also assumed that the communication device information which is corresponding to the transmitting device 4000 and stored in the information providing device 3000 is information representing a whitelist which is a list of communication partners to which the transmitting device 4000 may transmit mail.

Figure 16:
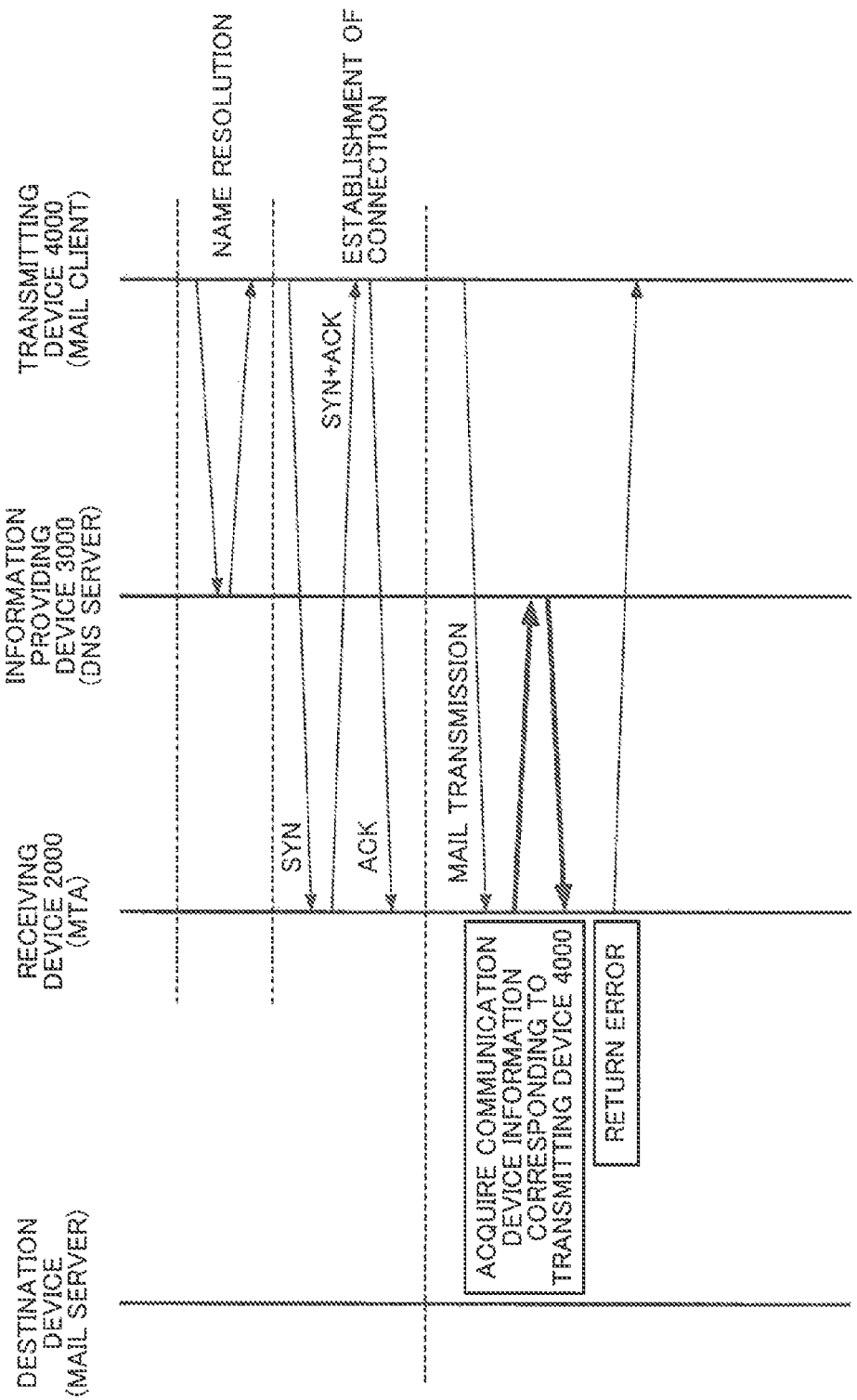
[FIG. 16] a diagram illustrating an exemplary flow of communication in a fifth example.

FIG. 16 is a diagram illustrating an exemplary flow of communication in the fifth example. After a TCP connection with the transmitting device 4000 is established, the packet receiving unit 2020 of the receiving device 2000 receives a packet representing a request for mail transmission from the transmitting device 4000.

The transmitting device information acquiring unit 2040 of the receiving device 2000 receives the communication device information corresponding to the transmitting device 4000 from the information providing device 3000. The operation control unit 2100 of the receiving device 2000 determines whether or not the destination of the mail transmitted from the transmitting device 4000 is included in the whitelist indicated by the communication device information corresponding to the transmitting device 4000.

When the destination of the mail transmitted from the transmitting device 4000 is not included in the whitelist, the operation control unit 2100 makes the receiving device 2000 perform an error notification to the transmitting device 4000. On the other hand, when the destination of the mail transmitted from the transmitting device 4000 is included in the whitelist, the operation control unit 2100 makes the receiving device 2000 process the request for mail transmission received from the transmitting device 4000 as a valid request.

SIXTH EXAMPLE

An example in which the packet receiving unit 2020 receives a request for name resolution transmitted from the transmitting device 4000 will be illustrated as a sixth example. The receiving device 2000 is an override agent which receives a packet representing a request for name resolution transmitted from the transmitting device 4000 to a DNS server. The transmitting device 4000 requests the DNS server to perform name resolution for a name resolution target device. The name resolution target device is a server that provides services to the transmitting device 4000, and the transmitting device 4000 is a client that receives services from the name resolution target device. It is assumed that the communication device information indicates IPv6 as an IP protocol that the transmitting device 4000 may use. It is assumed that the transmitting device 4000 knows the FQDN of the name resolution target device but does not know the IP address of the name resolution target device.

Figure 17:
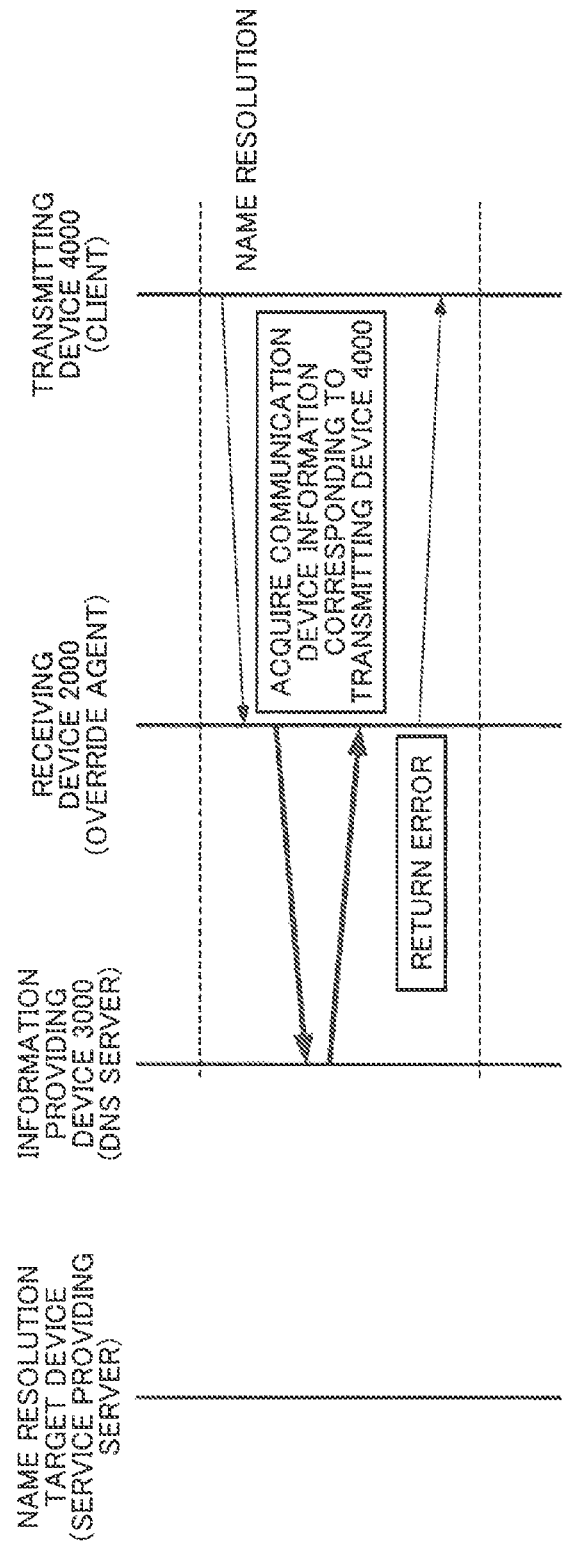
[FIG. 17] a diagram illustrating an exemplary flow of communication in a sixth example.

FIG. 17 is a diagram illustrating an exemplary flow of communication in the sixth example. The transmitting device 4000 transmits a packet representing a request for name resolution to the DNS server. The packet receiving unit 2020 of the receiving device 2000 receives the packet. The transmitting device information acquiring unit 2040 of the receiving device 2000 acquires the communication device information corresponding to the transmitting device 4000 from the information providing device 3000, which is the DNS server.

The operation control unit 2100 of the receiving device 2000 deducts an IP protocol used by the transmitting device 4000. For example, the operation control unit 2100 deducts the IP protocol used by the transmitting device 4000 on the basis of the format of the IP address of the transmitting device 4000. Then, the operation control unit 2100 determines whether or not the IP protocol used by the transmitting device 4000 is an IP protocol that the transmitting device 4000 may use.

It is assumed that the IP protocol used by the transmitting device 4000 is IPv4. In this case, the IP protocol used by the transmitting device 4000 is different from the IP protocol indicated in the communication device information. Therefore, the operation control unit 2100 of the receiving device 2000 makes the receiving device 2000 return an error response indicating the failure of the name resolution to the transmitting device 4000. As a result, the transmitting device 4000 cannot communicate with the server because of not acquiring the IP address of the server which is the name resolution target device.

<Actions and Effects>

With the configuration described above, the receiving device 2000 according to the second exemplary embodiment controls an operation of the receiving device 2000 to the transmitting device 4000 on the basis of the communication device information corresponding to the transmitting device 4000. As a result, the receiving device 2000 can perform the operation that reflects an intention of the user of the transmitting device 4000 to the transmitting device 4000.

<Variation 2-1>

The receiving device 2000 according to the second exemplary embodiment may include the following functions. The receiving device 2000 described below is referred to as a receiving device 2000 according to variation 2-1.

As a precondition, the receiving device 2000 according to variation 2-1 transmits some or all of packets received from the transmitting device 4000 to a destination device, which is a device different from the receiving device 2000. As described above, for example, such the receiving device 2000 is the communication device that relays communication between the transmitting device 4000 and the destination device. There are a proxy server and an MTA as examples of such the communication device.

An operation control unit 2100 according to variation 2-1 controls an operation performed by the receiving device 2000 for the destination device on the basis of the communication device information acquired from the information providing device 3000.

SEVENTH EXAMPLE

An operation of the receiving device 2000 according to variation 2-1 will be described by using a seventh example.

In the seventh example, the transmitting device 4000 is a Web client, and the destination device is a Web server. It is assumed that the receiving device 2000 is a proxy server. It is also assumed that the communication device information which is corresponding to the transmitting device 4000 and stored in the information providing device 3000 indicates information relating with "whether or not a request transmitted from the transmitting device 4000 needs to be encrypted".

Figure 18:
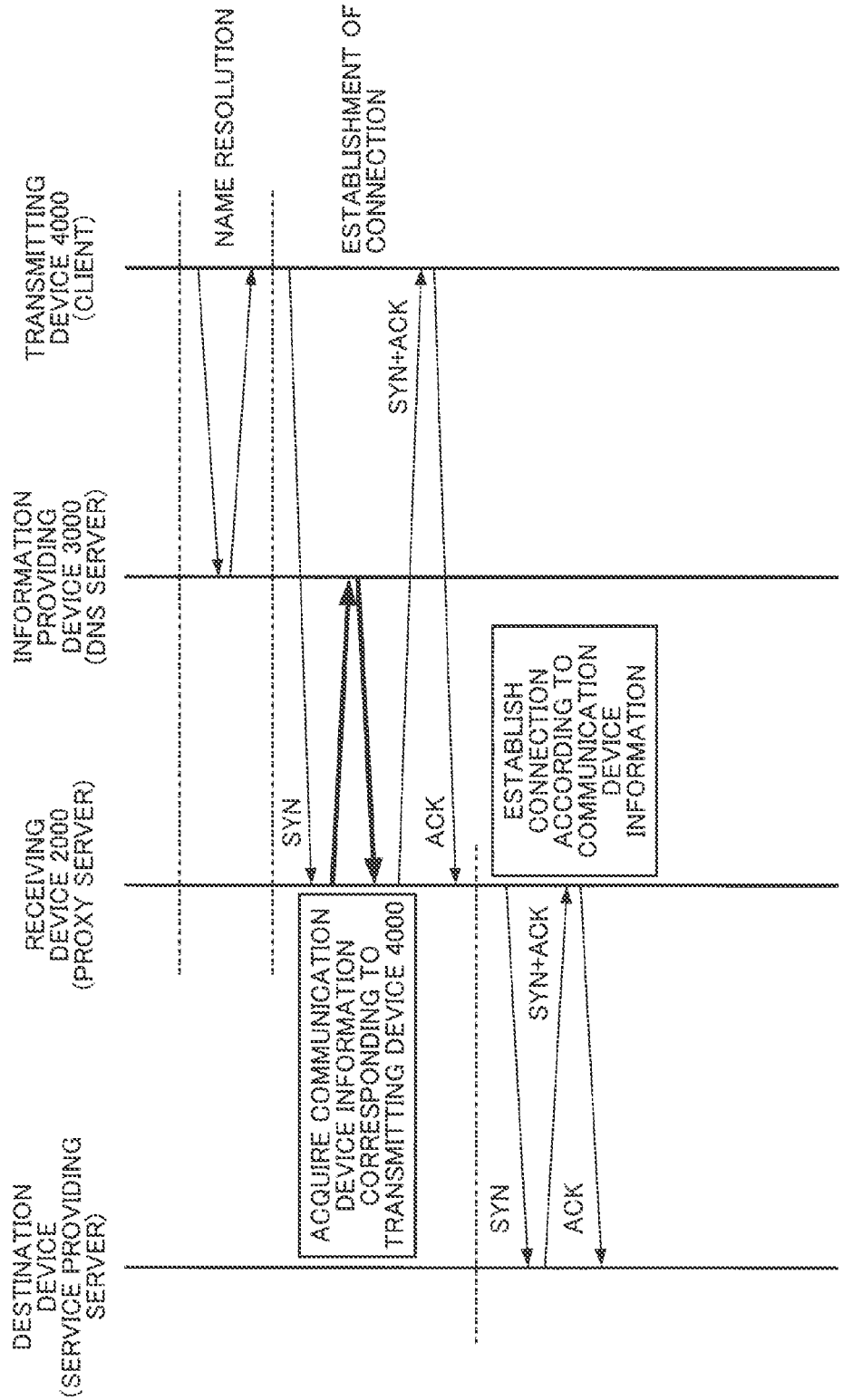
[FIG. 18] a diagram illustrating an exemplary flow of communication in a seventh example.

FIG. 18 is a diagram illustrating an exemplary flow of communication in the seventh example. When establishing a TCP connection with the transmitting device 4000, the receiving device 2000 receives the communication device information corresponding to the transmitting device 4000 from the information providing device 3000.

The operation control unit 2100 of the receiving device 2000 checks the communication device information received from the transmitting device 4000. Here, it is assumed that the communication device information corresponding to the transmitting device 4000 indicates that "a request transmitted from the transmitting device 4000 needs to be encrypted". In this case, the operation control unit 2100 makes the receiving device 2000 perform communication that attends encryption with the destination device. For example, the receiving device 2000 establishes a connection for performing communication using the HTTP over SSL/TLS protocol with the destination device.

On the other hand, it is assumed that the communication device information corresponding to the transmitting device 4000 indicates that "a request transmitted from the transmitting device 4000 does not need to be encrypted". In this case, the operation control unit 2100 makes the receiving device 2000 perform communication that does not attend encryption with the destination device. For example, the receiving device 2000 establishes a connection for performing communication using the HTTP protocol with the destination device.

<Actions and Effects>

With the configuration described above, the receiving device 2000 according to variation 2-1 controls the operation performed by the receiving device 200 to the destination device on the basis of the communication device information corresponding to the transmitting device 4000. Consequently, an intention of the user of the transmitting device 4000 is reflected to the operation performed by the receiving device 2000 to the destination device. Accordingly, the receiving device 2000 according to variation 2-1 can more flexibly perform the operation that is reflected an intention of the transmitting device 4000 as compared with the receiving device 2000 according to the second exemplary embodiment.

Third Exemplary Embodiment

Figure 19:
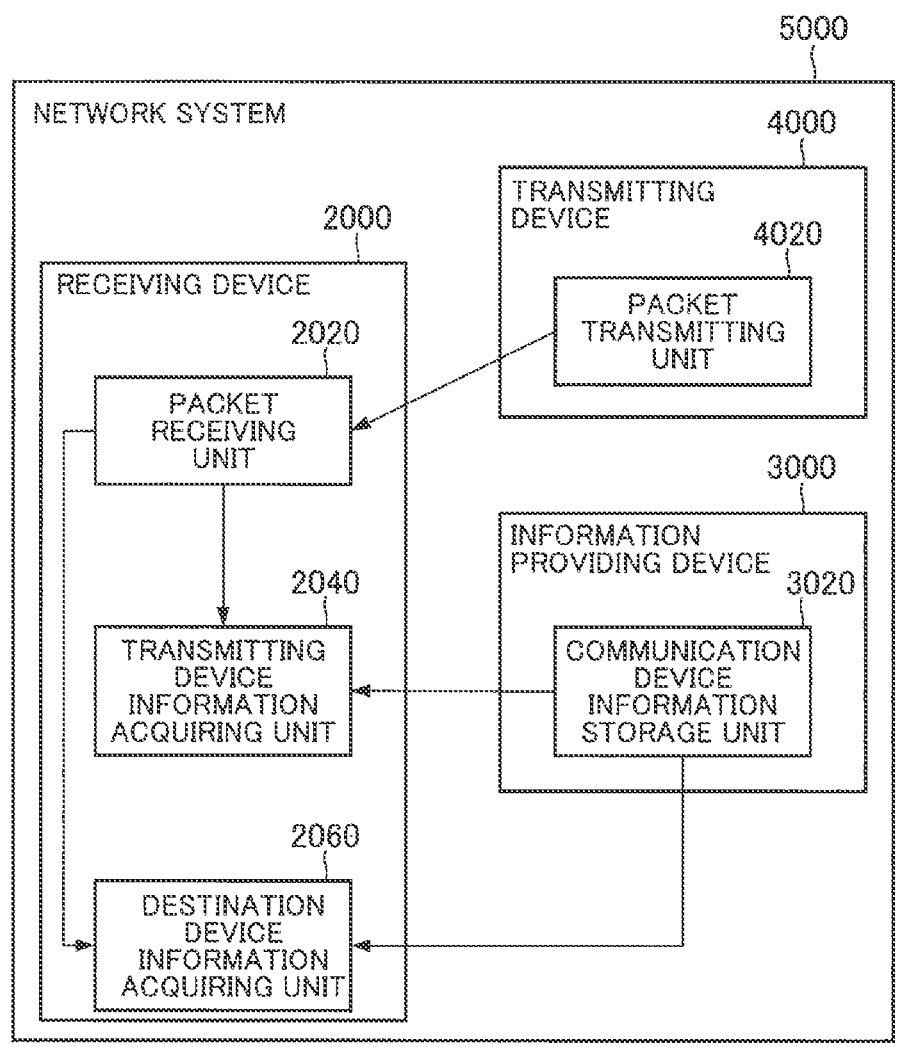
[FIG. 19] a block diagram illustrating a receiving device according to a third exemplary embodiment together with an environment in which the receiving device is used.

FIG. 19 is a block diagram illustrating a receiving device 2000 according to a third exemplary embodiment together with an environment in which the receiving device 2000 is used. In FIG. 19, the arrows represent flows of information. In FIG. 19, each of the blocks represents a configuration of functional unit rather than a configuration of hardware unit. The receiving device 2000, an information providing device 3000, and a transmitting device 4000 according to the third exemplary embodiment are respectively similar to the receiving device 2000, the information providing device 3000 and the transmitting device 4000 according to any of the exemplary embodiments or variations described above, except matters in the following description.

<Preconditions>

The receiving device 2000 according to the third exemplary embodiment transmits some or all of packets received from the transmitting device 4000 to a destination device, which is a device different from the receiving device 2000. As described previously, for example, such a receiving device 2000 is a communication device that relays communication between the transmitting device 4000 and a destination device. As examples of such a communication device, there are a proxy server and an MTA.

<Destination Device Information Acquiring Unit 2060>

The receiving device 2000 according to the third exemplary embodiment includes a destination device information acquiring unit 2060. The destination device information acquiring unit 2060 acquires the communication device information corresponding to the destination device from the information providing device 3000. In this way, the receiving device 2000 according to the third exemplary embodiment includes the function of acquiring the communication device information corresponding to a destination device, in addition to the function of acquiring the communication device information corresponding to the transmitting device 4000.

The destination device information acquiring unit 2060, for example, acquires the destination device information corresponding to the destination device from the information providing device 3000 by using an ID of the destination device. For example, the destination device information acquiring unit 2060 extracts an ID of the destination device from a packet received by the packet receiving unit 2020.

For example, it is assumed that the transmitting device 4000 is a Web client, the destination device is a Web server, and the receiving device 2000 is a proxy server. In this case, the packet received by the receiving device 2000 from the transmitting device 4000 contains the IP address or MAC address of the destination device, which is a Web server that the transmitting device 4000 wants to access. Accordingly, the destination device information acquiring unit 2060 extracts the IP address or the MAC address of the destination device which is contained in the packet received from the transmitting device 4000, as an ID of the destination device. The destination device information acquiring unit 2060 acquires the communication device information corresponding to the destination device from the information providing device 3000 by using the extracted ID of the destination device.

Here, the information providing device 3000 is a DNS server, for example, as described in the first exemplary embodiment. When the information providing device 3000 is a DNS server, the destination device information acquiring unit 2060 transmits a DNS query indicating the FQDN or IP address of the destination device to the information providing device 3000. Then, the destination device information acquiring unit 2060 receives the communication device information corresponding to the destination device from the information providing device 3000 as a response to the DNS query.

The communication device information corresponding to the destination device is, for example, the communication device information described in the first exemplary embodiment or the second exemplary embodiment.

Alternatively, for example, the communication device information corresponding to the destination device is information representing the status of the destination device. For example, the communication device information corresponding to the destination device indicates an operating status of destination device along with the reason why the destination device is in the operating status. An example of such information is information of "the destination device is suspending because of maintenance". By refereeing to this information, the receiving device 2000 can recognize that the destination device is unable to communicate and the reason is maintenance. Furthermore, the receiving device 2000 can grasp that communication with the destination device cannot be performed for a while.

In contrast, when the destination device information is not used, the receiving device 2000, which attempts to communicate with the destination and fails, cannot know the reason why communication with the destination device cannot be performed. Accordingly, for example, the receiving device 2000 cannot know whether the failure of communication with the destination device is temporary or persistent, or the like.

Alternatively, for example, the destination device information is contents of a service provided by the destination device. For example, it is assumed that the destination device is a Web server. In this case, for example, the destination device information concerning the Web server, which is the destination device, is information indicating which Web pages may be crawled to a crawler crawling Web pages.

Alternatively, for example, the destination device information indicates an application used by the destination device, manners for using the destination device, or the like.

[Flow of Processing]

Figure 20:
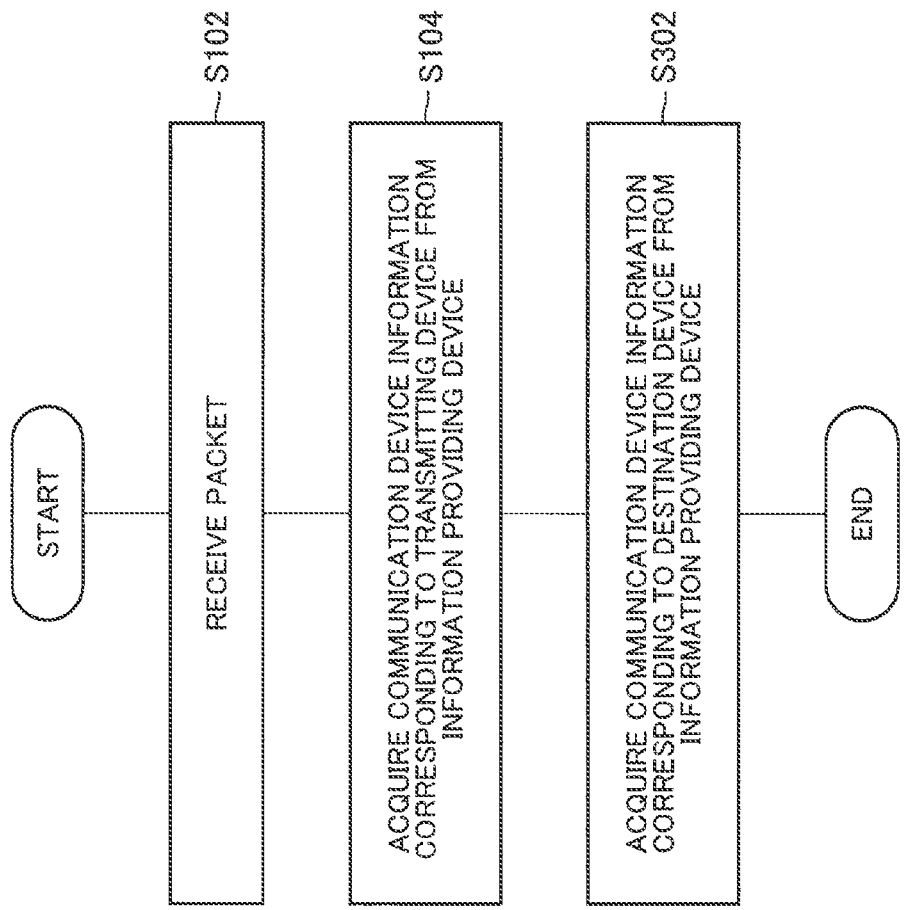
[FIG. 20] a flowchart illustrating an exemplary flow of processing performed by the receiving device according to the third exemplary embodiment.

FIG. 20 is a flowchart illustrating a flow of processing performed by the receiving device 2000 according to the third exemplary embodiment. Steps S102 and S104 in FIG. 20 are similar to steps S102 and S104 in FIG. 4.

At step S302, the destination device information acquiring unit 2060 acquires the communication device information corresponding to the destination device from the information providing device 3000.

EIGHTH EXAMPLE

An exemplary operation of the receiving device 2000 according to the third exemplary embodiment will be given as an eighth example. In the eighth example, the transmitting device 4000 is a mail client and the destination device is a mail server. The receiving device 2000 is an MTA. Information which is corresponding to the destination device and stored in the information providing device 3000 is information indicating the operating status of the destination device.

Figure 21:
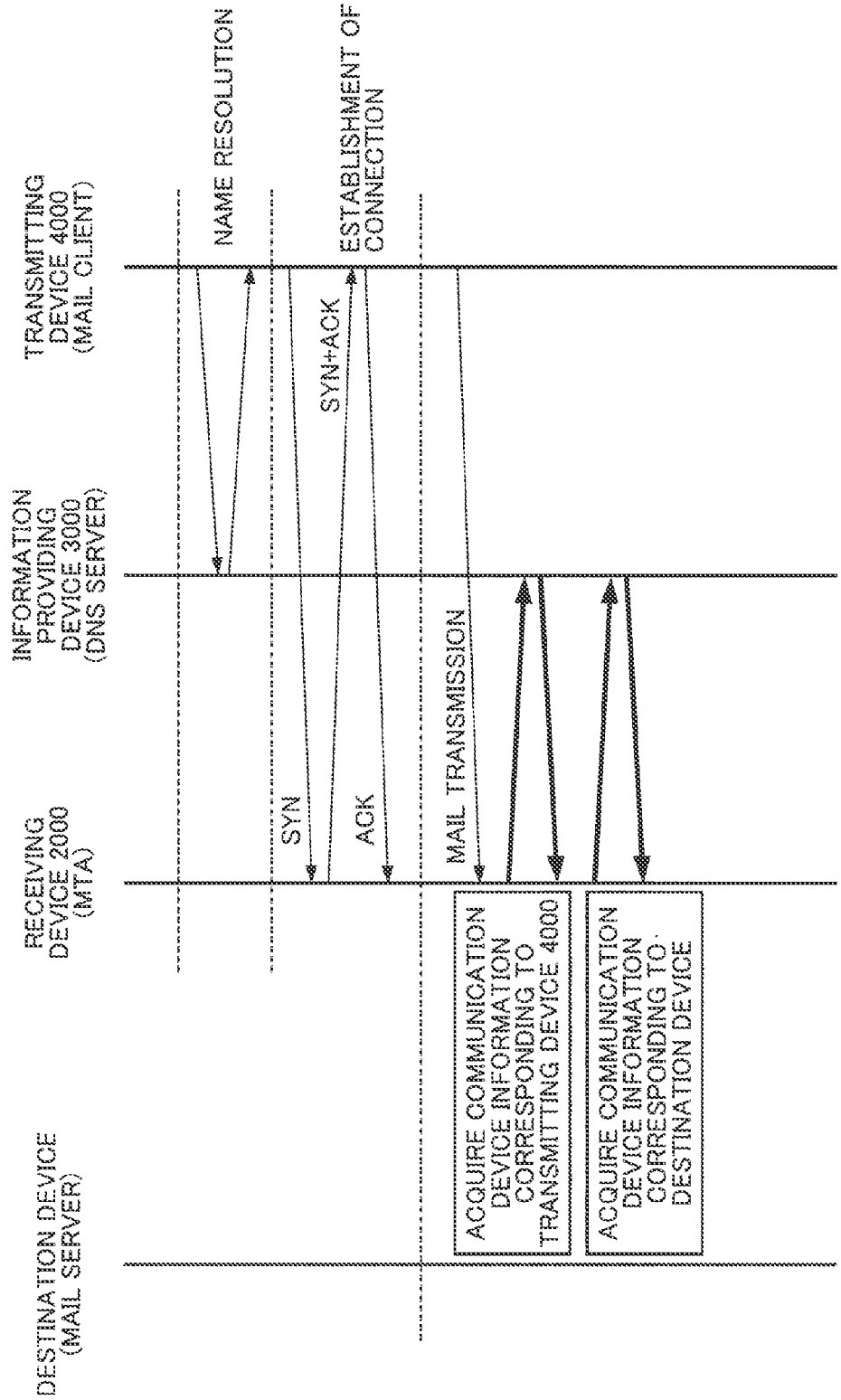
[FIG. 21] a diagram illustrating an exemplary flow of communication in an eighth example.

FIG. 21 is a diagram illustrating an exemplary flow of communication in the eighth example. After establishing a TCP connection with the transmitting device 4000, the receiving device 2000 receives a packet representing a request from the transmitting device 4000.

The transmitting device information acquiring unit 2040 of the receiving device 2000 receives the communication device information corresponding to the transmitting device 4000 from the information providing device 3000. Additionally, the destination device information acquiring unit 2060 of the receiving device 2000 acquires the communication device information corresponding to the destination device from the information providing device 3000.

<Actions and Effects>

With the configuration described above, the receiving device 2000 according to the third exemplary embodiment further acquires the communication device information corresponding to the destination device to which a packet from the transmitting device 4000 is directed, in addition to the communication device information corresponding to the transmitting device 4000. As a result, the receiving device 2000 can recognize an intention of the user of the destination device in addition to an intention of the user of the transmitting device 4000.

<Variation 3-1>

Figure 22:
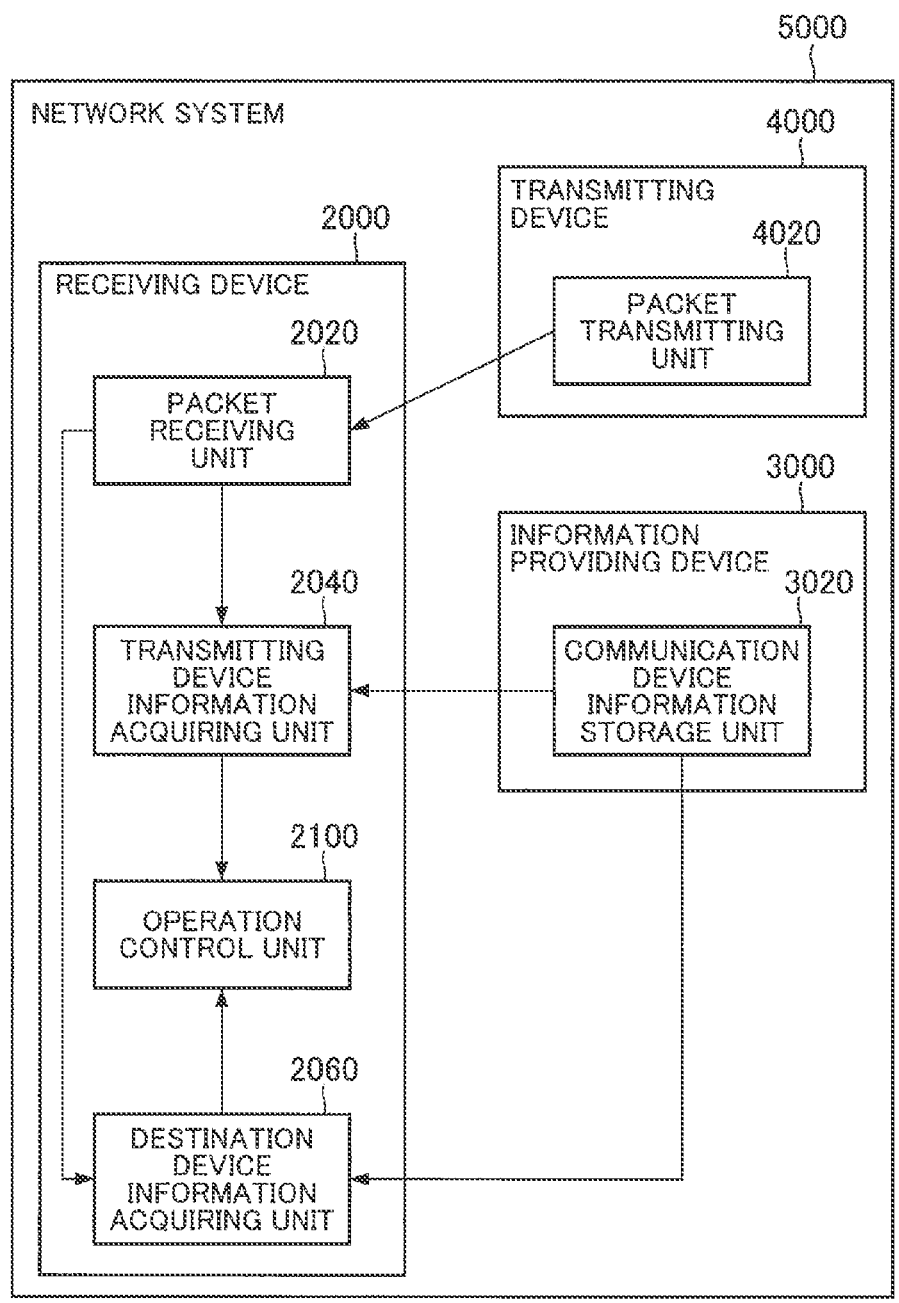
[FIG. 22] a block diagram illustrating a receiving device according to variation 3-1 together with an environment in which the receiving device is used.

The receiving device 2000 according to the third exemplary embodiment may further include an operation control unit 2100. The receiving device 2000 in this case is referred to as the receiving device 2000 according to variation 3-1. FIG. 22 is a block diagram illustrating the receiving device 2000 according to variation 3-1 together with an environment in which the receiving device 2000 is used. In FIG. 22, the arrows indicate flows of information. In FIG. 22, each of the blocks represents a configuration of functional unit rather than a configuration of hardware unit.

The operation control unit 2100 controls an operation performed by the receiving device 2000 to the transmitting device 4000 on the basis of the communication device information received from the information providing device 3000. Here, the receiving device 2000 according to variation 3-1 also acquires the communication device information corresponding to the destination device. The receiving device 2000 according to variation 3-1 further controls an operation performed by the receiving device 2000 for the transmitting device 4000 on the basis of the communication device information corresponding to the destination device. The operation control unit 2100 may control an operation performed by the receiving device 2000 for the destination device.

NINTH EXAMPLE

An exemplary operation of the receiving device 2000 according to variation 3-1 will be illustrated as a ninth example. The assumed environment in the ninth example is the same as the assumed environment in variation 8 described previously.

Figure 23:
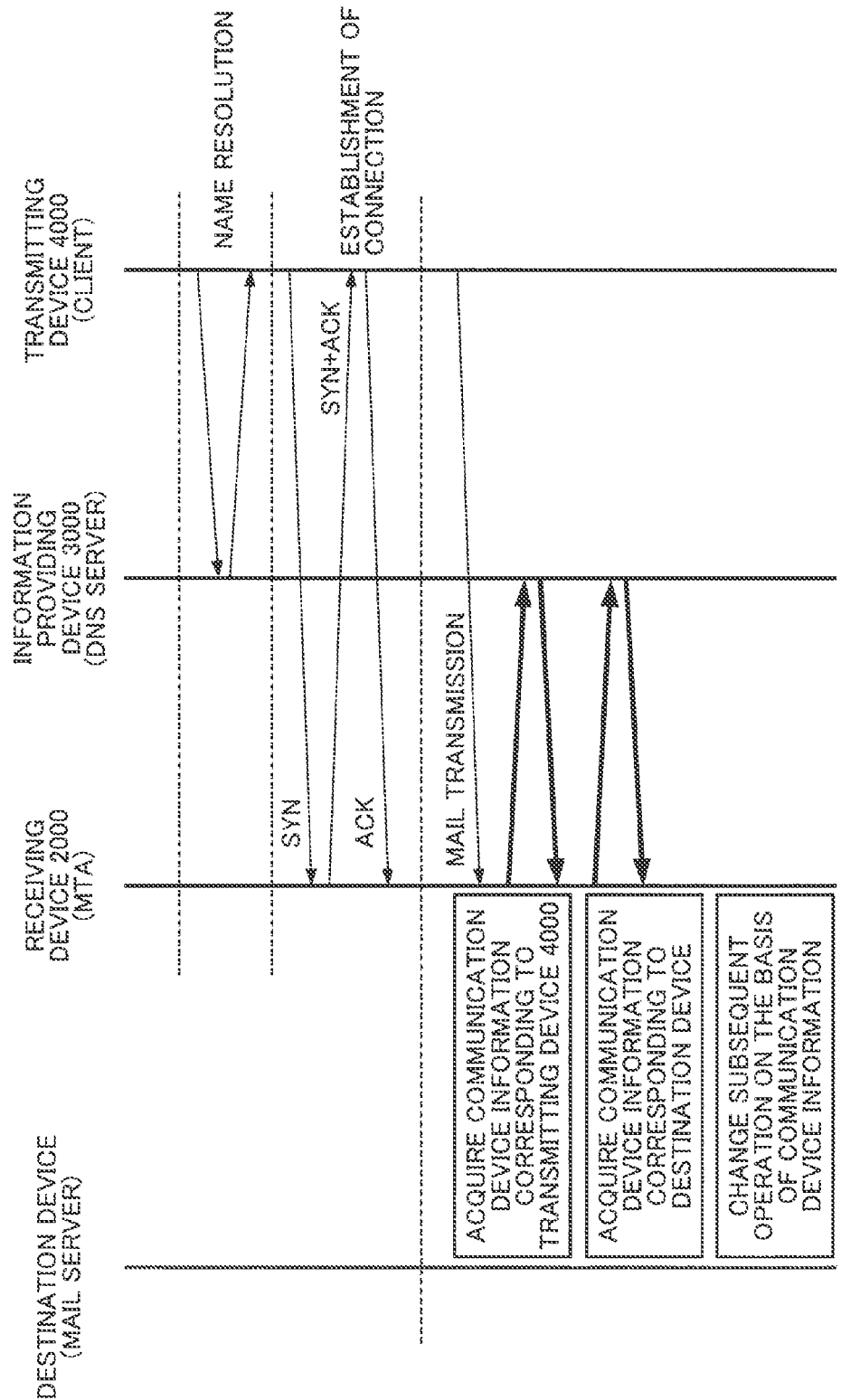
[FIG. 23] a diagram illustrating an exemplary flow of communication in a ninth example.

FIG. 23 illustrates a flow of communication in the ninth example. As described in the eighth example, the destination device information acquiring unit 2060 of the receiving device 2000 acquires the communication device information corresponding to the destination device. The communication device information corresponding to the destination device indicates the operation status of the destination device.

The operation control unit 2100 of the receiving device 2000 controls an operation performed by the receiving device 2000 to the transmitting device 4000 or an operation to the destination device on the basis of the acquired communication device information.

For example, it is assumed that the operating status of the destination device indicated by the communication device information corresponding to the destination device indicates that the "suspending because of maintenance". In this case, the receiving device 2000 returns an error notification indicating that mail cannot be transmitted to the destination device to the transmitting device 4000.

Typically, an MTA repeatedly attempts mail transmission to the mail server by considering the possibility that the situation in which communication with the mail server is impossible can be temporary. On the other hand, the receiving device 2000 according to variation 3-1 can know, by using the communication device information corresponding to the destination device, that mail cannot be transmitted to the destination device for a while. For this reason, the receiving device 2000 can immediately provide an error notification to the transmitting device 4000 without transmitting mail to the mail server. As a result, it is possible to prevent applying an excessive load on a network or prevent the receiving device 2000 from wasting computer resources.

Alternatively, for example, it is assumed that the operating status of the destination device indicated by the communication device information corresponding to the destination device indicates "operating properly". In this case, the receiving device 2000 transmits mail received from the transmitting device 4000 to the destination device.

<Actions and Effects>

With the configuration described above, the receiving device 2000 according to variation 3-1 further controls the operation performed by the receiving device 2000 according to variation 3-1 to the transmitting device 4000 on the basis of the communication device information corresponding to the destination device. Consequently, an intention of the user of destination device, in addition to an intention of the user of the transmitting device 4000, is further reflected in the operation performed by the receiving device 2000 to the transmitting device 4000.

Alternatively, it is assumed that the operation control unit 2100 includes the function of controlling an operation performed by the receiving device 2000 to the destination device. In this case, an intention of the user of the destination device, in addition to an intention of the user of the transmitting device 4000, is further reflected in the operation performed by the receiving device 2000 to the destination device.

Fourth Exemplary Embodiment

Figure 24:
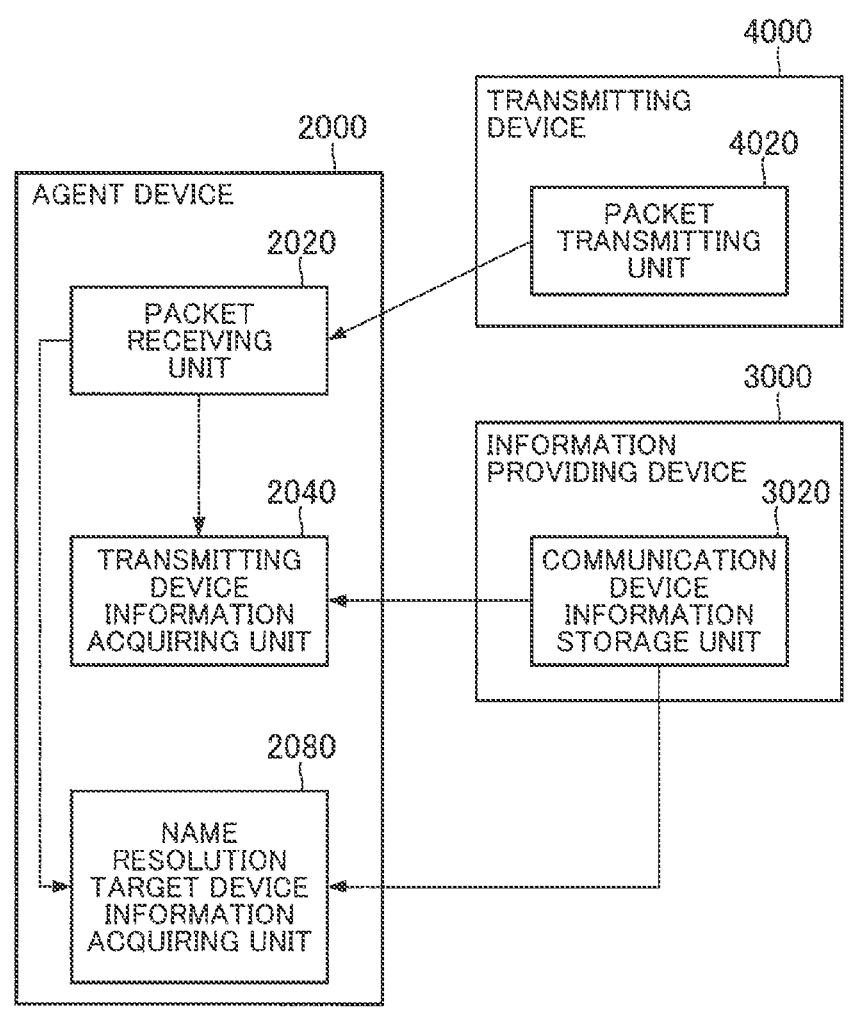
[FIG. 24] a block diagram illustrating a receiving device according to a fourth exemplary embodiment together with an environment in which the receiving device is used.

FIG. 24 is a block diagram illustrating a receiving device 2000 according to a fourth exemplary embodiment together with an environment in which the receiving device 2000 is used. In FIG. 24, the arrows represent flows of information. In FIG. 24, each of the blocks represents a configuration of functional unit rather than a configuration of hardware unit. The receiving device 2000, an information providing device 3000, and a transmitting device 4000 according to the fourth exemplary embodiment are respectively similar to the receiving device 2000, the information providing device 3000 and the transmitting device 4000 according to any of the exemplary embodiments or variations described above, except matters in the following description.

<Preconditions>

The packet received by the packet receiving unit 2020 in the fourth exemplary embodiment is a packet representing a name resolution request directed to a DNS server. The receiving device 2000 according to the fourth exemplary embodiment is an override agent described previously, for example. Here, a target device which is represented by the packet received by the packet receiving unit 2020 and is a target for the name resolution request is referred to as a name resolution target device. The packet which is representing a name resolution request and transmitted from the transmitting device 4000 contains the FQDN of the name resolution target device. Accordingly, the packet received by the packet receiving unit 2020 from the transmitting device 4000 contains the FQDN of the name resolution device.

<Name Resolution Target Device Information Acquiring Unit 2080>

The receiving device 2000 according to the fourth exemplary embodiment includes a name resolution target device information acquiring unit 2080. The name resolution target device information acquiring unit 2080 acquires the communication device information corresponding to a name resolution target device from the information providing device 3000. In this way, the receiving device 2000 according to the fourth exemplary embodiment includes the function of acquiring the communication device information corresponding to the name resolution target device, in addition to the function of acquiring the communication device information corresponding to the transmitting device 4000.

The name resolution target device information acquiring unit 2080 acquires the communication device information corresponding to the name resolution target device from the information providing device 3000 by using an ID of the name resolution target device. For example, the name resolution target device information acquiring unit 2080 extracts the ID of the name resolution device information destination device from the packet received by the packet receiving unit 2020.

For example, it is assumed that the information providing device 3000 stores the communication device information in association with the FQDNs of communication devices. A packet received by the packet receiving unit 2020 from the transmitting device 4000 contains the FQDN of the name resolution target device. Accordingly, the name resolution target device information acquiring unit 2080 acquires the communication device information corresponding to the name resolution target device from the information providing device 3000 by using the FQDN of the name resolution target device.

Alternatively, for example, it is assumed that the information providing device 3000 stores the communication device information in association with the IP addresses of communication devices. In this case, for example, the name resolution target device information acquiring unit 2080 deducts the IP address of the name resolution target device from the FQDN of the name resolution target device by using a DNS server. Then, the name resolution target device information acquiring unit 2080 acquires the communication device information corresponding to the name resolution target device from the information providing device 3000 by using the deducted IP address of the name resolution target device.

As described in the first exemplary embodiment, the information providing device 3000 is a DNS server, for example. When the information providing device 3000 is a DNS server, the name resolution target device information acquiring unit 2080 transmits a DNS query indicating the FQDN or IP address of the name resolution target device to the information providing device 3000. Then, the name resolution target device information acquiring unit 2080 receives the communication device information corresponding to the name resolution target device as a response to the DNS query from the information providing device 3000.

Information indicated by the communication device information corresponding to the name resolution target device is similar to the communication device information corresponding to the destination device information described in the third exemplary embodiment.

<Flow of Processing>

Figure 25:
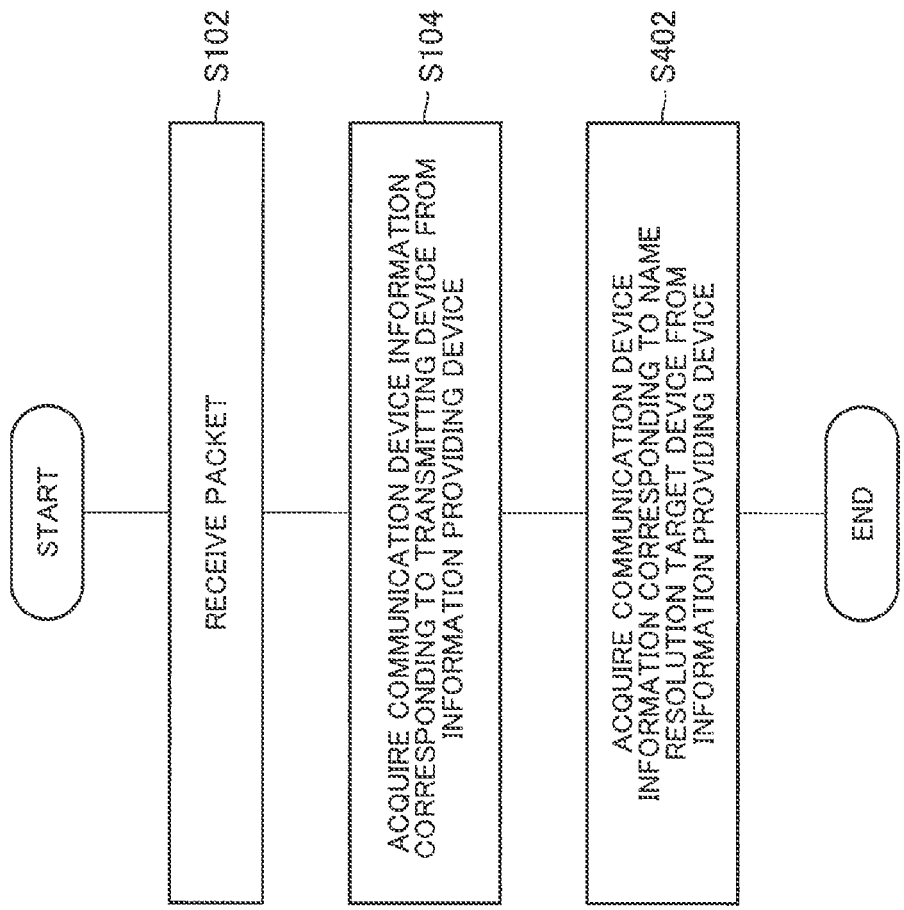
[FIG. 25] a flowchart illustrating an exemplary flow of processing performed by the receiving device according to the fourth exemplary embodiment.

FIG. 25 is a flowchart illustrating a flow of processing performed by the receiving device 2000 according to the third exemplary embodiment. Steps S102 and S104 in FIG. 25 are similar to steps S102 and S104 in FIG. 4.

At step S402, the name resolution target device information acquiring unit 2080 acquires the communication device information corresponding to the name resolution target device from the information providing device 3000.

TENTH EXAMPLE

An exemplary operation of the receiving device 2000 according to the fourth exemplary embodiment will be illustrated as a tenth example. In the tenth example, the transmitting device 4000 is a Web client, and the name resolution target device is a Web server. The receiving device 2000 is an override agent. Information which is corresponding to the name resolution target device and stored in the information providing device 3000 is information indicating the operating status of the destination device. It is assumed here that the transmitting device 4000 knows the FQDN of the name resolution target device but does not know the IP address of the name resolution target device.

Figure 26:
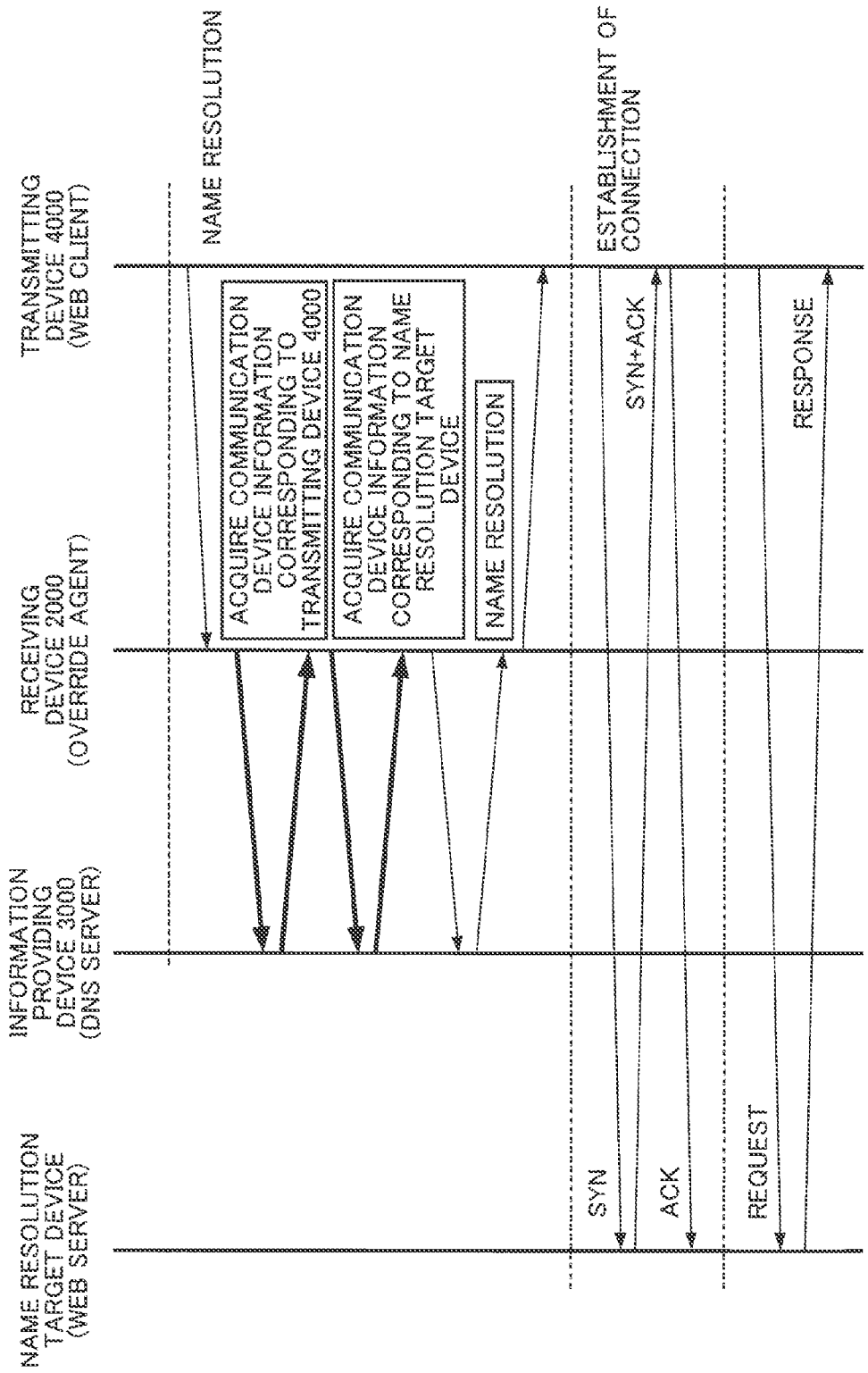
[FIG. 26] a diagram illustrating an exemplary flow of communication in a tenth example.

FIG. 26 is a diagram illustrating an exemplary flow of communication in the tenth example. The receiving device 2000 receives a packet representing a name resolution request from the transmitting device 4000. The transmitting device information acquiring unit 2040 of the receiving device 2000 receives the communication device information corresponding to the transmitting device 4000 from the information providing device 3000. Furthermore, the name resolution target device information acquiring unit 2080 of the receiving device 2000 acquires the communication device information corresponding to the name resolution target device from the information providing device 3000. As a result, the receiving device 2000 can recognize the operating status of the name resolution target device.

<Actions and Effects>

With the configuration described above, the receiving device 2000 according to the fourth exemplary embodiment further acquires the communication device information corresponding to the name resolution target device which the transmitting device 4000 makes be a target for name resolution, in addition to the communication device information corresponding to the transmitting device 4000. As a result, the receiving device 2000 can recognize an intention of the user of the name resolution target device in addition to an intention of the user of the transmitting device 4000.

<Variation 4-1>

Figure 27:
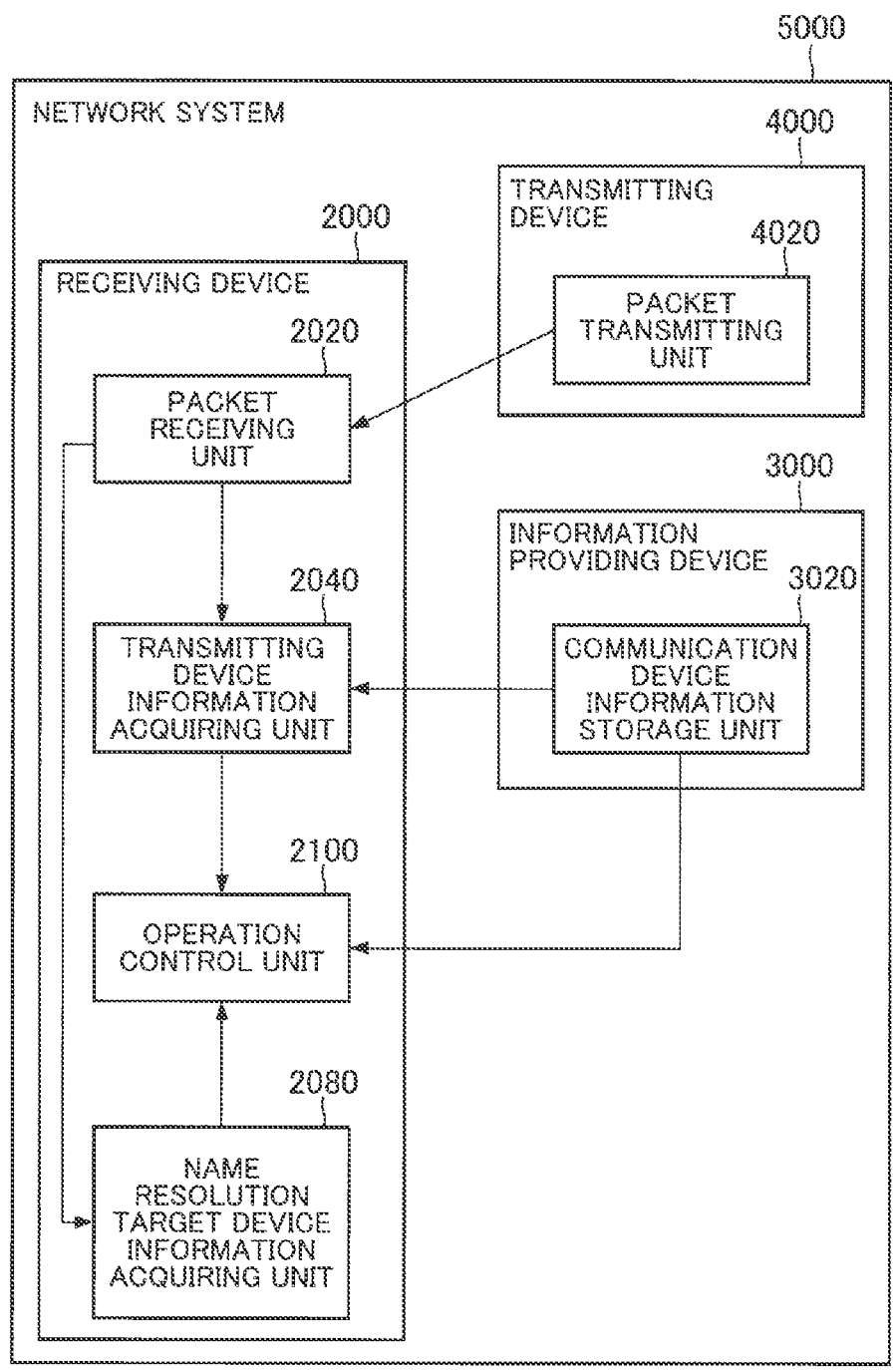
[FIG. 27] a block diagram illustrating a receiving device according to variation 4-1 together with an environment in which the receiving device is used.

The receiving device 2000 according to the fourth exemplary embodiment may further include the operation control unit 2100. The receiving device 2000 in this case will be referred to as a receiving device 2000 according to variation 4-1. FIG. 27 is a block diagram illustrating the receiving device 2000 according to variation 4-1 together with an environment in which the receiving device 2000 is used. In FIG. 27, the arrows indicate flows of information. In FIG. 27, each of the blocks represents a configuration of functional unit rather than a configuration of hardware unit.

The operation control unit 2100 controls an operation performed by the receiving device 2000 to the transmitting device 4000 on the basis of the communication device information received from the information providing device 3000. The receiving device 2000 according to variation 4-1 also acquires the communication device information corresponding to the name resolution target device. Therefore, the receiving device 2000 according to variation 4-1 further controls an operation performed by the receiving device 2000 to the transmitting device 4000 on the basis of the communication device information corresponding to the name resolution target device.

ELEVENTH EXAMPLE

An exemplary operation of the receiving device 2000 according to variation 4-1 will be illustrated as an eleventh example. The assumed environment in the eleventh example is the same as the assumed environment in the tenth example.

Figure 28:
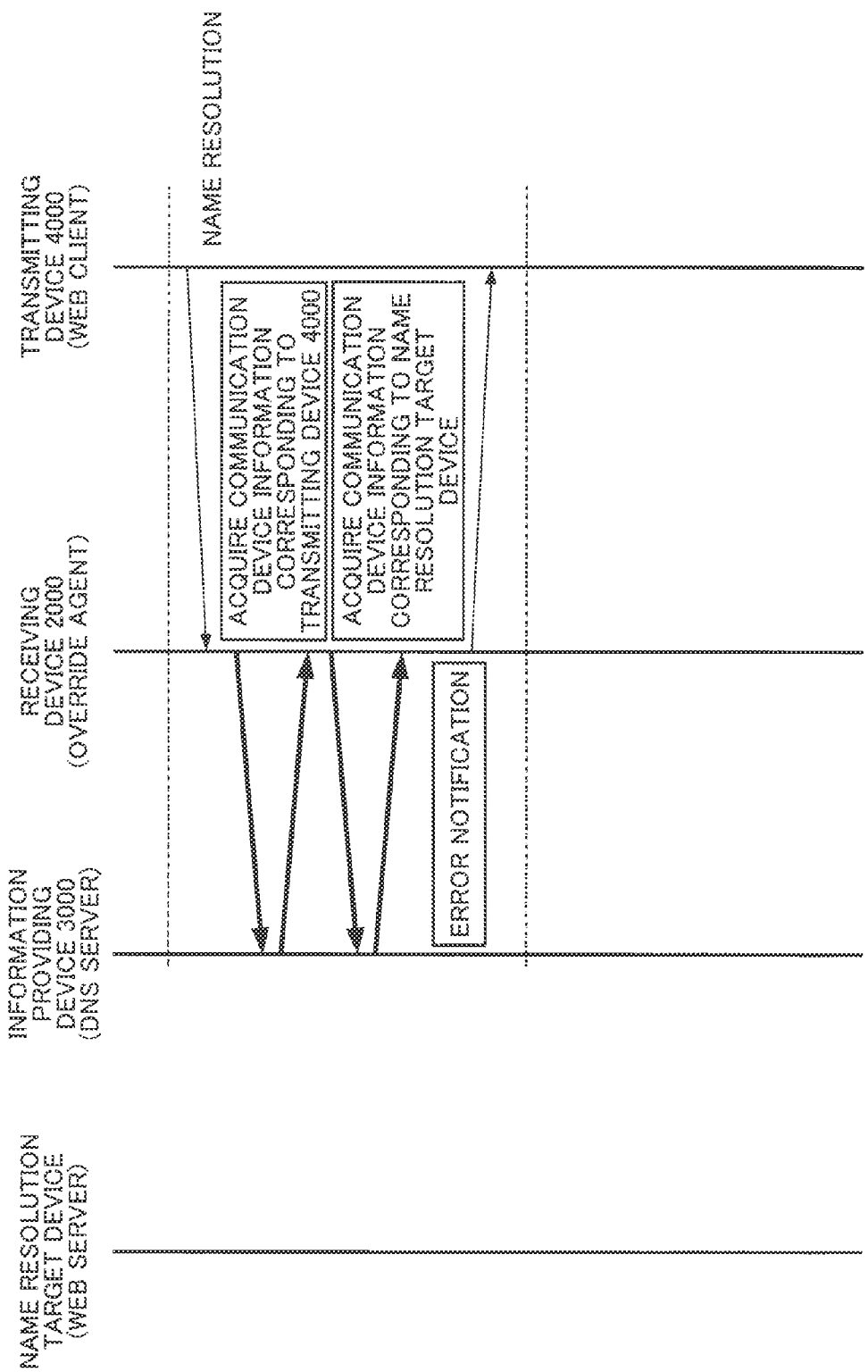
[FIG. 28] a diagram illustrating an exemplary flow of communication in an eleventh example.

FIG. 28 is a diagram illustrating an exemplary flow of communication in the eleventh example. The flow until the step where the name resolution target device information acquiring device 2080 of the receiving device 2000 acquires the communication device information corresponding to the name resolution target device from the information providing device 3000 is same as the flow in FIG. 26.

The operation control unit 2100 of the receiving device 2000 controls an operation performed by the receiving device 2000 to the transmitting device 4000 on the basis of the acquired communication device information. For example, it is assumed that operating status of the name resolution target device, indicated by the communication device information corresponding to the name resolution target device, indicates that "suspending because of maintenance". In this case, the receiving device 2000 transmits an error notification, which indicates that the name resolution for the name resolution target device is failed, to the transmitting device 4000.

Alternatively, for example, it is assumed that the operating status of the name resolution target device, indicated by the communication device information corresponding to the name resolution target device, indicates that "properly operating". In this case, the receiving device 2000 performs name resolution for the name resolution target device, and transmits the result to the transmitting device 4000.

<Actions and Effects>

With the configuration described above, the receiving device 2000 according to variation 4-1 further controls the operation performed by the receiving device 2000 according to variation 4-1 to the transmitting device 4000 on the basis of the communication device information corresponding to the name resolution target device. Consequently, an intention of the user of the name resolution target device, in addition to an intention of the user of the transmitting device 4000, is further reflected in the operation performed by the receiving device 2000 to the transmitting device 4000.

Fifth Exemplary Embodiment

Figure 29:
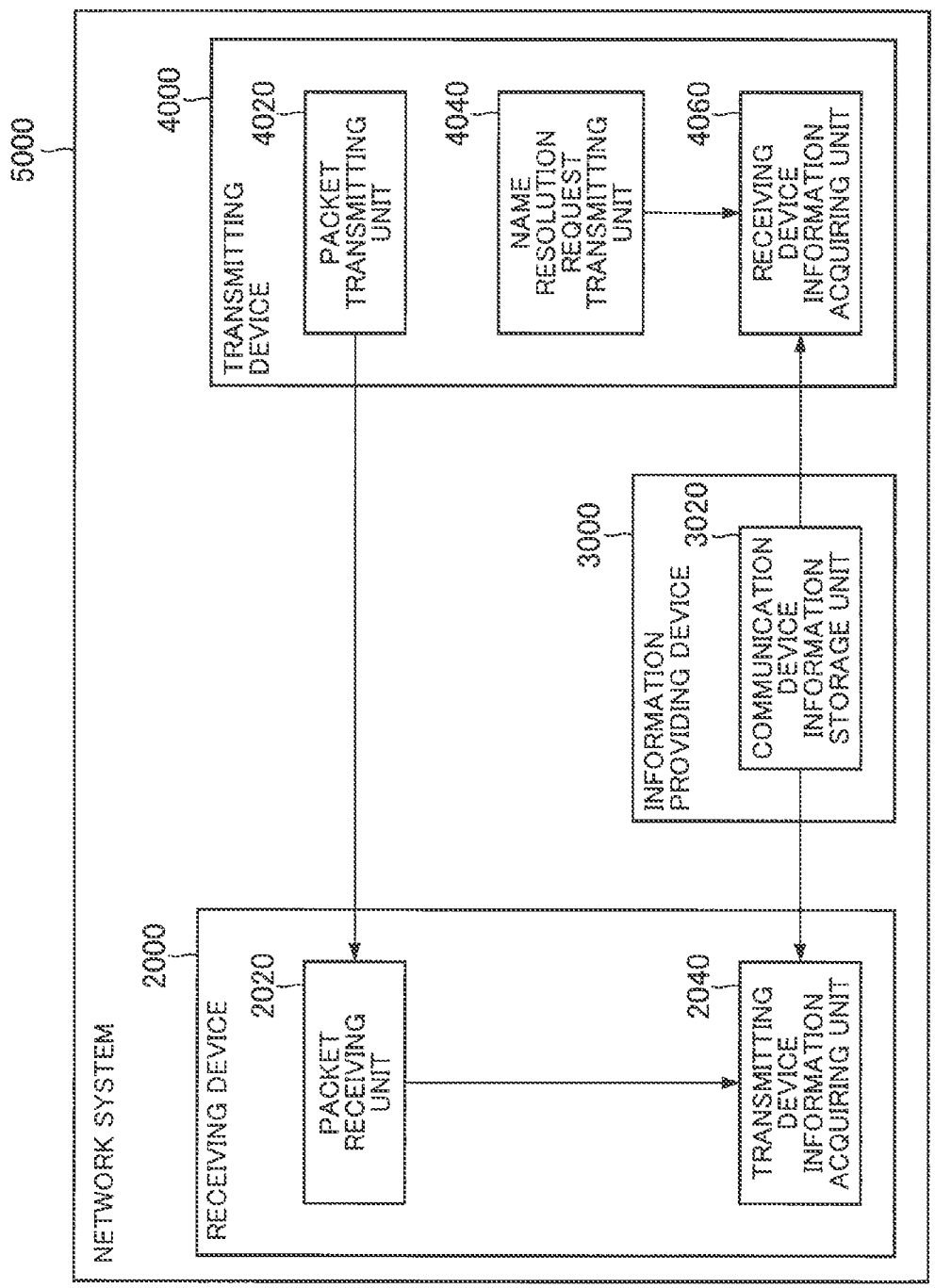
[FIG. 29] a block diagram illustrating a network system according to a fifth exemplary embodiment.

FIG. 29 is a diagram illustrating a network system 5000 according to a fifth exemplary embodiment. In FIG. 29, the arrows represent flows of information. In FIG. 29, each of the blocks represents a configuration of functional unit rather than a configuration of hardware unit. A receiving device 2000, an information providing device 3000, and a transmitting device 4000 according to the fifth exemplary embodiment are respectively the same as the receiving device 2000, the information providing device 3000 and the transmitting device 4000 according to any of the exemplary embodiments or variations described above, except matters in the following description.

In each of the exemplary embodiments and each of variations described previously, the receiving device 2000 acquires the communication device information from the information providing device 3000. In the network system 5000 of the fifth exemplary embodiment, not only the receiving device 2000 but also the transmitting device 4000 acquires the communication device information from the information providing device 3000.

The transmitting device 4000 according to the fifth exemplary embodiment includes a packet transmitting unit 4020, a name resolution request transmitting unit 4040, and a receiving device information acquiring unit 4060. These functional component units will be described below.

<Packet Transmitting Unit 4020>

The packet transmitting unit 4020 transmits a packet directed to the receiving device 2000.

<Name Resolution Request Transmitting Unit 4040>

The name resolution request transmitting unit 4040 transmits a name resolution request of the receiving device 2000 to a DNS server. The transmitting device 4000 acquires an IP address of the receiving device 2000 from the result of the name resolution request by the name resolution request transmitting unit 4040. The packet transmitting unit 4020 transmits a packet to the receiving device 2000 by using the IP address.

The DNS server may be a DNS server external to the network system 5000 or may be a DNS server located inside the network system 5000. When the information providing device 3000 is a DNS server, the name resolution request transmitting unit 4040 may request the information providing device 3000 to perform name resolution for the receiving device 2000.

<Receiving Device Information Acquiring Unit 4060>

The receiving device information acquiring unit 4060 acquires the communication device information corresponding to the receiving device 2000 from the information providing device 3000 before or after the name resolution request transmitting unit 4040 transmits a name resolution request for the receiving device 2000. The communication device information corresponding to the receiving device is, for example, similar to the communication device information corresponding to the name resolution target device described in the fourth exemplary embodiment.

<Flow of Processing>

Figure 30:
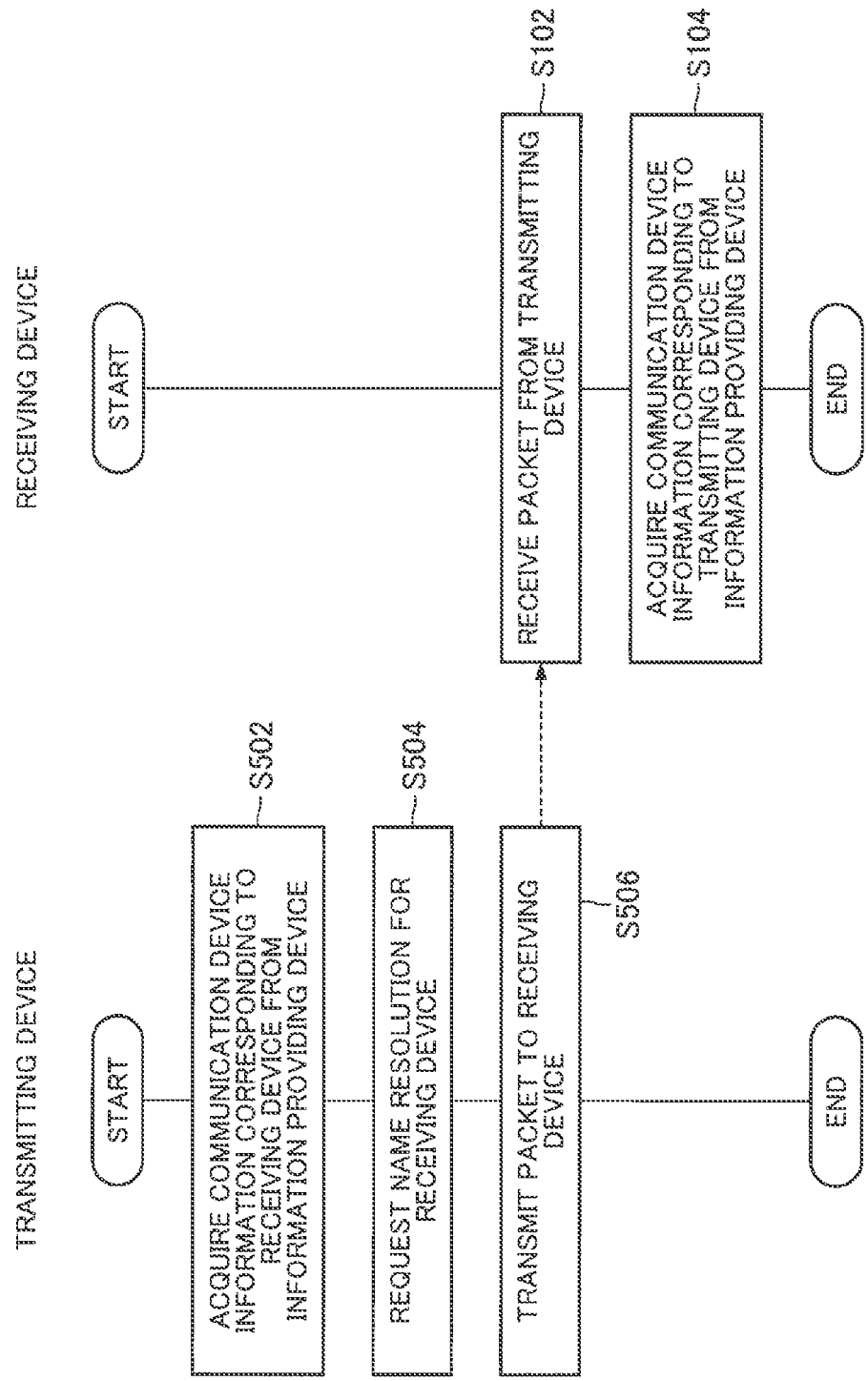
[FIG. 30] a flowchart illustrating an exemplary flow of processing in the network system according to the fifth exemplary embodiment.

FIG. 30 is a flowchart illustrating an exemplary flow of processing in the network system 5000 according to the fifth exemplary embodiment. The left-hand part of FIG. 30 illustrates a flow of processing by the transmitting device 4000. On the other hand, the right-hand part of FIG. 30 illustrates a flow of processing by the receiving device 2000. The flow of processing by the receiving device 2000 is similar to the flow depicted in FIG. 4 described in the first exemplary embodiment.

At step S502, the receiving device information acquiring unit 4060 acquires the communication device information corresponding to the receiving device 2000 from the information providing device 3000. At step S504, the name resolution request transmitting unit 4040 transmits a request for name resolution for the receiving device 2000 to a DNS server. At step S506, the packet transmitting unit 4020 transmits a packet to the receiving device 2000.

TWELFTH EXAMPLE

An operation of the network system 5000 in the fifth exemplary embodiment will be illustrated as a twelfth example. In the twelfth example, the transmitting device 4000 is a Web client, and the receiving device 2000 is a Web server. The information providing device 3000 is a DNS server. Information which is corresponding to the receiving device 2000 and stored in the information providing device 3000 is information indicating the operating status of the receiving device 2000. It is assumed here that the transmitting device 4000 knows the FQDN of the receiving device 2000 but does not know the IP address of the receiving device 2000.

Figure 31:
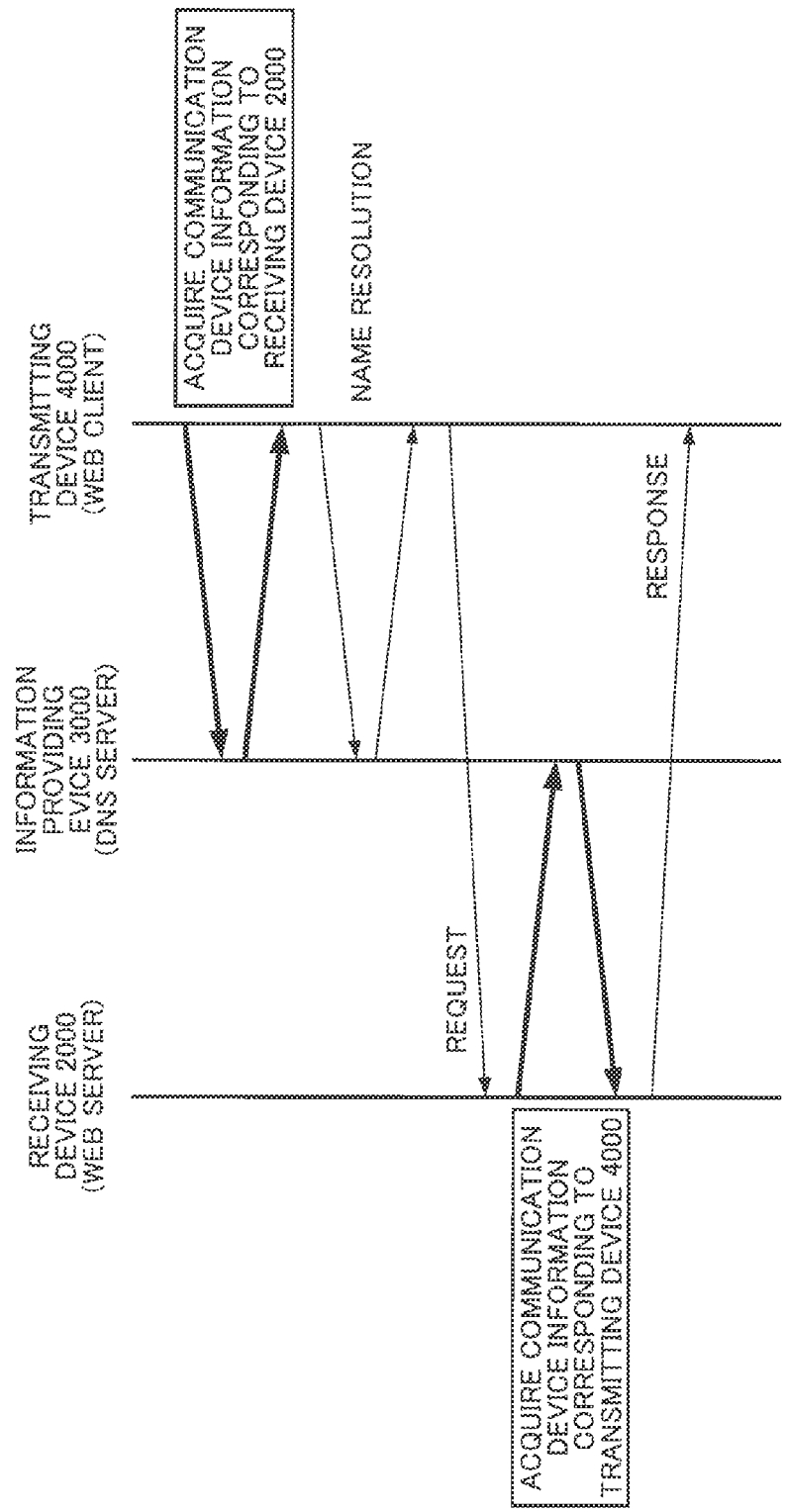
[FIG. 31] a diagram illustrating an exemplary flow of communication in a twelfth example.

FIG. 31 is a diagram illustrating an exemplary flow of communication in the twelfth example. The receiving device information acquiring unit 4060 of the transmitting device 4000 acquires the communication device information corresponding to the receiving device 2000 from the information providing device 3000. Then, the name resolution request transmitting unit 4040 of the transmitting device 4000 performs name resolution for the receiving device 2000 by using the information providing device 3000 which is a DNS server. After that, the packet transmitting unit 4020 of the transmitting device 4000 transmits a packet indicating a request to the receiving device 2000. With the flow of the processing performed described above, the transmitting device 4000 can know whether or not the receiving device 2000 is available before transmitting a request to the receiving device 2000.

Furthermore, the packet receiving unit 2020 of the receiving device 2000 receives a packet from the transmitting device 4000. Then, the transmitting device information acquiring unit 2040 of the receiving device 2000 acquires the communication device information corresponding to the transmitting device 4000 from the information providing device 3000. Then, the receiving device 2000 returns a response to the transmitting device 4000.

<Actions and Effects>

With the configuration described above, in the network system 5000 of the fifth exemplary embodiment, the transmitting device 4000 acquires the communication device information corresponding to the receiving device 2000. As a result, the transmitting device 4000 can recognize an intention of the user of the receiving device 2000.

Sixth Exemplary Embodiment

Figure 32:
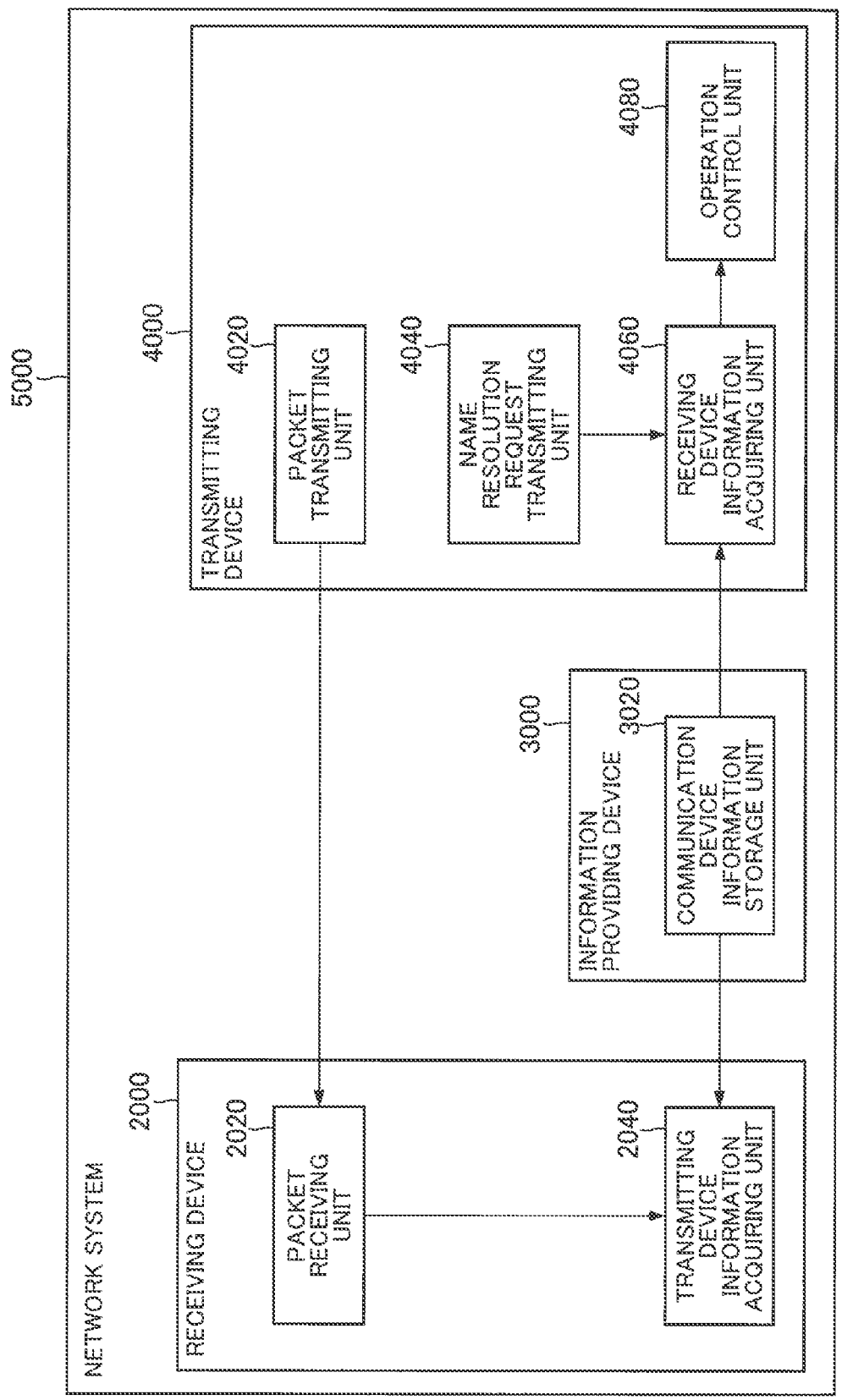
[FIG. 32] a block diagram illustrating a network system according to a sixth exemplary embodiment.

FIG. 32 is a block diagram illustrating a network system 5000 according to a sixth exemplary embodiment. In FIG. 32, the arrows indicate flows of information. In FIG. 32, each of the blocks represents a configuration of functional unit rather than a configuration of hardware unit. The network system 5000 of the sixth exemplary embodiment is similar to the network system 5000 of the fifth exemplary embodiment, except matters in the following description.

A transmitting device 4000 in the sixth exemplary embodiment includes an operation control unit 4080. The operation control unit 4080 controls an operation performed by the packet transmitting unit 4020 or the name resolution request transmitting unit 4040 on the basis of the communication device information corresponding to the receiving device 2000.

For example, it is assumed that the communication device information corresponding to the receiving device 2000 indicates the operating status of the receiving device 2000. In this case, for example, the operation control unit 4080 determines whether or not to transmit a packet to the receiving device 2000 depending on the operating status of the receiving device 2000, and controls the packet receiving unit 2020 or the transmitting device information acquiring unit 2040. Alternatively, for example, it is assumed that the communication device information corresponding to the receiving device 2000 is a communication protocol which the receiving device 2000 can use. In this case, for example, the operation control unit 4080 controls the packet transmitting unit 4020 so that the transmitting device 4000 uses the communication protocol which the receiving device 2000 can use.

<Flow of Processing>

Figure 33:
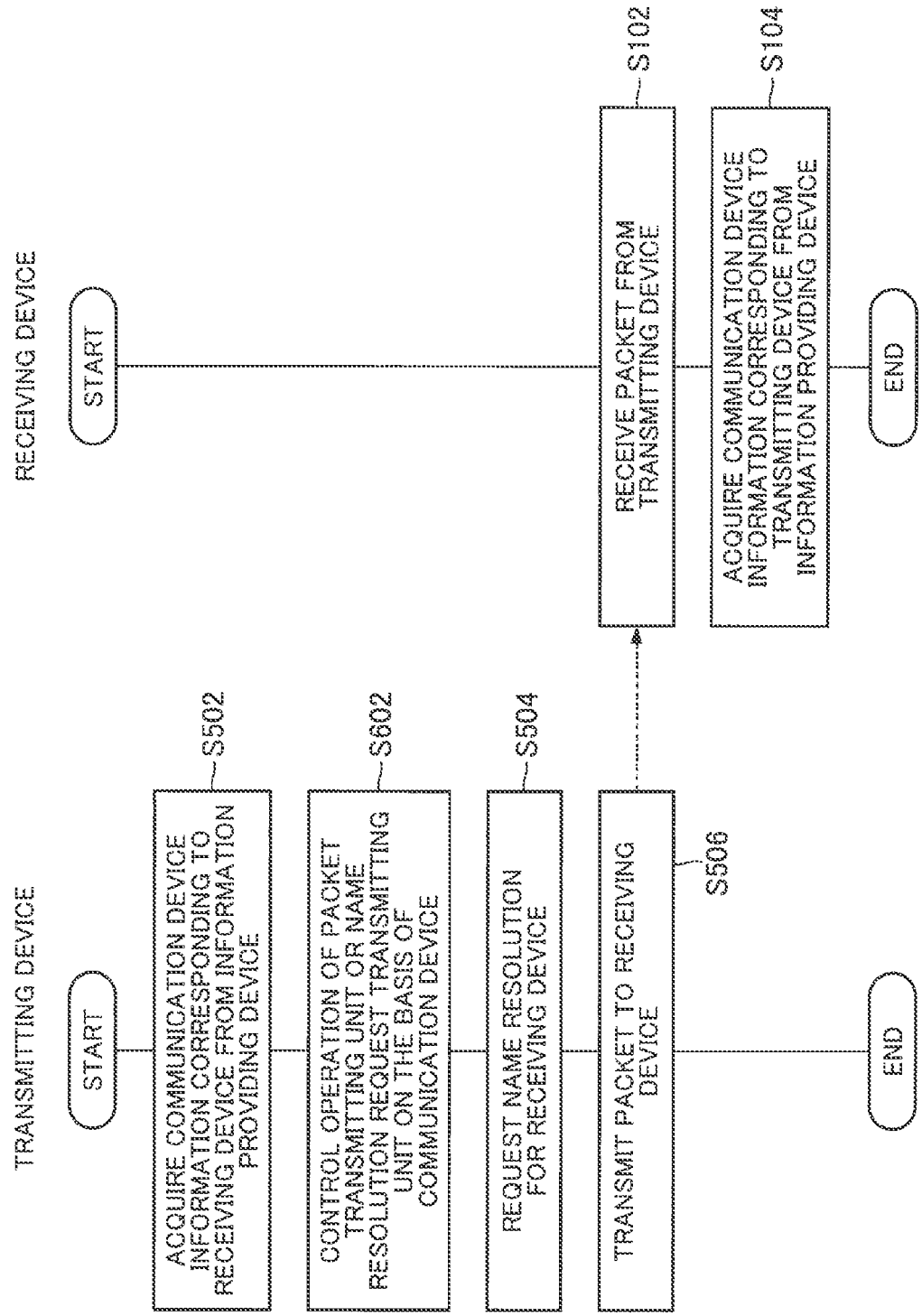
[FIG. 33] a flowchart illustrating an exemplary flow of processing in the network system according to the sixth exemplary embodiment.

FIG. 33 is a flowchart illustrating an exemplary flow of processing in the network system 5000 according to the sixth exemplary embodiment. The processing except step S602 is similar to the processing depicted in FIG. 30 described in the fifth exemplary embodiment.

At step S602, the operation control unit 4080 of the transmitting device 4000 controls an operation of the packet transmitting unit 4020 or the name resolution request transmitting unit 4040 on the basis of the communication device information corresponding to a receiving device.

Furthermore, FIG. 33 illustrates a flow similar to the flow in FIG. 30 as a flow of the processing after step S602. However, the flow of processing after step S602 might change depending on the result of the control by the operation control unit 4080 at step S602. For example, it is assumed that the operation control unit 4080 controls the packet transmitting unit 4020 so that the transmitting device 4000 does not transmit a packet to the receiving device 2000. In this case, the processing at step S504 and the processing after that are not performed.

THIRTEENTH EXAMPLE

An operation of the network system 5000 in the sixth exemplary embodiment will be illustrated as a thirteenth example. The assumed environment in the thirteenth example is similar to the equipment environment in the twelfth example described in the fifth exemplary embodiment.

Figure 34:
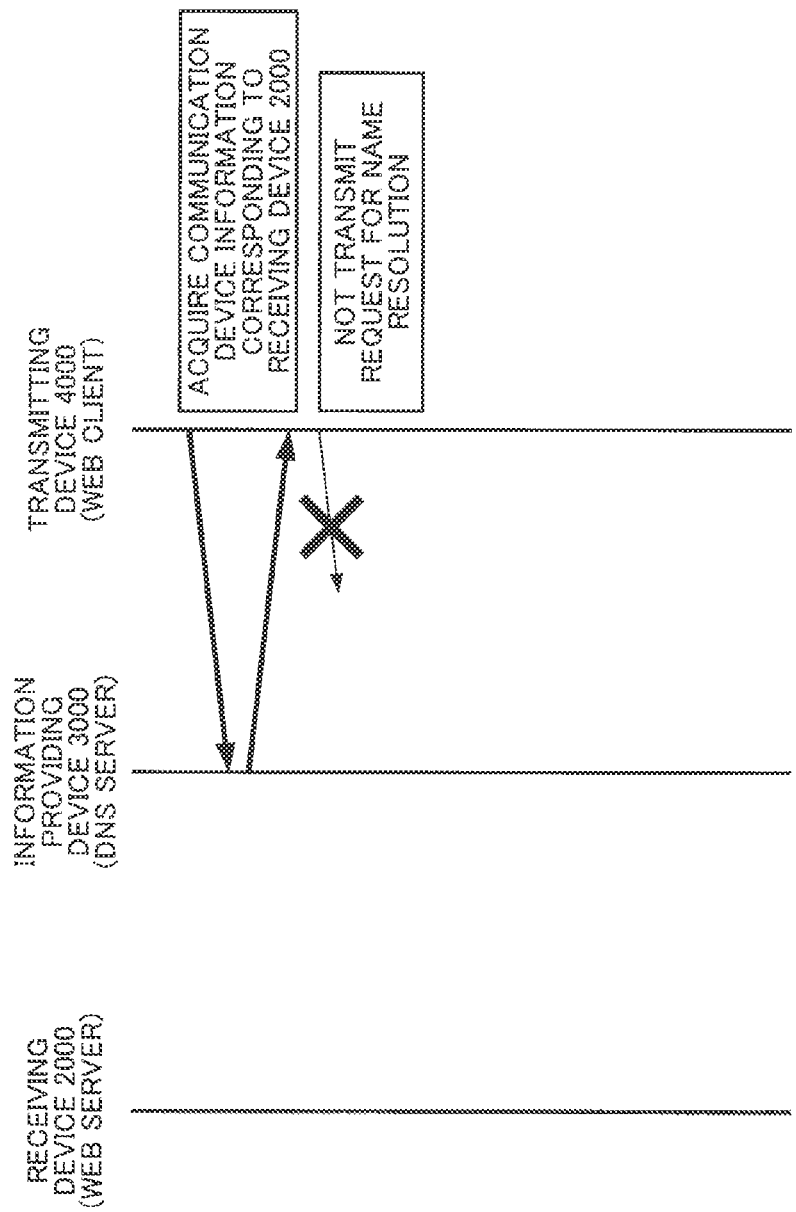
[FIG. 34] a diagram illustrating an exemplary flow of communication in a thirteenth example.

FIG. 34 is a diagram illustrating an exemplary flow of communication in the twelfth example. The receiving device information acquiring unit 4060 of the transmitting device 4000 acquires the communication device information corresponding to the receiving device 2000 from the information providing device 3000. Then, the operation control unit 4080 of the transmitting device 4000 controls the operation of the name resolution request transmitting unit 4040 on the basis of the acquired communication device information.

For example, it is assumed that the operating status of the receiving device 2000 indicated by the communication device information corresponding to the receiving device 2000 indicates that "suspending because of maintenance". In this case, the transmitting device 4000 makes the name resolution request transmitting unit 4040 not transmit a name resolution request for the receiving device 2000. As a result, it is possible to prevent wasteful processing as acquiring the IP address of the receiving device 2000 which cannot communicate.

On the other hand, it is assumed that the operating status of the receiving device 2000 indicated by the communication device information corresponding to the receiving device 2000 indicates that "properly operating". In this case, the operation control unit 4080 makes the name resolution request transmitting unit 4040 transmit a request for name resolution for the receiving device 2000.

<Actions and Effects>

With the configuration described above, in the network system 5000 according to the sixth exemplary embodiment, the operation of the transmitting device 4000 is controlled on the basis of the communication device information corresponding to the receiving device 2000. Consequently, an intention of the user of the receiving device 2000 is reflected in the operation of the transmitting device 4000.

Seventh Exemplary Embodiment

Figure 35:
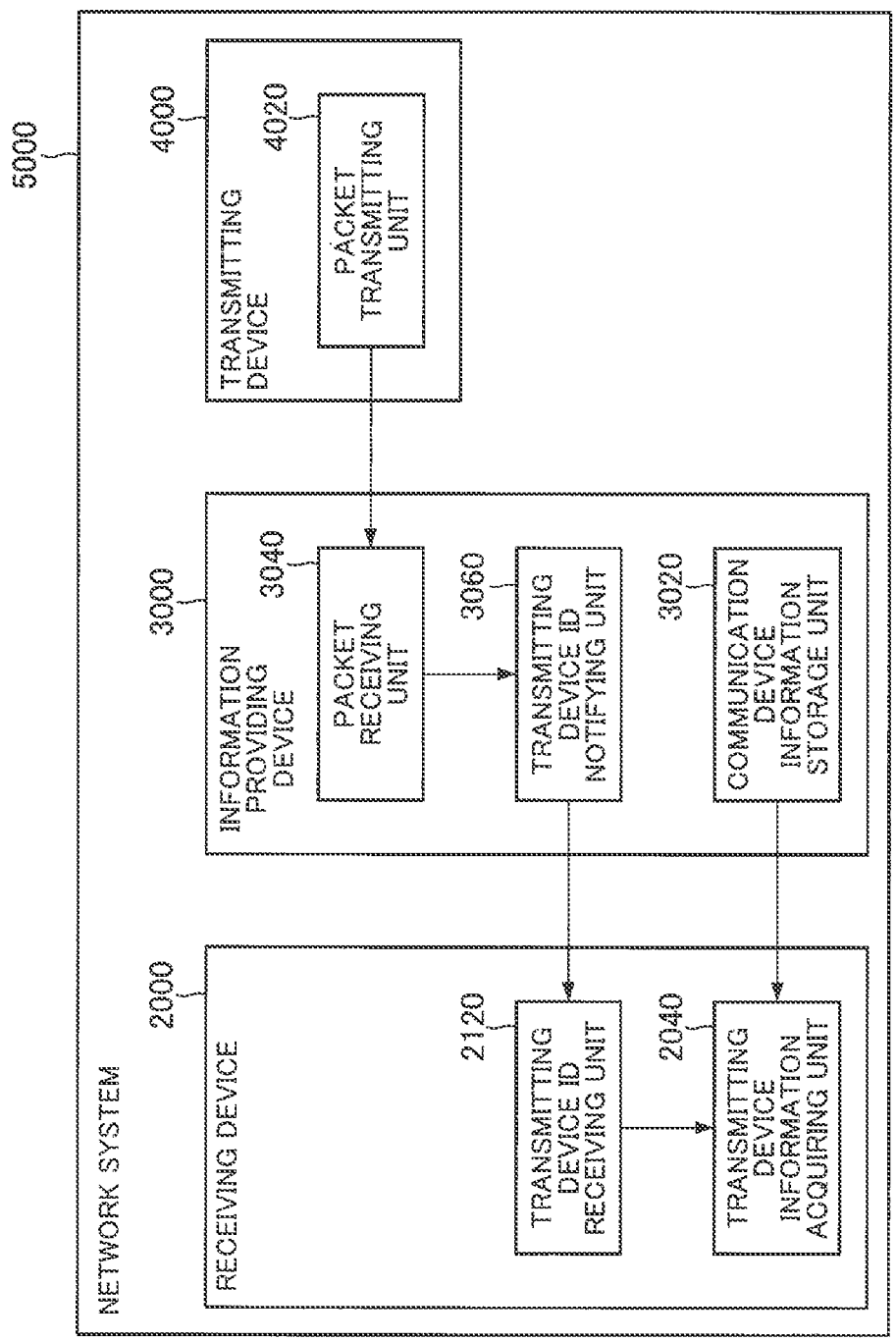
[FIG. 35] a block diagram illustrating a network system according to a seventh exemplary embodiment.

FIG. 35 is a block diagram illustrating a network system 5000 according to a seventh exemplary embodiment. In FIG. 35, the arrows indicate flows of information. In FIG. 35, each of the blocks represents a configuration of functional unit rather than a configuration of hardware unit.

In this exemplary embodiment, a receiving device 2000 acquires the communication device information corresponding to the transmitting device 4000 by using an ID of a transmitting device 4000 notified from an information providing device 3000. The following is a detailed description.

<Transmitting Device 4000>

The transmitting device 4000 includes a packet transmitting unit 4020 like the transmitting devices 4000 of each of the exemplary embodiments and variations described previously. A packet transmitted by the packet transmitting unit 4020 is a packet for requesting name resolution for the receiving device 2000. The packet contains an ID of the transmitting device 4000.

The ID of the transmitting device 4000 is the FQDN, IP address, or MAC address, for example, of the transmitting device 4000.

<Information Providing Device 3000>

The information providing device 3000 includes a communication device information storage unit 3020, a packet receiving unit 3040, and a transmitting device ID notifying unit 3060. The communication device information storage unit 3020 is similar to the transmitting device information storage unit 3020 in any of the exemplary embodiments and variations described previously.

The packet receiving unit 3040 receives a packet transmitted by a packet transmitting unit 4020.

The transmitting device ID notifying unit 3060 notifies the ID of the transmitting device 4000 contained in the packet received by the packet receiving unit 3040 to the receiving device 2000.

<Receiving Device 2000>

The receiving device 2000 includes a transmitting device ID receiving unit 2120 and a transmitting device information acquiring unit 2040. The transmitting device ID receiving unit 2120 receives the ID of the transmitting device 4000 from the transmitting device ID notifying unit 3060 of the information providing device 3000. The transmitting device information acquiring unit 2040 acquires the transmitting device information corresponding to the transmitting device 4000 from the information providing device 3000 by using the ID of the transmitting device 4000 received by the transmitting device ID receiving unit 2120.

<Flow of Processing>

Figure 36:
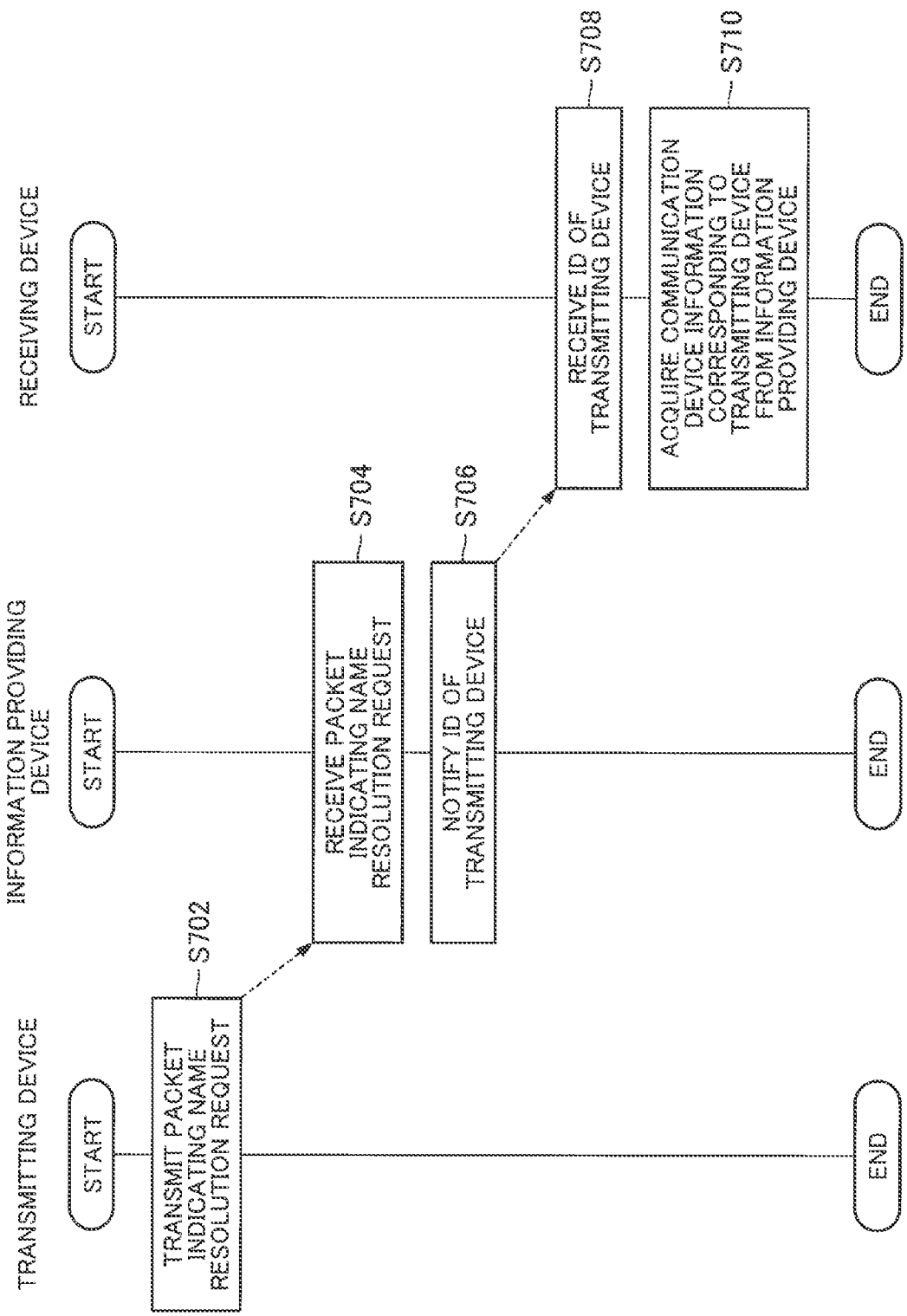
[FIG. 36] a flowchart illustrating an exemplary flow of processing in the network system according to the seventh exemplary embodiment.

FIG. 36 is a flowchart illustrating an exemplary flow of processing in the network system 5000 according to the seventh exemplary embodiment. The left-hand part of FIG. 36 indicates a flow of processing at the transmitting device 4000, the central part of FIG. 36 indicates a flow of processing at the information providing device 3000, and the right-hand part of FIG. 36 indicates a flow of processing at the receiving device 2000. In FIG. 36, the dashed arrows represent flows of information.

At step S702, the transmitting device 4000 transmits a packet indicating a name resolution request.

At step S704, the information providing device 3000 receives the packet indicating the name resolution request transmitted from the transmitting device 4000. At step S706, the information providing device 3000 notifies the ID of the transmitting device 4000 to the receiving device 2000.

At step S708, the receiving device 2000 receives the ID of the transmitting device 4000 from the information providing device 3000. At step S710, the receiving device 2000 acquires the communication device information corresponding to the transmitting device 4000 from the information providing device 3000 by using the ID of the transmitting device 4000 notified by the information providing device 3000.

FOURTEENTH EXAMPLE

An operation of the network system 5000 in the seventh exemplary embodiment will be illustrated as a fourteenth example. In the fourteenth example, the transmitting device 4000 is a Web client, and the receiving device 2000 is a Web server. The information providing device 3000 is a DNS server. The communication device information which is corresponding to the transmitting device 4000 and stored in the information providing device 3000 is a whitelist indicating Web servers that the transmitting device 4000 may access. It is assumed here that the transmitting device 4000 knows the FQDN of the receiving device 2000 but does not know the IP address of the receiving device 2000.

Figure 37:
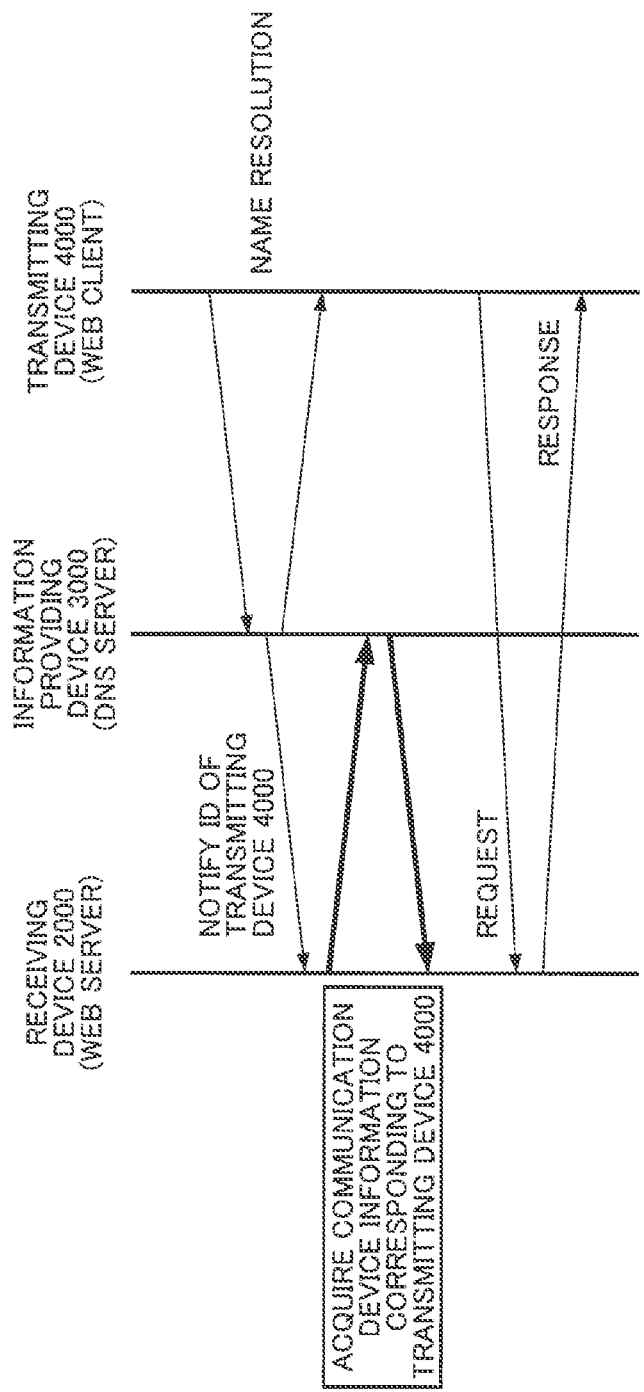
[FIG. 37] a diagram illustrating an exemplary flow of communication in a fifteenth example.

FIG. 37 is a diagram illustrating an exemplary flow of communication in the fourteenth example. The transmitting device 4000 requests the information providing device 3000 to perform name resolution for the receiving device 2000. The information providing device 3000 receives the above-mentioned request for the name resolution from the transmitting device 4000. The information providing device 3000 notifies the ID of the transmitting device 4000 to the receiving device 2000. The timing when the information providing device 3000 notifies the ID of the transmitting device 4000 to the receiving device 2000 is good before or after the completion of the name resolution processing by the information providing device 3000.

The receiving device 2000 acquires the communication device information corresponding to the transmitting device 4000 by using the ID of the transmitting device 4000 received from the information providing device 3000. After that, the receiving device 2000 receives a request from the transmitting device 4000.

<Actions and Effects>

Therefore, according to this exemplary embodiment, the receiving device 2000 acquires the communication device information corresponding to the transmitting device 4000 by using the ID of the transmitting device 4000 notified by the information providing device 3000. As a result, the receiving device 2000 can recognize an intention of the user of the transmitting device 4000.

<Variation 7-1>

Figure 38:
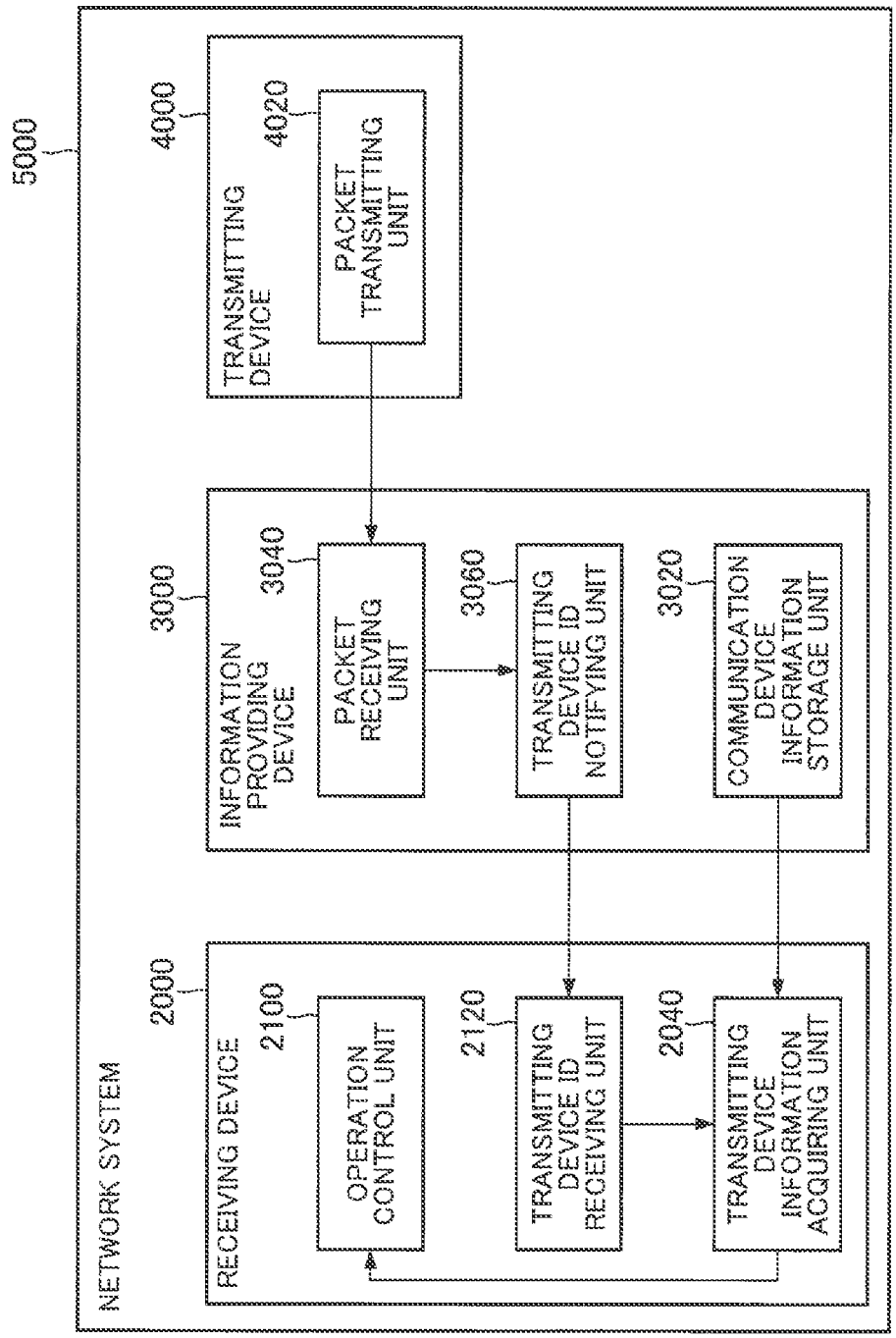
[FIG. 38] a block diagram illustrating a network system according to variation 7-1.

The receiving device 2000 of the seventh exemplary embodiment may include the operation control unit 2100. A receiving device 2000 which is according to the seventh exemplary embodiment and includes the operation control unit 2100 will be referred to as a receiving device 2000 according to variation 7-1. FIG. 38 is a block diagram illustrating a network system 5000 according to variation 7-1. In FIG. 38, the arrows indicate flows of information. In FIG. 3 8, each of the blocks represents a configuration of functional unit rather than a configuration of hardware unit. The operation control unit 2100 of variation 7-1 controls the receiving device 2000 on the basis of the communication device information corresponding to the transmitting device 4000 like the operation control unit 2100 of the second exemplary embodiment.

FIFTEENTH EXAMPLE

An operation of the network system 5000 in variation 7-1 will be illustrated as a fifteenth example. The assumed environment in the fifteenth example is the same as the assumed environment in the fourteenth example.

Figure 39:
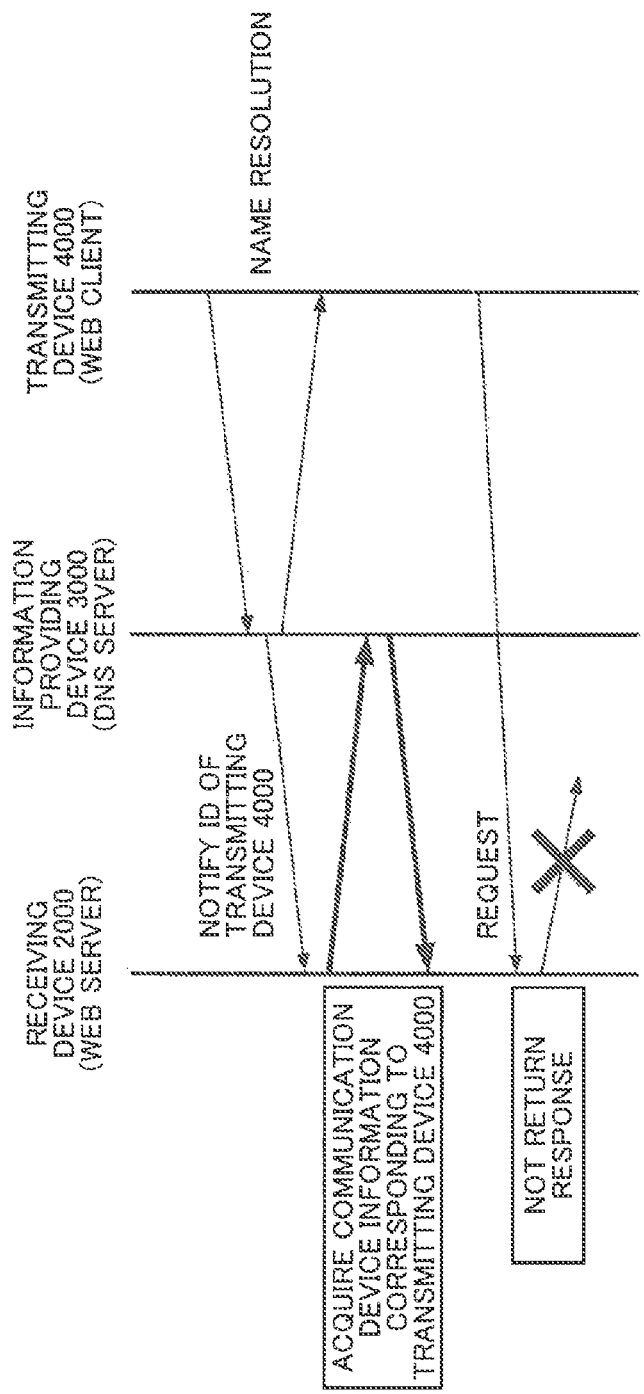
[FIG. 39] a diagram illustrating an exemplary flow of communication in a sixteenth example.

FIG. 39 illustrates a flow of communication in the fifteenth example. The receiving device 2000 changes the method to respond to a request from the transmitting device 4000 on the basis of the communication device information corresponding to the transmitting device 4000 acquired from an information providing device 3000. For example, it is assumed that the receiving device 2000 is not included in a whitelist, which is indicated by the transmitting device information corresponding to the transmitting device 4000, of Web servers that the transmitting device 4000 may access. In this case, for example, the receiving device 2000 does not return a response to the transmitting device 4000. Alternatively, for example, the receiving device 2000 returns an error response to a request to the transmitting device 4000.

It is assumed that the receiving device 2000 is included in a whitelist, which is indicated by the transmitting device information corresponding to the transmitting device 4000, of Web servers that the transmitting device 4000 may access. In this case, the receiving device 2000 processes a request from the transmitting device 4000, and returns a response to the transmitting device 4000.

In this way, the receiving device 2000 can perform an operation that reflects an intention of the user of the transmitting device 4000.

<Actions and Effects>

Therefore, according to this exemplary embodiment, an intention of the user of the transmitting device 4000 is reflected in the operation performed by the receiving device 2000 to the transmitting device 4000.

Eighth Exemplary Embodiment

Figure 40:
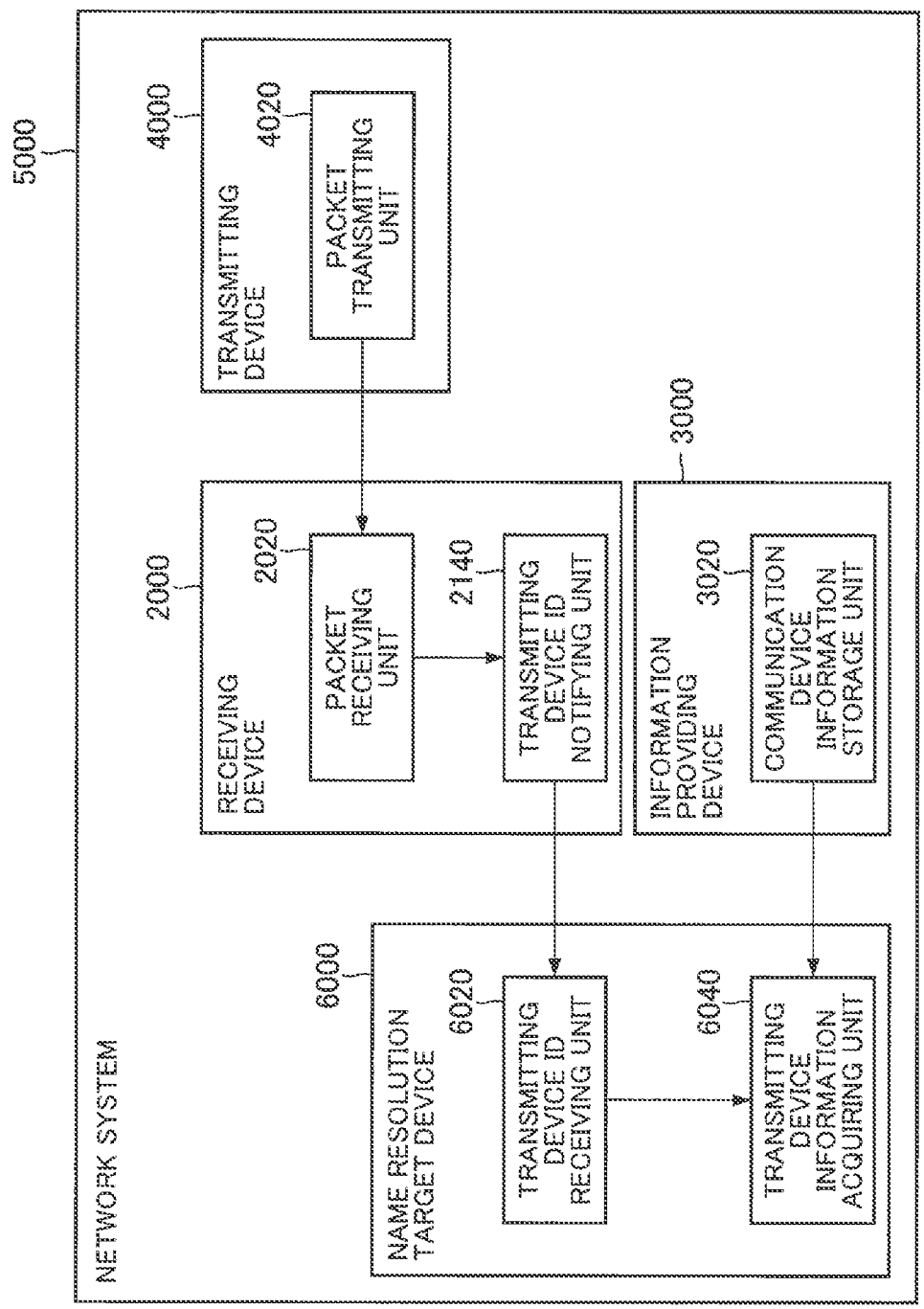
[FIG. 40] a block diagram illustrating a network system according to an eighth exemplary embodiment.

FIG. 40 is a block diagram illustrating a network system 5000 according to an eighth exemplary embodiment. In FIG. 40, the arrows indicate flows of information. In FIG. 40, each of the blocks represents a configuration of functional unit rather than a configuration of hardware unit.

The network system 5000 according to the eighth exemplary embodiment includes a name resolution target device 6000. The name resolution target device 6000 is a device for which the transmitting device 4000 requests a DNS server to perform name resolution. In the network system 5000 of the eighth exemplary embodiment, the name resolution target device 6000 acquires the communication device information corresponding to the transmitting device 4000.

<Information Providing Device 3000>

An information providing device 3000 is similar to the information providing device 3000 according to any of the exemplary embodiments and variations described above except the seventh exemplary embodiment and variation 7-1.

<Transmitting Device 4000>

A packet transmitting unit 4020 transmits a packet indicating a request for name resolution for a name resolution target device 6000. The packet contains an ID of the transmitting device 4000. The ID of the transmitting device 4000 is the FQDN, IP address, MAC address or the like, for example, of the transmitting device 4000.

<Receiving Device 2000>

A receiving device 2000 includes the packet receiving unit 2020 and a transmitting device ID notifying unit 2140. The packet receiving unit 2020 receives a packet transmitted from the transmitting device 4000.

The transmitting device ID notifying unit 2140 notifies the ID of the transmitting device 4000 contained in the packet received by the packet receiving unit 2020 to the name resolution target device 6000.

The receiving device 2000 of this exemplary embodiment receives a name resolution request transmitted from the transmitting device 4000. For example, the receiving device 2000 is the override agent mentioned previously. Alternatively, the receiving device 2000 may be a DNS server. However, in that case, the receiving device 2000 is a DNS server that is different from the information providing device 3000.

<Name Resolution Target Device 6000>

The name resolution target device 6000 includes a transmitting device ID receiving unit 6020 and a transmitting device information acquiring unit 6040. The transmitting device ID receiving unit 6020 receives an ID of the transmitting device 4000 from the receiving device 2000.

The transmitting device information acquiring unit 6040 acquires the communication device information corresponding to the transmitting device 4000 from the information providing device 3000 by using the ID of the transmitting device 4000 received by the transmitting device ID receiving unit 6020.

<Flow of Processing>

Figure 41:
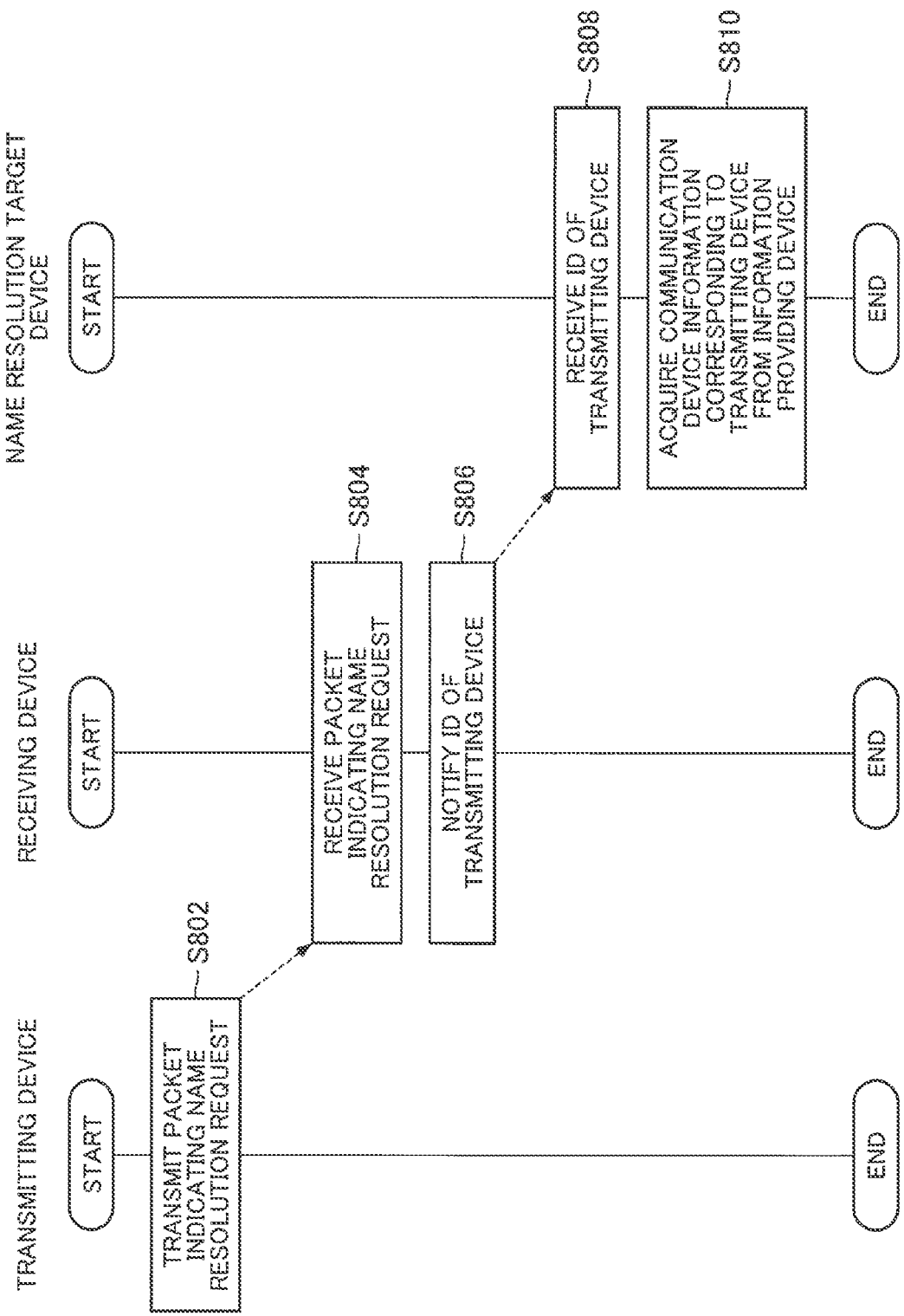
[FIG. 41] a flowchart illustrating an exemplary flow of processing in the network system according to the eighth exemplary embodiment.

FIG. 41 is a flowchart illustrating an exemplary flow of processing by the network system 5000 according to the eighth exemplary embodiment. The left-hand part of FIG. 41 indicates a flow of processing at the transmitting device 4000, the central part of FIG. 41 indicates a flow of processing at the receiving device 2000, and the right-hand part of FIG. 41 indicates a flow of processing at the name resolution target device 6000. In FIG. 41, the dashed arrows represent flows of information.

At step S802, the transmitting device 4000 transmits a packet indicating a request for name resolution for the name resolution target device 6000.

At step S804, the receiving device 2000 receives the packet indicating the name resolution request and is transmitted by the transmitting device 4000. At step S806, the receiving device 2000 notifies the ID of the transmitting device 4000 to the name resolution target device 6000.

At step S808, the name resolution target device 6000 receives the ID of the transmitting device 4000 from the receiving device 2000. At step S810, the name resolution target device 6000 acquires the communication device information corresponding to the transmitting device 4000 from the information providing device 3000 by using the ID of the transmitting device 4000 notified by the receiving device 2000.

SIXTEENTH EXAMPLE

An operation of the network system 5000 according to the eighth exemplary embodiment will be illustrated as a sixteenth example. In the sixteenth example, the transmitting device 4000 is a Web client, and the name resolution target device 6000 is a Web server. The receiving device 2000 is an override agent. The information providing device 3000 is a DNS server. The communication device information which is corresponding to the transmitting device 4000 and stored in the information providing device 3000 is a whitelist of Web servers that the transmitting device 4000 may access. It is assumed here that the transmitting device 4000 knows the FQDN of the name resolution target device 6000 but does not know the IP address of the name resolution target device 6000.

Figure 42:
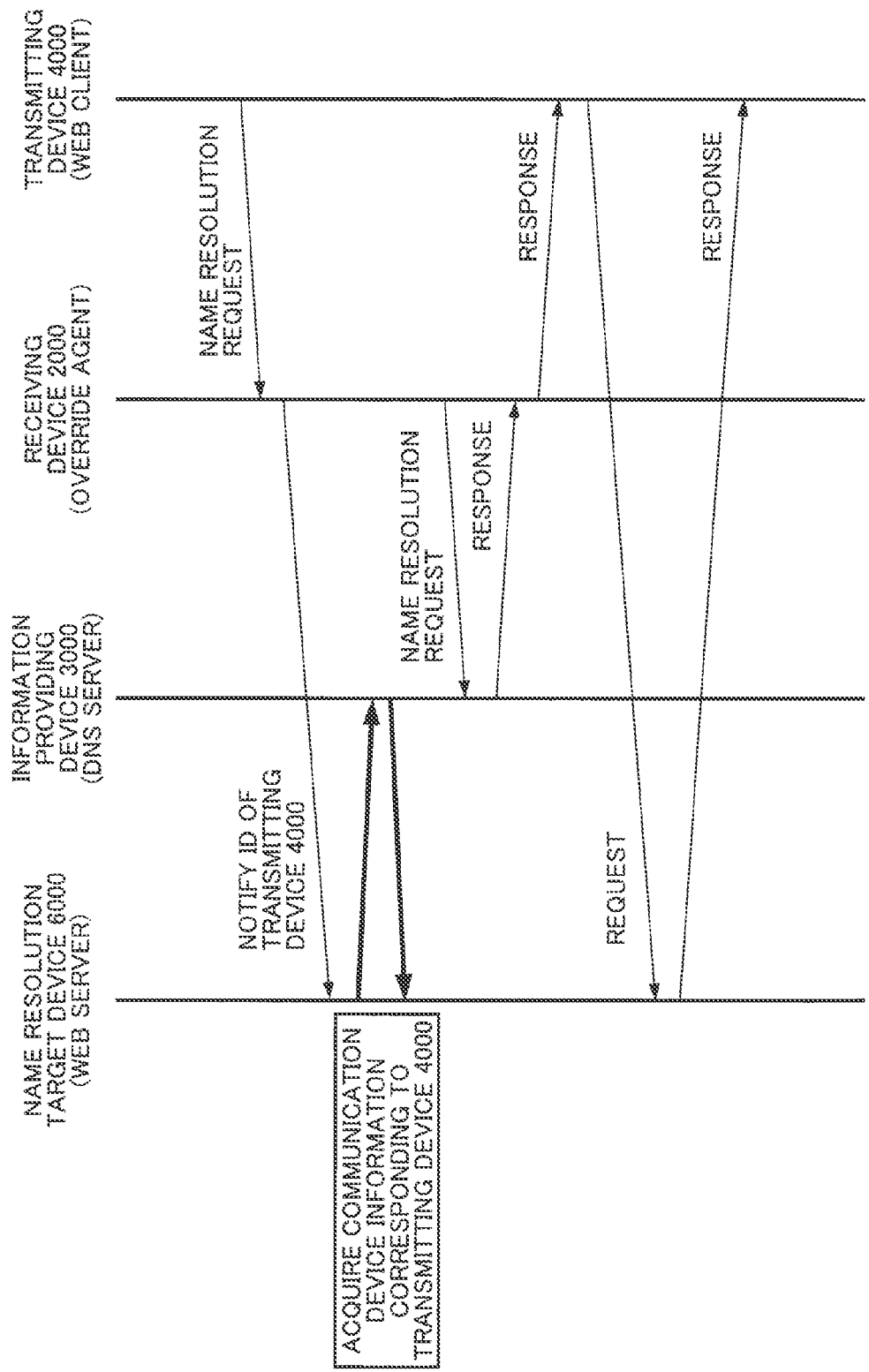
[FIG. 42] a diagram illustrating an exemplary flow of communication in the sixteenth example.

FIG. 42 illustrates a flow of communication in the sixteenth example. The transmitting device 4000 transmits a packet indicating a request for name resolution for the name resolution target device 6000.

The receiving device 2000 receives the packet. Then, the receiving device 2000 notifies the ID of the transmitting device 4000 contained in the packet to the name resolution target device 6000.

The name resolution target device 6000 receives the ID of the transmitting device 4000 from the receiving device 2000. The name resolution target device 6000, by using the ID, acquires the communication device information corresponding to the transmitting device 4000 from the information providing device 3000.

The receiving device 2000 requests the information providing device 3000 to perform name resolution for the name resolution target device 6000. As a result, the receiving device 2000 acquires the IP address of the name resolution target device 6000 from the information providing device 3000. Then, the receiving device 2000 notifies the IP address of the name resolution target device 6000 to the transmitting device 4000.

The transmitting device 4000 transmits a request to the name resolution target device 6000 by using the IP address of the name resolution target device 6000 acquired from the receiving device 2000.

With the flow described above, the name resolution target device 6000 can recognize an intention of the user of the transmitting device 4000 before receiving the request from the transmitting device 4000.

The timing when the receiving device 2000 notifies the ID of the transmitting device 4000 to the name resolution target device 6000 is good before or after the receiving device 2000 transmits the name resolution request to the information providing device 3000.

<Actions and Effects>

With the configuration described above, according to this exemplary embodiment, the name resolution target device 6000 can recognize an intention of the user of the transmitting device 4000.

<Variation 8-1>

Figure 43:
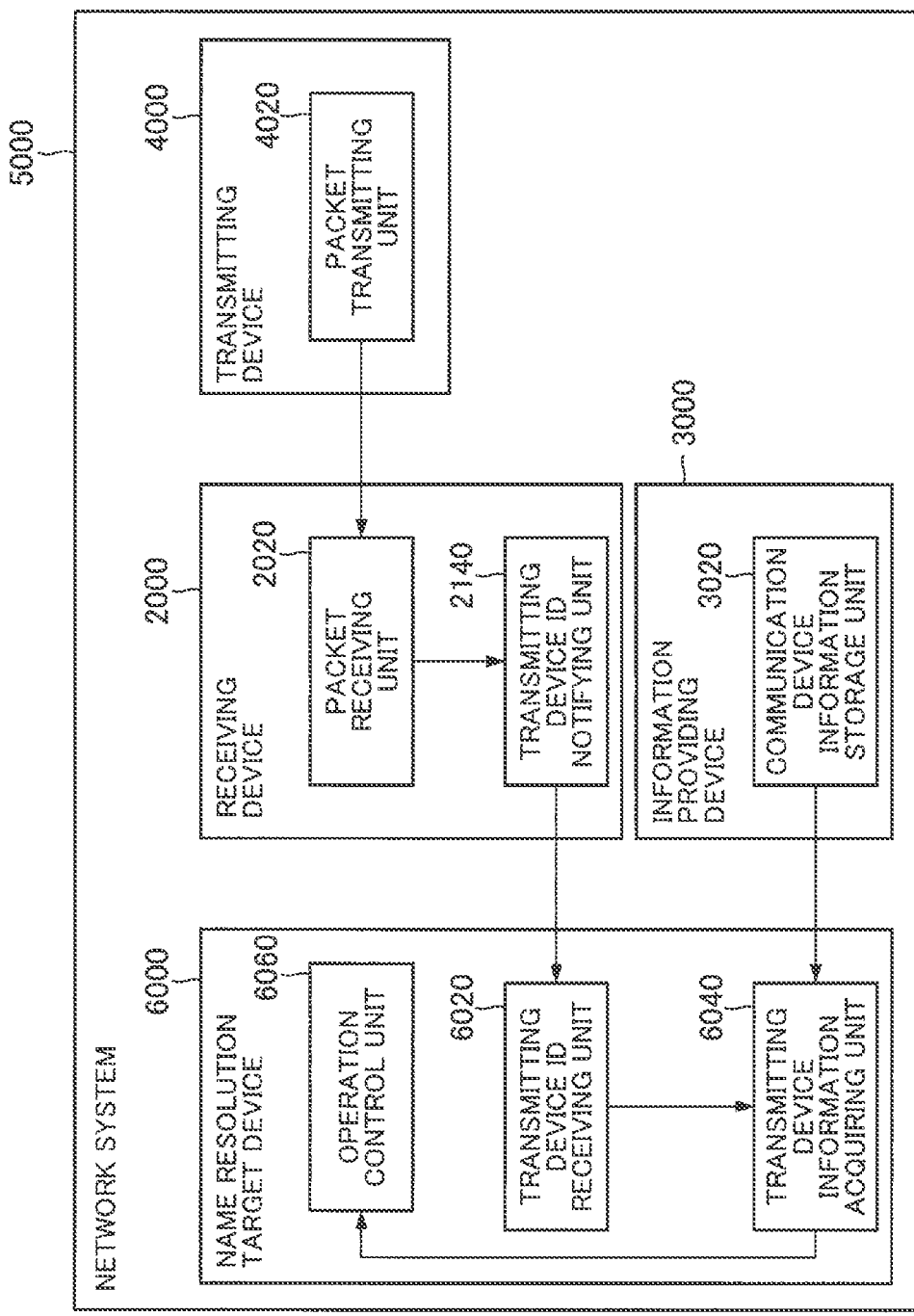
[FIG. 43] a block diagram illustrating a network system according to variation 8-1.

The name resolution target device 6000 in the network system 5000 according to the eighth exemplary embodiment may further include the following function. The network system 5000 according to the eighth exemplary embodiment in which the name resolution target device 6000 further includes the following function will be referred to as a network system 5000 according to variation 8-1. FIG. 43 is a block diagram of the network system 5000 according to variation 8-1. In FIG. 43, the arrows indicate flows of information. In FIG. 43, each of the blocks represents a configuration of functional unit rather than a configuration of hardware unit.

<Operation Control Unit 6060>

The name resolution target device 6000 includes an operation control unit 6060. The operation control unit 6060 controls an operation performed by the name resolution target device 6000 to the transmitting device 4000 on the basis of the communication device information corresponding to the transmitting device 4000.

The method in which the operation control unit 6060 controls the name resolution target device 6000 is, for example, the same as the method in which the operation control unit 2100 controls the operation of the receiving device 2000 in any of the exemplary embodiments and variations described above.

SEVENTEENTH EXAMPLE

An operation of the network system 5000 in variation 8-1 will be illustrated as a seventeenth example. The assumed environment in the seventeenth example is the same as the assumed environment in the sixteenth example.

FIG. 44 illustrates a flow of communication in the seventeenth example. The assumed environment in the seventeenth example is the same as the assumed environment in the sixteenth example.

The name resolution target device 6000 changes the method to respond to a request from the transmitting device 4000 on the basis of the communication device information which is corresponding to the transmitting device 4000 and acquired from the information providing device 3000. For example, it is assumed that the name resolution target device 6000 is not included in a whitelist, indicated by the communication device information corresponding to the transmitting device 4000, of Web servers that the transmitting device 4000 may access. In this case, for example, the name resolution target device 6000 does not return a response to the transmitting device 4000. Alternatively, for example, the name resolution target device 6000 returns an error response to the transmitting device 4000.

It is assumed that the name resolution target device 6000 is included in the whitelist, indicated by the communication device information corresponding to the transmitting device 4000, of Web servers that the transmitting device 4000 may to access. In this case, the name resolution target device 6000 processes the request from the transmitting device 4000, and returns a response to the request to the transmitting device 4000.

In this way, the name resolution target device 6000 can perform an operation that reflects an intention of the user of the transmitting device 4000.

<Actions and Effects>

According to the exemplary embodiment described above, an intention of the user of the transmitting device 4000 is reflected in the operation performed by the name resolution target device 6000 to the transmitting device 4000.

While exemplary embodiments of the present invention have been described with reference to the drawings, the exemplary embodiments are illustrative of the present invention and combinations of any of the exemplary embodiments and various configurations other than the exemplary embodiments described above may also be employed.

Examples of reference embodiments are supplementally described below.

1. A receiving device includes:
a packet receiving unit which receives a packet transmitted from a transmitting device which is a communication device transmitting the packet; and
a transmitting device information acquiring unit which acquires, from an information providing device storing communication device information which is information concerning the communication device and information used for a purpose other than name resolution for the communication device, the communication device information corresponding to the transmitting device which is a source of the packet.

2. The receiving device according to 1.,
wherein
the information providing device is a Domain Name System (DNS) server storing the communication device information corresponding to the communication device as a value of a DNS record corresponding to an FQDN (Fully Qualified Domain Name) or an IP (Internet Protocol) address of the communication device, and
the transmitting device information acquiring unit acquires the communication device information corresponding to the transmitting device by acquiring a DNS record corresponding to the FQDN or IP address of the transmitting device by using a DNS query indicating the FQDN or the IP address of the transmitting device.

3. The receiving device according to 1. or 2., includes:
an operation control unit which controls an operation performed by the receiving device for the transmitting device, on the basis of the communication device information acquired from the information providing device.

4. The receiving device according to 3.,
wherein
the receiving device is a device which transmits all or some of packets received by the packet receiving unit to a destination device which is another communication device, and
the operation control unit controls an operation performed by the receiving device for the transmitting device, on the basis of the communication device information acquired from the information providing device.

5. The receiving device according to any one of 1. to 4., wherein
the receiving device is a device transmitting all or some of packets received by the packet receiving unit to a destination device which is another communication device, and
further includes:
a destination device information acquiring unit which acquires the communication device information corresponding to the destination device from the information providing device.

6. The receiving device according to any one of 1. to 3., wherein
the packet received by the packet receiving unit is a packet which is directed to a DNS (Domain Name System) server and representing a name resolution request, and
further includes:
a name resolution target device information acquiring unit which acquires g the communication device information corresponding to the communication device for which name resolution is requested by the name resolution request represented by the packet from the information providing device.

7. A network system includes:
the receiving device according to any one of 1. to 6.;
a transmitting device; and
an information providing device,
wherein
the information providing device includes:
a communication device information storage unit which stores the communication device information; and
the transmitting device includes:
a packet transmitting unit which transmits the packet.

8. The network system according to 7.,
wherein
the destination of the packet transmitted by the packet transmitting unit is the receiving device, and
the transmitting device includes:
a name resolution request transmitting unit which transmits a name resolution request for the receiving device to a DNS (Domain Name System) server; and
a receiving device information acquiring unit which acquires the communication device information corresponding to the receiving device from the information providing device before or after the name resolution request transmitting unit transmits the name resolution request for the receiving device.

9. The network system according to 8.,
wherein
the transmitting device includes:
an operation control unit which controls an operation performed by the transmitting device for the receiving device, on the basis of the communication device information acquired by the receiving device information acquiring unit.

10. A receiving device control method includes:
receiving a packet transmitted from a transmitting device which is a communication device transmitting the packet; and
acquiring, from an information providing device storing communication device information which is information concerning the communication device and information used for a purpose other than name resolution for the communication device, the communication device information corresponding to the transmitting device which is a source of the packet.

11. The receiving device control method according to 10.,
wherein
the information providing device is a Domain Name System (DNS) server storing communication device information corresponding to the communication device as a value of a DNS record corresponding to an FQDN (Fully Qualified Domain Name) or an IP (Internet Protocol) address of the communication device, and
the receiving device control method includes:
acquiring the communication device information corresponding to the transmitting device by acquiring a DNS record corresponding to the FQDN or IP address of the transmitting device by using a DNS query indicating the FQDN or the IP address of the transmitting device.

12. The receiving device control method according to 10. or 11., includes:
controlling an operation performed by the receiving device for the transmitting device, on the basis of the communication device information acquired from the information providing device.

13. The receiving device control method according to 12., further includes:
transmitting all or some of received packets to a destination device which is another communication device, and
controlling an operation performed by the receiving device for the destination device, on the basis of the communication device information acquired from the information providing device.

14. The receiving device control method according to any one of 10. to 13., further includes:
transmitting all or some of received packets to a destination device which is another communication device, and
acquiring the communication device information corresponding to the destination device from the information providing device.

15. The receiving device control method according to any one of 10. to 13.,
wherein
the received packet is a packet which is directed to a DNS (Domain Name System) server and representing a name resolution request, and
receiving device control method further includes:
acquiring the communication device information corresponding to the communication device for which name resolution is requested by the name resolution request represented by the packet from the information providing device.

16. A network system control method for controlling a network system includes: a receiving device, a transmitting device which is a communication device transmitting a packet and an information providing device, the information providing device storing communication device information which is information concerning the communication device and information used for a purpose other than name resolution for the communication device,
the network system control method includes:
transmitting the packet from the transmitting device;
receiving, in the receiving device, the packet transmitted by the transmitting device; and
acquiring, in the receiving device, the communication device information corresponding to the transmitting device which is a source of the packet from the information providing device.

17. A computer readable non-transitory medium embodying a program, the program causing a receiving device to performa method, the method further includes:
receiving a packet transmitted from a transmitting device which is a communication device transmitting the packet; and
acquiring, from an information providing device storing communication device information which is information concerning the communication device and information used for a purpose other than name resolution for the communication device, the communication device information corresponding to the transmitting device which is a source of the packet.

18. The medium according to 17.,
wherein
the information providing device is a Domain Name System (DNS) server storing the communication device information corresponding to the communication device as a value of a DNS record corresponding to an FQDN (Fully Qualified Domain Name) or an IP (Internet Protocol) address of the communication device, and
the method includes:
acquiring the communication device information corresponding to the transmitting device by acquiring a DNS record corresponding to the FQDN or IP address of the transmitting device by using a DNS query indicating the FQDN or IP address of the transmitting device.

19. The medium according to 17. or 18., the method further includes:
controlling an operation performed by the computer for the transmitting device, on the basis of the communication device information acquired from the information providing device.

20. The medium according to claim 19., the method includes:
transmitting all or some of received packets to a destination device which is another communication device, and
controlling an operation performed by the computer for the destination device, on the basis of the communication device information acquired from the information providing device.

21. The medium according to any one of claims 17. to 20., the method further includes:

transmitting all or some of received packets to a destination device which is another communication device, and acquiring the communication device information corresponding to the destination device from the information providing device.

22. The medium according to any one of 17. to 19.,
wherein
the received packet is a packet which is directed to a DNS (Domain Name System) server and representing a name resolution request, and
the method further includes:
acquiring the communication device information corresponding to the communication device for which name resolution is requested by the name resolution request represented by the packet from the information providing device.

23. A computer readable non-transitory medium embodying a program for causing one or more processors in a network system to perform a method, the network system includes: a receiving device, a transmitting device which is a communication device transmitting a packet and an information providing device which stores communication device information which is information concerning the communication device and information used for a purpose other than name resolution for the communication device,
the method includes:
transmitting the packet from the transmitting device;
receiving, in the receiving device, the packet transmitted from the transmitting device; and
acquiring, in the receiving device, the communication device information corresponding to the transmitting device which is a source of the packet from the information providing device.

24. A network system includes:
a transmitting device which includes: a packet transmitting unit which transmits a packet which is a packet for requesting name resolution for the receiving device and contains an ID of the transmitting device,
an information providing device which includes:
a packet receiving unit which receives the packet from the transmitting device;
a transmitting device ID notifying unit which indicates the ID of the transmitting device indicated in the packet to a name resolution target device; and
a communication device information storage unit which stores communication device information which is information concerning the transmitting device and information used for a purpose other than name resolution for the transmitting device in association with the ID of the transmitting device; and
a receiving device which includes:
a transmitting device ID receiving unit which receives the ID of the transmitting device from the information providing device; and
a transmitting device information acquiring unit which acquires the communication device information corresponding to the received ID of the transmitting device from the information providing device.

25. The network system according to 24.,
wherein
the information providing device is a Domain Name System (DNS) server storing the communication device information corresponding to the communication device as a value of a DNS record corresponding to an FQDN (Fully Qualified Domain Name) or an IP (Internet Protocol) address of the communication device; and the transmitting device information acquiring unit of the receiving device acquires the communication device information corresponding to the transmitting device by acquiring a DNS record corresponding to the FQDN or IP address of the transmitting device by using a DNS query indicating the FQDN or IP address of the transmitting device.

26. The network system according to 24. or 25.,
wherein
the receiving device includes:
an operation control unit which controls an operation performed by the receiving device for the transmitting device, on the basis of the communication device information acquired from the information providing device.

27. A control method for controlling a network system includes:
an information providing device which includes:
a communication device information storage unit which stores communication device information which is information concerning the transmitting device and information used for a purpose other than name resolution for the transmitting device in association with an ID of the transmitting device; and
the control method includes:
transmitting a packet, from the transmitting device, which is a packet for requesting name resolution for the receiving device and contains an ID of the transmitting device;
receiving, in the information providing device, the packet from the transmitting device;
notifying the ID of the transmitting device indicated in the packet, from the information providing device, to a name resolution target device;
receiving the ID of the transmitting device, in the receiving device, from the information providing device; and
acquiring, in the receiving device, the communication device information corresponding to the received ID of the transmitting device from the information providing device.

28. The network system control method according to 27.,
wherein
the information providing device is a Domain Name System (DNS) server storing the communication device information corresponding to a communication device as a value of a DNS record corresponding to an FQDN (Fully Qualified Domain Name) or an IP (Internet Protocol) address of the communication device; and
the network system control method further includes:
acquiring the communication device information corresponding to the transmitting device by acquiring a DNS record corresponding to the FQDN or IP address of the transmitting device by using a DNS query indicating the FQDN or IP address of the transmitting device.

29. The network system control method according to 27. or 28., includes:
controlling an operation performed by the receiving device for the transmitting device, on the basis of the communication device information acquired from the information providing device.

30. A computer readable non-transitory medium embodying a program for causing one or more processors in a network system including a transmitting device, a receiving device and an information providing device storing communication device information which is information concerning the transmitting device and information used for a purpose other than name resolution for the transmitting device in association with an ID of the transmitting device, to perform an method, the method includes:

transmitting a packet which is a packet for requesting name resolution for the receiving device and contains an ID of the transmitting device;
   receiving the packet from the transmitting device; and notifying the ID of the transmitting device indicated in the packet to a name resolution target device; and
   receiving the ID of the transmitting device from the information providing device; and
   acquiring the communication device information corresponding to the received ID of the transmitting device from the information providing device.

31. The medium according to 30.,
wherein
the information providing device is a Domain Name System (DNS) server storing the communication device information corresponding to the communication device as a value of a DNS record corresponding to an FQDN (Fully Qualified Domain Name) or an IP (Internet Protocol) address of the communication device; and the method includes:

acquiring the communication device information corresponding to the transmitting device by acquiring a DNS record corresponding to the FQDN or IP address of the transmitting device by using a DNS query indicating the FQDN or IP address of the transmitting device.

32. The medium according to 30. or 31., further includes:
controlling an operation performed by the receiving device for the transmitting device, on the basis of the communication device information acquired from the information providing device.

33. A network system includes:
an information providing device includes: a communication device information storage unit which stores communication device information, which is information concerning the transmitting device and information used for a purpose other than name resolution for the transmitting device in association with the ID of the transmitting device;
a transmitting device includes: a packet transmitting unit which transmits a packet which is a packet for requesting name resolution for the name resolution target device and contains an ID of the transmitting device;
a receiving device includes:
   a packet receiving unit which resolves the packet from the transmitting device; and
   a transmitting device ID notifying unit which indicates the ID of the transmitting device indicated in the packet to the name resolution target device; and
a name resolution target device includes:
   a transmitting device ID receiving unit which receives the ID of the transmitting device from the receiving device; and
   a transmitting device information acquiring unit which acquires the communication device information corresponding to the received ID of the transmitting device from the information providing device.

34. The network system according to 33.,
wherein
the information providing device is a Domain Name System (DNS) server storing the communication device information corresponding to the communication device as a value of a DNS record corresponding to an FQDN (Fully Qualified Domain Name) or an IP (Internet Protocol) address of the communication device; and the transmitting device information acquiring unit of the name resolution target device acquires the communication device information corresponding to the transmitting device by acquiring a DNS record corresponding to the FQDN or IP address of the transmitting device by using a DNS query indicating the FQDN or IP address of the transmitting device.

35. The network system according to 33. or 34.,
wherein
the name resolution target device includes:
an operation control unit which controls an operation performed by the receiving device for the transmitting device, on the basis of the communication device information acquired from the information providing device.

36. A network system control method for controlling a network system including a transmitting device, a receiving device, a name resolution target device, and an information providing device storing communication device information which is information concerning the transmitting device and information used for a purpose other than name resolution for the transmitting device in association with the ID of the transmitting device, the method includes:

transmitting a packet, from the transmitting device, the packet which is a packet for requesting name resolution for the name resolution target device and contains an ID of the transmitting device;
   receiving the packet, in the receiving device, from the transmitting device;
   notifying, from the receiving device, the ID of the transmitting device indicated in the packet to the name resolution target device;
   receiving, in the name resolution target, the ID of the transmitting device from the receiving device; and
   acquiring, in the name resolution target device, the communication device information corresponding to the received ID of the transmitting device from the information providing device.

37. The network system control method according to 36.,
wherein
the information providing device is a Domain Name System (DNS) server storing the communication device information corresponding to the communication device as a value of a DNS record corresponding to an FQDN (Fully Qualified Domain Name) or an IP (Internet Protocol) address of the communication device; and the method includes:

acquiring the communication device information corresponding to the transmitting device by acquiring a DNS record corresponding to the FQDN or IP address of the transmitting device by using a DNS query indicating the FQDN or IP address of the transmitting device.

38. The network system control method according to 36. or 37., further includes:
controlling, by the name resolution target device, an operation performed by the receiving device for the transmitting device, on the basis of the communication device information acquired from the information providing device.

39. A computer readable non-transitory medium embodying a program for causing one or more processors in a network system including a transmitting device, a receiving device, a name resolution target device to perform a method, and an information providing device storing communication device information which is information concerning the transmitting device and information used for a purpose other than name resolution for the transmitting device in association with the ID of the transmitting device, the method includes:
transmitting a packet which is a packet for requesting name resolution for the name resolution target device and contains an ID of the transmitting device;
receiving the packet from the transmitting device;
notifying the ID of the transmitting device indicated in the packet to the name resolution target device;
receiving the ID of the transmitting device from the receiving device; and
acquiring the communication device information corresponding to the received ID of the transmitting device from the information providing device.

40. The medium according to 39.,
wherein
the information providing device is a Domain Name System (DNS) server storing the communication device information corresponding to the communication device as a value of a DNS record corresponding to an FQDN (Fully Qualified Domain Name) or an IP (Internet Protocol) address of the communication device; and
the method further includes:
acquiring the communication device information corresponding to the transmitting device by acquiring a DNS record corresponding to the FQDN or IP address of the transmitting device by using a DNS query indicating the FQDN or IP address of the transmitting device.

41. The according to 39. or 40., the method further includes:
controlling an operation performed by the receiving device for the transmitting device, on the basis of the communication device information acquired from the information providing device.

The invention claimed is:

1. A receiving device comprising:
a processor and a memory, wherein
the processor reads a program from the memory and is configured to:
receive a packet transmitted from a transmitting device which is a communication device transmitting the packet;
acquire, from an information providing device storing communication device information which is information concerning a communication device and information used for a purpose other than name resolution for the communication device, the communication device information corresponding to the transmitting device which is a source of the packet, wherein the packet received from the transmitting device is directed to a DNS (Domain Name System) server and represents a name resolution request;
acquire, from the information providing device, the communication device information corresponding to the communication device for which name resolution is requested by the name resolution request represented by the packet, wherein the communication device information includes at least any one of information indicating an allowed operation by the communication device, information indicating the transmitting device allowed, information indicating an allowed protocol used by the communication device, or information that a user requested to output;
perform the allowed operation when the communication device information includes the information indicating the allowed operation by the communication device;
communicate with another communication device when the communication device information includes the information indicating the transmitting device allowed;
use the allowed protocol when the communication device information includes the information indicating the allowed protocol used by the communication device; and
output the information that the user requested to output when the communication device information includes the information that the user requested to output,
wherein, when one of a layer 2 address or a layer 3 address is contained in the packet that is transmitted from the transmitting device and received by the receiving device, the processor acquires the communication device information from the information providing device by using an ID of the transmitting device, the ID including one of the layer 2 address or the layer 3 address in the packet transmitted from the transmitting device,
wherein the receiving device is a device which transmits all or some of the packets received by the processor to a destination device which is the another communication device,
the communication device information further includes information indicating an operating status of the destination device and a reason why the destination device is in the operating status, and
the processor is further configured to recognize the operation status of the destination device and control the receiving device to notify the transmitting device, on the basis of the operation status of the destination device and the reason why the destination device is in the operating status,
wherein the processor is further configured to provide an error notification to the transmitting device, the error notification indicating that a mail cannot be transmitted to the destination device, without transmitting the mail to the destination device, when the communication device information indicates that the destination device is unable to communicate.

2. The receiving device according to claim 1,
wherein the information providing device is the DNS server storing the communication device information corresponding to the communication device as a value of a DNS record corresponding to an FQDN (Fully Qualified Domain Name) or an IP (Internet Protocol) address of the communication device, and
the processor is further configured to acquire the communication device information corresponding to the transmitting device by acquiring a DNS record corresponding to the FQDN or an IP address of the transmitting device by using a DNS query indicating the FQDN or the IP address of the transmitting device.

3. The receiving device according to claim 1, wherein the processor is configured to control an operation performed by the receiving device for the transmitting device, on the basis of the communication device information acquired from the information providing device.

4. The receiving device according to claim 3,
wherein the processor is further configured to control the operation performed by the receiving device for the destination device, on the basis of the communication device information acquired from the information providing device.

5. The receiving device according to claim 1, wherein
the processor is further configured to acquire the communication device information corresponding to the destination device from the information providing device.

6. A network system comprising:
the receiving device according to claim 1;
the transmitting device comprising a processor configured to transmit the packet; and
the information providing device comprising a memory configured to store the communication device information.

7. The network system according to claim 6, wherein a destination of the packet transmitted by the processor is the receiving device, and
the processor of the transmitting device is further configured to:
transmit a name resolution request for the receiving device to the DNS (Domain Name System) server; and
acquire the communication device information corresponding to the receiving device from the information providing device before or after the processor transmits the name resolution request for the receiving device.

8. The network system according to claim 7, wherein the processor of the transmitting device is further configured to control an operation performed by the transmitting device for the receiving device, on the basis of the communication device information acquired by the processor.

9. A receiving device control method comprising:
receiving a packet transmitted from a transmitting device which is a communication device transmitting the packet;
acquiring, from an information providing device storing communication device information which is information concerning a communication device and information used for a purpose other than name resolution for the communication device, the communication device information corresponding to the transmitting device which is a source of the packet, wherein the received packet is directed to a DNS (Domain Name System) server and represents a name resolution request;
acquiring, from the information providing device, the communication device information corresponding to the communication device for which name resolution is requested by the name resolution request represented by the packet, wherein the communication device information includes at least any one of information indicating an allowed operation by the communication device, information indicating the transmitting device allowed, information indicating an allowed protocol used by the communication device, or information that a user requested to output;
performing the allowed operation when the communication device information includes the information indicating the allowed operation by the communication device;
communicating with another communication device when the communication device information includes the information indicating the transmitting device allowed;

using the allowed protocol when the communication device information includes the information indicating the allowed protocol used by the communication device;
outputting the information that the user requested to output when the communication device information includes the information that the user requested to output;
when one of a layer 2 address or a layer 3 address is contained in the packet that is transmitted from the transmitting device and received by the receiving device, acquiring the communication device information from the information providing device by using an ID of the transmitting device, the ID including one of the layer 2 address or the layer 3 address in the packet transmitted from the transmitting device;
transmitting all or some of the packets received by the processor to a destination device which is the another communication device,
wherein the communication device information further includes information indicating an operating status of the destination device and a reason why the destination device is in the operating status;
recognizing the operation status of the destination device;
controlling the receiving device to notify the transmitting device, on the basis of the operation status of the destination device and the reason why the destination device is in the operating status; and
providing an error notification to the transmitting device, the error notification indicating that a mail cannot be transmitted to the destination device, without transmitting the mail to the destination device, when the communication device information indicates that the destination device is unable to communicate.

10. The receiving device control method according to claim 9,
wherein the information providing device is the DNS server storing communication device information corresponding to the communication device as a value of a DNS record corresponding to an FQDN (Fully Qualified Domain Name) or an IP (Internet Protocol) address of the communication device, and
the receiving device control method comprising:
acquiring the communication device information corresponding to the transmitting device by acquiring a DNS record corresponding to the FQDN or an IP address of the transmitting device by using a DNS query indicating the FQDN or the IP address of the transmitting device.

11. The receiving device control method according to claim 9 comprising:
controlling an operation performed by the receiving device for the transmitting device, on the basis of the communication device information acquired from the information providing device.

12. The receiving device control method according to claim 11, further comprising:
controlling the operation performed by the receiving device for the destination device, on the basis of the communication device information acquired from the information providing device.

13. The receiving device control method according to claim 9, further comprising:
acquiring the communication device information corresponding to the destination device from the information providing device.

14. A network system control method for controlling a network system, the network system including: a receiving device, a transmitting device which is a communication device transmitting a packet and an information providing device, the information providing device storing communication device information which is information concerning a communication device and information used for a purpose other than name resolution for the communication device,
the network system control method comprising:
transmitting the packet from the transmitting device;
receiving, in the receiving device, the packet transmitted by the transmitting device;
acquiring, in the receiving device, the communication device information corresponding to the transmitting device which is a source of the packet from the information providing device, wherein the received packet is directed to a DNS (Domain Name System) server and represents a name resolution request;
acquiring, from the information providing device, the communication device information corresponding to the communication device for which name resolution is requested by the name resolution request represented by the packet, wherein the communication device information includes at least any one of information indicating an allowed operation by the communication device, information indicating the transmitting device allowed, information indicating an allowed protocol used by the communication device, or information that a user requested to output;
performing the allowed operation when the communication device information includes the information indicating the allowed operation by the communication device;
communicating with another communication device when the communication device information includes the information indicating the transmitting device allowed;
using the allowed protocol when the communication device information includes the information indicating the allowed protocol used by the communication device;
outputting the information that the user requested to output when the communication device information includes the information that the user requested to output;
when one of a layer 2 address or a layer 3 address is contained in the packet that is transmitted from the transmitting device and received by the receiving device, acquiring the communication device information from the information providing device by using an ID of the transmitting device, the ID including one of the layer 2 address or the layer 3 address in the packet transmitted from the transmitting device;
transmitting all or some of the packets received by the processor to a destination device which is the another communication device,
wherein the communication device information further includes information indicating an operating status of the destination device and a reason why the destination device is in the operating status;
recognizing the operation status of the destination device;
controlling the receiving device to notify the transmitting device, on the basis of the operation status of the destination device and the reason why the destination device is in the operating status; and
providing an error notification to the transmitting device, the error notification indicating that a mail cannot be transmitted to the destination device, without transmitting the mail to the destination device, when the communication device information indicates that the destination device is unable to communicate.

15. A computer readable non-transitory medium embodying a program, the program causing a receiving device to perform a method, the method comprising:
receiving a packet transmitted from a transmitting device which is a communication device transmitting the packet;
acquiring, from an information providing device storing communication device information which is information concerning a communication device and information used for a purpose other than name resolution for the communication device, the communication device information corresponding to the transmitting device which is a source of the packet, wherein the received packet is directed to a DNS (Domain Name System) server and represents a name resolution request;
acquiring, from the information providing device, the communication device information corresponding to the communication device for which name resolution is requested by the name resolution request represented by the packet, wherein the communication device information includes at least any one of information indicating an allowed operation by the communication device, information indicating the transmitting device allowed, information indicating an allowed protocol used by the communication device, or information that a user requested to output;
performing the allowed operation when the communication device information includes the information indicating the allowed operation by the communication device;
communicating with another communication device when the communication device information includes the information indicating the transmitting device allowed;
using the allowed protocol when the communication device information includes the information indicating the allowed protocol used by the communication device;
outputting the information that the user requested to output when the communication device information includes the information that the user requested to output;
when one of a layer 2 address or a layer 3 address is contained in the packet that is transmitted from the transmitting device and received by the receiving device, acquiring the communication device information from the information providing device by using an ID of the transmitting device, the ID including one of the layer 2 address or the layer 3 address in the packet transmitted from the transmitting device;
transmitting all or some of the packets received by the processor to a destination device which is the another communication device,
wherein the communication device information further includes information indicating an operating status of the destination device and a reason why the destination device is in the operating status;
recognizing the operation status of the destination device;
controlling the receiving device to notify the transmitting device, on the basis of the operation status of the destination device and the reason why the destination device is in the operating status; and
providing an error notification to the transmitting device, the error notification indicating that a mail cannot be transmitted to the destination device, without transmitting the mail to the destination device, when the communication device information indicates that the destination device is unable to communicate.

16. The medium according to claim 15,
wherein the information providing device is the DNS server storing the communication device information corresponding to the communication device as a value of a DNS record corresponding to an FQDN (Fully Qualified Domain Name) or an IP (Internet Protocol) address of the communication device, and
the method further comprising:
acquiring the communication device information corresponding to the transmitting device by acquiring a DNS record corresponding to the FQDN or an IP address of the transmitting device by using a DNS query indicating the FQDN or the IP address of the transmitting device.

17. The medium according to claim 15 the method further comprising:
controlling an operation performed by a computer for the transmitting device, on the basis of the communication device information acquired from the information providing device.

18. The medium according to claim 17, the method comprising:
controlling an operation performed by a computer for the destination device, on the basis of the communication device information acquired from the information providing device.

19. The medium according to claim 15, the method further comprising:
acquiring the communication device information corresponding to the destination device from the information providing device.

20. A computer readable non-transitory medium embodying a program for causing one or more processors in a network system to perform a method, the network system including: a receiving device, a transmitting device which is a communication device transmitting a packet and an information providing device which stores communication device information which is information concerning a communication device and information used for a purpose other than name resolution for the communication device,
the method comprising:
transmitting the packet from the transmitting device;
receiving, in the receiving device, the packet transmitted from the transmitting device;
acquiring, in the receiving device, the communication device information corresponding to the transmitting device which is a source of the packet from the information providing device, wherein the received packet is directed to a DNS (Domain Name System) server and represents a name resolution request;
acquiring, from the information providing device, the communication device information corresponding to the communication device for which name resolution is requested by the name resolution request represented by the packet, wherein the communication device information includes at least any one of information indicating an allowed operation by the communication device, information indicating the transmitting device allowed, information indicating an allowed protocol used by the communication device, or information that a user requested to output;
performing the allowed operation when the communication device information includes the information indicating the allowed operation by the communication device;
communicating with another communication device when the communication device information includes the information indicating the transmitting device allowed;
using the allowed protocol when the communication device information includes the information indicating the allowed protocol used by the communication device;
outputting the information that the user requested to output when the communication device information includes the information that the user requested to output;
when one of a layer 2 address or a layer 3 address is contained in the packet that is transmitted from the transmitting device and received by the receiving device, acquiring the communication device information from the information providing device by using an ID of the transmitting device, the ID including one of the layer 2 address or the layer 3 address in the packet transmitted from the transmitting device;
transmitting all or some of the packets received by the processor to a destination device which is the another communication device,
wherein the communication device information further includes information indicating an operating status of the destination device and a reason why the destination device is in the operating status;
recognizing the operation status of the destination device;
controlling an operation performed by the receiving device to notify the transmitting device, on the basis of the operation status of the destination device and the reason why the destination device is in the operating status; and
providing an error notification to the transmitting device, the error notification indicating that a mail cannot be transmitted to the destination device, without transmitting the mail to the destination device, when the communication device information indicates that the destination device is unable to communicate.

* * * * *